(12) United States Patent
Sowizral et al.

(10) Patent No.: US 6,373,485 B2
(45) Date of Patent: Apr. 16, 2002

(54) MITIGATING THE EFFECTS OF OBJECT APPROXIMATIONS

(75) Inventors: Henry A. Sowizral, Bellevue; Karel Zikan, Seattle, both of WA (US); Randall G. Keller, San Carlos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/894,196

(22) Filed: Jun. 27, 2001

Related U.S. Application Data

(63) Continuation-in-part of application No. 09/247,466, filed on Feb. 9, 1999.
(60) Provisional application No. 60/214,939, filed on Jun. 29, 2000, and provisional application No. 60/074,868, filed on Feb. 17, 1998.

(51) Int. Cl.[7] .............................................. G06T 15/40
(52) U.S. Cl. ....................................... 345/421; 345/622
(58) Field of Search ................................ 345/419, 420, 345/421, 428, 620, 621, 622

(56) References Cited

U.S. PATENT DOCUMENTS

| | | | | | |
|---|---|---|---|---|---|
| 5,295,243 A | * | 3/1994 | Robertson et al. | ........... | 395/160 |
| 6,137,499 A | * | 10/2000 | Tesler | ........................ | 345/440 |
| 6,223,145 B1 | * | 4/2001 | Hearst | ........................ | 703/22 |
| 6,259,451 B1 | * | 7/2001 | Tesler | ........................ | 345/419 |
| 6,300,965 B1 | * | 10/2001 | Sowizral et al. | ............ | 345/622 |

* cited by examiner

*Primary Examiner*—Mark Zimmerman
*Assistant Examiner*—Enrique L Santiago
(74) *Attorney, Agent, or Firm*—Conley, Rose & Tayon PC

(57) ABSTRACT

A system for determining nearest leaf bounds per leaf cone of a cone hierarchy based on a dual-tree search of the cone hierarchy and a bound hierarchy. A processor, performing the dual-tree search, maintains for each leaf cone a collection of nearest leaf bounds. The collection evolves as the dual-tree search progresses. The processor may maintain the N closest leaf bounds for each leaf cone. The processor may classify leaf bounds as occluders or non-occluders, and store any non-occluder closer than the $N^{th}$ occluder. Alternatively, the processor may assign an occlusion metric value to each leaf bound, and may maintain closest leaf bounds so that the sum of their occlusion metric values is less than or equal to an occlusion threshold. The dual-tree search may be followed by a search of the bound hierarchy with probe cones of the leaf cones.

61 Claims, 25 Drawing Sheets

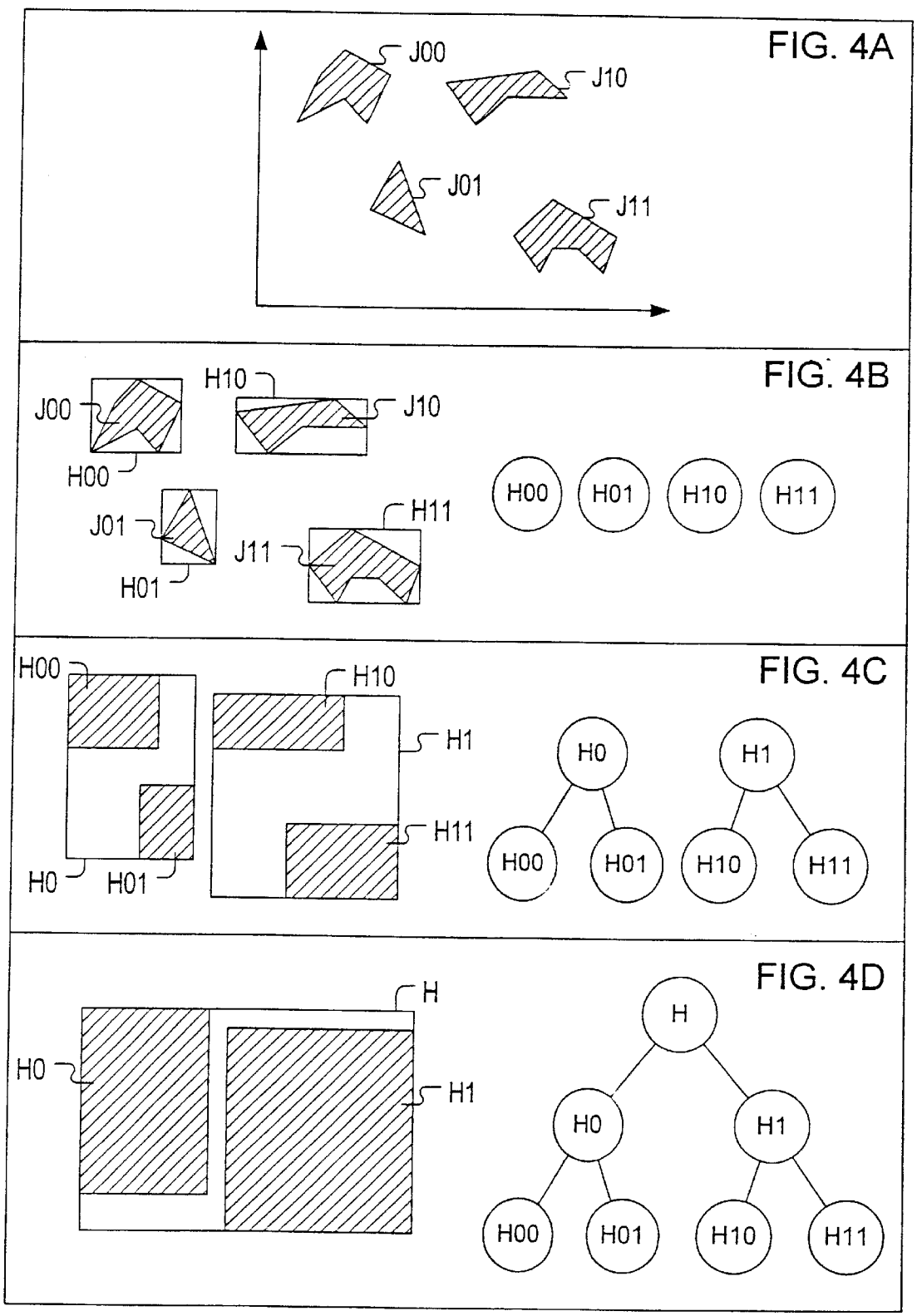

MITIGATING THE EFFECTS OF OBJECT APPROXIMATIONS

CROSS REFERENCES TO RELATED APPLICATIONS

This application claims the benefit of U.S. Provisional Application No. 60/214,939 filed on Jun. 29, 2000 titled "Mitigating the Effects of Object Approximations".

This application is a continuation-in-part of U.S. patent application Ser. No. 09/247,466 filed on Feb. 9, 1999 titled "Visible-Object Determination For Interactive Visualization", which claims the benefit of U.S. Provisional Application No. 60/074,868 filed on Feb. 17, 1998 titled "Visible-Object Determination for Interactive Visualization".

BACKGROUND OF THE INVENTION

1. Field of the Invention

The present invention relates generally to the field of computer graphics, and more particularly, to the problem of determining the set of objects (and portions of objects) visible from a defined viewpoint in a graphics environment.

2. Description of the Related Art

Visualization software has proven to be very useful in evaluating three-dimensional designs long before the physical realization of those designs. In addition, visualization software has shown its cost effectiveness by allowing engineering companies to find design problems early in the design cycle, thus saving them significant amounts of money. Unfortunately, the need to view more and more complex scenes has outpaced the ability of graphics hardware systems to display them at reasonable frame rates. As scene complexity grows, visualization software designers need to carefully use the rendering resource provided by graphic hardware pipelines.

A hardware pipeline wastes rendering bandwidth when it discards triangle work. Rendering bandwidth waste can be decreased by not asking the pipeline to draw triangles that it will discard. Various software methods for reducing pipeline waste have evolved over time. Each technique reduces waste at a different point within the pipeline. As an example, software culling of objects falling outside the view frustum can significantly reduce discards in a pipeline's clipping computation. Similarly, software culling of backfacing triangles can reduce discards in a pipeline's lighting computation.

The z-buffer is the final part of the graphics pipeline that discards work. In essence, the z-buffer retains visible surfaces and discards those not visible. As scene complexity increases, especially in walk through and CAD environments, the number of occluded surfaces rises rapidly and as a result the number of surfaces that the z-buffer discards rises as well. A frame's average depth complexity determines roughly how much work (and thus rendering bandwidth) the z-buffer discards. In a frame with a per-pixel depth complexity of d the pipeline's effectiveness is 1/d. As depth complexity rises, the hardware pipeline thus becomes proportionally less and less effective.

Software occlusion culling has been proposed as an additional tool for improving rendering effectiveness. A visualization program which performs occlusion culling effectively increases the overall rendering bandwidth of the graphics hardware by not asking the hardware pipeline to draw occluded objects. Computing a scene's visible objects is the complementary problem to that of occlusion culling. Rather than removing occluded objects from the set of objects in a scene or even a frustum culled scene, a program instead computes which objects are visible and draws just those. A simple visualization program can compute the set of visible objects and draw those objects from the current viewpoint, allowing the pipeline to remove backfacing polygons and the z-buffer to remove any non-visible surfaces.

One technique for computing the visible object set uses ray casting. RealEyes [Sowizral, H. A., Zikan, K., Esposito, C., Janin, A., Mizell, D., "RealEyes: A System for Visualizing Very Large Physical Structures", SIGGRAPH '94, Visual Proceedings, 1994, p. 228], a system that implemented the ray casting technique, was demonstrated in SIGGRAPH 1994's BOOM room. At interactive rates, visitors could "walk" around the interior of a Boeing 747 or explore the structures comprising Space Station Freedom's lab module.

The intuition for the use of rays in determining visibility relies on the properties of light. The first object encountered along a ray is visible since it alone can reflect light into the viewer's eye. Also, that object interposes itself between the viewer and all succeeding objects along the ray making them not visible. In the discrete world of computer graphics, it is difficult to propagate a continuum of rays. So a discrete subset of rays is invariably used. Of course, this implies that visible objects or segments of objects smaller than the resolution of the ray sample may be missed and not discovered. This is because rays guarantee correct determination of visible objects only up to the density of the ray-sample. FIG. 1 illustrates the ray-based method of visible object detection. Rays that interact with one or more objects are marked with a dot at the point of their first contact with an object. It is this point of first contact that determines the value of the screen pixel corresponding to the ray. Also observe that the object denoted A is small enough to be entirely missed by the given ray sample.

Visible-object determination has its roots in visible-surface determination. Foley et al. [Foley, J., van Dam, A., Feiner, S. and Hughes, J. Computer Graphics: Principles and Practice, 2nd ed., Addison-Wesley, Chapter 15, pp.649–718, 1996] divide visible-surface determination approaches into two broad groups: image-precision and object-precision algorithms. Image precision algorithms typically operate at the resolution of the display device and tend to have superior performance computationally. Object precision approaches operate in object space - usually performing object to object comparisons.

A prototypical image-precision visible-surface-determination algorithm casts rays from the viewpoint through the center of each display pixel to determine the nearest visible surface along each ray. The list of applications of visible-surface ray casting (or ray tracing) is long and distinguished. Appel ["Some Techniques for Shading Machine Rendering of Solids", SJCC'68, pp. 37–45, 1968] uses ray casting for shading. Goldstein and Nagel [Mathematical Applications Group, Inc., "3-D Simulated Graphics Offered by Service Bureau," Datamation, 13(1), Feb. 1968, p. 69.; see also Goldstein, R. A. and Nagel, R., "3-D Visual Simulation", Simulation, 16(1), pp.25–31, 1971] use ray casting for boolean set operations. Kay et al. [Kay, D. S. and Greenberg, D., "Transparency for Computer Synthesized Images," SIGGRAPH'79, pp.158–164] and Whitted ["An Improved Illumination Model for Shaded Display", CACM, 23(6), pp.343–349, 1980] use ray tracing for refraction and specular reflection computations. Airey et al. [Airey, J. M., Rohlf, J. H. and Brooks, Jr. F. P., "Towards Image Realism with Interactive Update Rates in Complex Virtual Building Environments", ACM SIGGRAPH Symposium on Interactive 3D Graphics, 24, 2(1990), pp. 41–50] uses ray casting for computing the portion of a model visible from a given cell.

Another approach to visible-surface determination relies on sending beams or cones into a database of surfaces [see Dadoun et al., "Hierarchical approachs to hidden surface intersection testing", Proceedings of Graphics Interface '82, Toronto, May 1982, 49–56; see also Dadoun et al., "The geometry of beam tracing", In Joseph O'Rourke, ed., Proceedings of the Symposium on Computational Geometry, pp.55–61, ACM Press, New York, 1985]. Essentially, beams become a replacement for rays. The approach usually results in compact beams decomposing into a set of possibly non-connected cone(s) after interacting with an object.

A variety of spatial subdivision schemes have been used to impose a spatial structure on the objects in a scene. The following four references pertain to spatial subdivision schemes: (a) Glassner, "Space subdivision for fast ray tracing," IEEE CG&A, 4(10):15–22, Oct. 1984; (b) Jevans et al., "Adaptive voxel subdivision for ray tracing," Proceedings Graphics Interface '89, 164–172, June 1989; (c) Kaplan, M. "The use of spatial coherence in ray tracing," in Techniques for Computer Graphics. . . , Rogers, D. and Earnshaw, R. A. (eds), Springer-Verlag, N.Y., 1987; and (d) Rubin, S. M. and Whitted, T. "A 3-dimensional representation for fast rendering of complex scenes," Computer Graphics, 14(3):110–116, July 1980.

Kay et al. [Kay, T. L. and Kajiya, J. T., "Ray Tracing Complex Scenes", SIGGRAPH 1986, pp. 269–278,1986], concentrating on the computational aspect of ray casting, employed a hierarchy of spatial bounding volumes in conjunction with rays, to determine the visible objects along each ray. Of course, the spatial hierarchy needs to be precomputed. However, once in place, such a hierarchy facilitates a recursive computation for finding objects. If the environment is stationary, the same data-structure facilitates finding the visible object along any ray from any origin.

Teller et al. [Teller, S. and Sequin, C. H., "Visibility Preprocessing for Interactive Walkthroughs," SIGGRAPH '91, pp.61–69] use preprocessing to full advantage in visible-object computation by precomputing cell-to-cell visibility. Their approach is essentially an object precision approach and they report over 6 hours of preprocessing time to calculate 58 Mbytes of visibility information for a 250,000 polygon model on a 50 MIP machine [Teller, S. and Sequin. C. H., "Visibility computations in polyhedral three-dimensional environments," U. C. Berkeley Report No. UCB/CSD 92/680, April 1992].

In a different approach to visibility computation, Greene et al. [Greene, N., Kass, M., and Miller, G., "Hierarchical z-Buffer Visibility," SIGGRAPH '93, pp.231–238] use a variety of hierarchical data structures to help exploit the spatial structure inherent in object space (an octree of objects), the image structure inherent in pixels (a Z pyramid), and the temporal structure inherent in frame-by-frame rendering (a list of previously visible octree nodes). The Z-pyramid permits the rapid culling of large portions of the model by testing for visibility using a rapid scan conversion of the cubes in the octree.

As used herein, the term "octree" refers to a data structure derived from a hierarchical subdivision of a three-dimensional space based on octants. The three-dimensional space may be divided into octants based on three mutually perpendicular partitioning planes. Each octant may be further partitioned into eight sub-octants based on three more partitioning planes. Each sub-octant may be partitioned into eight sub-suboctants, and so forth. Each octant, sub-octant, etc., may be assigned a node in the data structure. For more information concerning octrees, see pages 550–555, 559–560 and 695–698 of Computer Graphics: principles and practice, James D. Foley et al., 2nd edition in C, ISBN 0-201-84840-6, T385,C5735, 1996.

The depth complexity of graphical environments continues to increase in response to consumer demand for realism and performance. Thus, the efficiency of an algorithm for visible object determination has a direct impact on the marketability of a visualization system. The computational bandwidth required by the visible object determination algorithm determines the class of processor required for the visualization system, and thereby effects overall system cost. Thus, a system and method for improving the efficiency of visible object determination is greatly desired.

SUMMARY OF THE INVENTION

Various embodiments of a system and method for performing visible object determination based upon a dual search of a cone hierarchy and a bounding hierarchy are herein disclosed. The system may comprise a processor, a display device, system memory, and optionally a graphics accelerator. The processor executes visualization software which provides for visualization of a collection of objects on the display device. The objects may reside in a three-dimensional space and thus admit the possibility of occluding one another.

The visualization software represents space in terms of a hierarchy of cones emanating from the viewpoint. In one embodiment, the leaf-cones of the cone hierarchy subtend an area which corresponds to a fraction of a pixel in screen area. For example, two cones may conveniently fill the area of a pixel. In other embodiments, a leaf-cone may subtend areas which include one or more pixels.

An initial view frustum or neighborhood of the view frustum may be recursively tessellated (i.e. refined) to generate a cone hierarchy. Alternatively, the entire space around the viewpoint may be recursively tessellated to generate the cone hierarchy. In this case, the cone hierarchy does not need to be recomputed for changes in the viewpoint and view-direction.

The visualization software may also generate a hierarchy of bounds from the collection of objects. In particular, the bounding hierarchy may be generated by: (a) recursively grouping clusters starting with the objects themselves as order-zero clusters, (b) bounding each object and cluster (of all orders) with a corresponding bound, e.g. a polytope hull, (c) allocating a node in the bounding hierarchy for each object and cluster, and (d) organizing the nodes in the bounding hierarchy to reflect cluster membership. For example if node A is the parent of node B, the cluster corresponding to node A contains a subcluster (or object) corresponding to node B. Each node stores parameters which characterize the bound of the corresponding cluster or object.

The visualization software may perform a search of the cone hierarchy and bounding hierarchy starting with the root cone and the root bound respectively. In one embodiment, each leaf-cone may store N object distances and N object pointers corresponding to the N closest known objects as perceived within the leaf cone from the common vertex (i.e. viewpoint) of the cone hierarchy. Each leaf cone may additionally store a visibility distance value which represents the distance to the $N^{th}$ closest object, i.e. the last of the N closest objects. Similarly, each non-leaf cone may be assigned a visibility distance value. However, the visibility distance value of a non-leaf cone is set equal to the maximum of the visibility distance values for its subcone children. This implies that the visibility distance value for each non-leaf cone equals the maximum of the visibility distance values of its leaf-cone descendents.

The dual-tree search may be illustrated in terms of a first cone of the cone tree structure and a first bound of the bound tree structure. The processor may compute a cone size for the first cone and a bound size for the first bound, and may compare the cone size and the bound size. If the bound size is larger than the cone size, the processor may conditionally search subbounds of the first bound with respect to the first cone. A subbound of the first bound may be searched against the first cone if the subbound achieves a cone-bound distance with respect to the first cone which is smaller than the visibility distance value associated with the first cone.

If the cone size is larger than the bound size, the processor may conditionally search subcones of the first cone with respect to the first bound. A subcone of the first cone may be searched against the first bound if the subcone achieves a cone-bound distance with respect to the first bound which is smaller than the visibility distance value of the subcone.

Eventually the dual-tree search reaches a leaf cone of the cone hierarchy and a leaf bound of the bounding hierarchy. In response to attaining a leaf cone and a leaf bound, the processor may:

(a) compute a cone-bound distance for the leaf bound with respect to the leaf cone;

(b) determine if the cone-bound distance is smaller than the visibility distance value associated with the leaf cone;

(c) update the sequence of nearest object distances corresponding to the leaf cone based on the cone-bound distance; and (d) update the sequence of nearest object pointers corresponding to the leaf cone with an object pointer associated with the leaf bound.

Operations (c) and (d) may be performed in response to determining that the cone-bound distance is smaller than the visibility distance value associated with the leaf cone. The sequence of nearest object positions is ordered by magnitude. The processor determines where the cone-hull distance belongs in the sequence of nearest object distances and injects the cone-hull distance in the sequence of nearest object distances at the appropriate sequence position. The processor also injects the object pointer associated with the leaf bound at the same relative position in the sequence of nearest object pointers. Upon completing the dual-tree search, the processor may transmit the nearest object pointers (or a stream of triangles corresponding to the nearest object pointers) for the leaf cone to a rendering agent for rendering and display. The rendering agent may comprise a hardware rendering unit. In an alternative embodiment, the rendering agent may comprise a software renderer also executed by the processor.

After the update operations (c) and (d), the processor may set the visibility distance value for the leaf cone equal to a $N^{th}$ object distance, i.e. the last of the N nearest object distances.

In some embodiments, each leaf bound of the bounding hierarchy may be classified as an occluder or an non-occluder. For example, a leaf bound with volume VLB which contains an object with volume VO may be classified as an occluder or nonoccluder based on the magnitude of volume ratio VO/VLB. A variety of methods are contemplated for the occluder/non-occluder classification. In addition to determination (b), the processor may determine if the leaf bound is an occluder. Update operations (c) and (d) may be performed only for occluders, i.e. occluding leaf bounds. In contrast, leaf bounds that are determined to be non-occluders may be stored in a non-occluder buffer associated with the leaf cone, i.e. the cone-bound distance and object pointer associated with the leaf bound may be stored in the non-occluder buffer. Thus, the dual-tree search may identify, for each leaf cone, the N closest occluders and all non-occluders closer than the $N^{th}$ occluder, subject to storage limits in the non-occluder buffer(s). Upon completing the dual-tree search, the processor may transmit the nearest object pointers (i.e. the occluder pointers) and the non-occluder pointers (from the non-occluder buffer) to the rendering agent.

In other embodiments, each leaf bound may be assigned an occlusion metric value. The occlusion metric value may measure an extent of occlusion of the leaf bound. For example, the occlusion metric value for a leaf bound may be proportional to the cube root of the volume of the leaf bound. In one embodiment, the occlusion metric value may be proportional to the square root of a maximal bounding area for the leaf bound. In another embodiment, the occlusion metric value may be proportional to a diameter (e.g. a maximal diameter) or an average of multiple diameters of the leaf bound. A variety of methods are contemplated for assigning an occlusion metric value to a leaf bound. Each leaf cone may store three lists which describe a collection of nearest leaf bounds (or nearest objects) as perceived within the leaf cone. A leaf cone stores a list of nearest object pointers, a list of corresponding object distances, and a list of corresponding occlusion values. The lists may expand and contract as leaf bounds are discovered during the dual-tree search.

In response to attaining a leaf bound and a leaf cone in the dual-tree search, the processor may:

(a) compute a cone-bound distance for the leaf bound with respect to the leaf cone;

(b) determine if the cone-bound distance is smaller than the visibility distance value associated with the leaf cone;

(c) update the list of object distances corresponding to the leaf cone based on the cone-bound distance;

(d) update the list of nearest object pointers corresponding to the leaf cone with an object pointer associated with the leaf bound; and (e) update the list of occlusion values with the occlusion metric value of the leaf bound.

Operations (c), (d) and (e) may be performed in response to determining that the cone-bound distance is smaller than the visibility distance value associated with the leaf cone. The processor may continue to add to the three lists for each discovered leaf bound until the sum of the occlusion values reaches an occlusion threshold. When the occlusion threshold is reached, the view of the leaf cone may be assumed to be totally occluded with the currently gathered objects. After the occlusion threshold has been reached, the processor may add a closer leaf bound and flush one or more of the farthest leaf bounds from the three lists so that the sum of the occlusion values remains less than or equal to the occlusion threshold.

In one set of embodiments, each leaf cone of the cone hierarchy may point to (or store) a collection of probe cones. Probe cones may comprise a subset of the cones from one or more levels below the leaf cone level. The probe cones for a given leaf cone may sample (e.g. uniformly sample) the space subtended by the leaf cone. The processor may perform the dual-tree search to determine a first visible object (e.g. a closest object, or a farthest of N closest objects) for a given leaf cone, and subsequently, may perform a search of the bound hierarchy with respect to probe cones of the leaf cone to determine one or more additional visible objects for the leaf cone. Because the probe cones are smaller than the corresponding leaf cone, they may be able to "see" objects beyond (e.g. around the edges of) the first visible object. After the dual-tree search and the subsequent search, the processor may transmit an indication of the first visible object and the one or more additional visible objects for the given leaf cone to the rendering agent for rendering and display.

In one embodiment, the search of a bound hierarchy with respect to a probe cone may be accelerated by searching a candidate bound only if it achieves a cone-bound distance with respect to the probe cone which is greater than or equal to the known distance to the first visible object determined by the dual-tree search.

BRIEF DESCRIPTION OF THE FIGURES

The foregoing, as well as other objects, features, and advantages of this invention may be more completely understood by reference to the following detailed description when read together with the accompanying drawings in which:

FIG. 4A illustrates a collection of objects in a graphics environment;

FIG. 4B illustrates a first step in one embodiment of a method of forming a hull hierarchy, i.e. the step of bounding objects with bounding hulls and allocating hull nodes for the bounding hulls;

FIG. 4C illustrates one embodiment of the process of grouping together hulls to form higher order hulls, and allocating nodes in the hull hierarchy which correspond to the higher order hulls;

FIG. 4D illustrates one embodiment of the culmination of the recursive grouping process wherein all objects are contained in a universal bounding hull which corresponds to the root node of the hull hierarchy;

Figure 1:
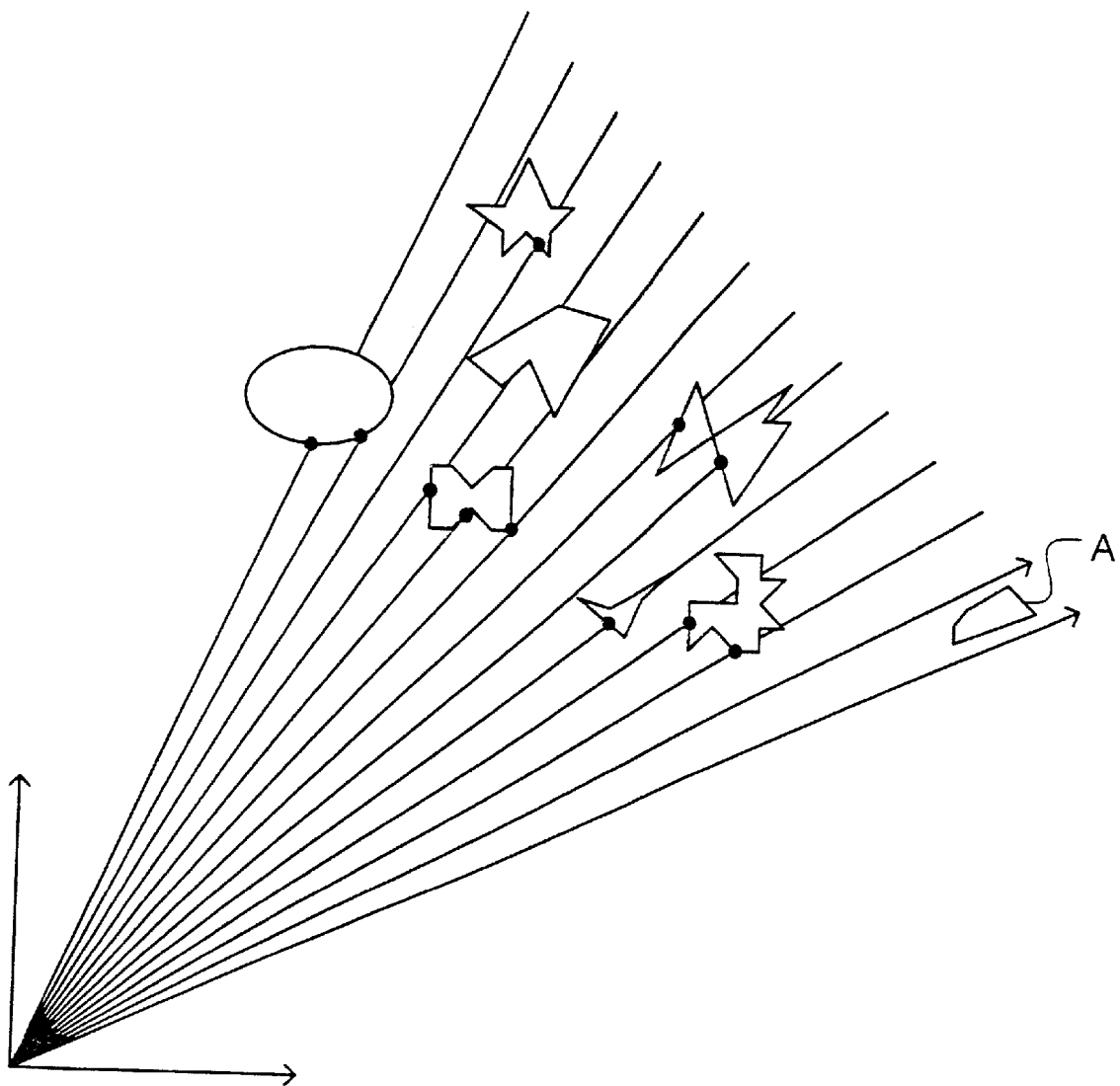
FIG. 1 illustrates the ray-based method of visible object detection according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF SEVERAL EMBODIMENTS

Figure 2A:
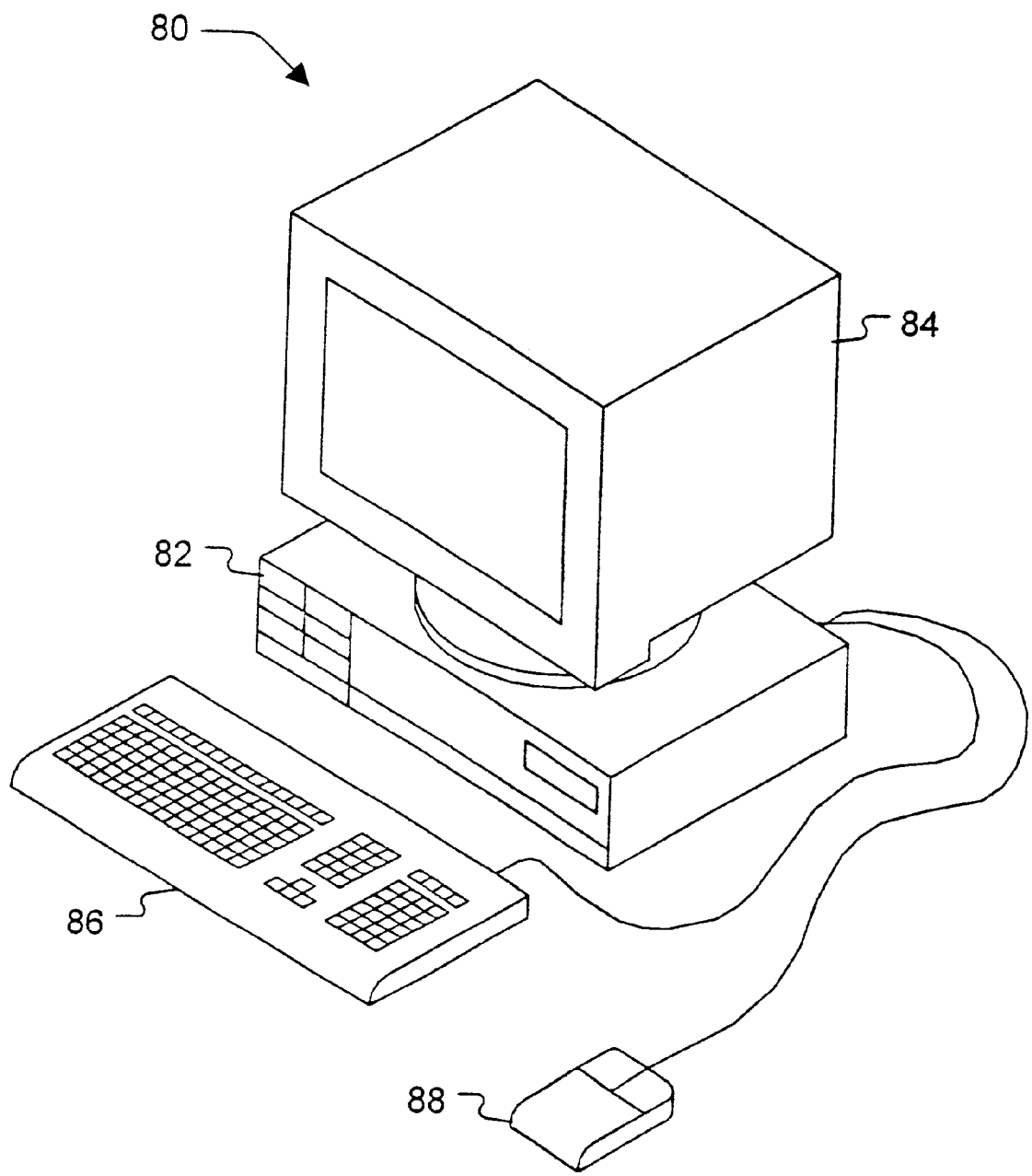
FIG. 2A illustrates one embodiment of a graphical computing system for performing visible object determination.

FIG. 2A presents one embodiment of a graphical computing system 80 for performing visible object determination. Graphical computing system 80 may include a system unit 82, and a display device 84 coupled to the system unit 82. The display device 84 may be realized by any of various types of video monitors or graphical displays. Graphics computer system 80 may include a keyboard 86 and a mouse 88.

Figure 2B:
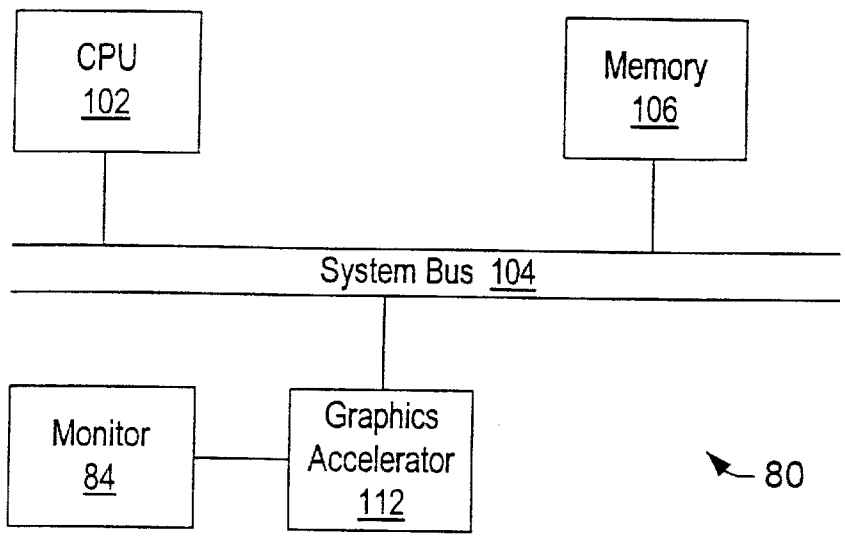
FIG. 2B is a block diagram illustrating one embodiment of the graphical computing 80.

FIG. 2B is a block diagram illustrating one embodiment of graphical computing system 80. Graphical computing system 80 may include a host central processing unit (CPU) 102 coupled to a high speed bus or system bus 104. A system memory 106 may also be coupled to system bus 104. The system memory 106 may include any of various types of memory subsystems including random access memory, read only memory, and/or mass storage devices. The host processor 102 may execute a visualization software program which determines the set of visible objects in a scene. The visualization software program may be stored in system memory 106. In an alternative embodiment, the visualization software program executes on one or more processors comprised within graphics accelerator 112.

In some embodiments, a 3-D graphics accelerator 112 may be coupled to system bus 104. If 3D accelerator 112 is not included in graphical computing system 80, then display device 84 may couple directly to system bus 104. It is assumed that various other peripheral devices, or other buses, may be connected to system bus 104, as is well known in the art. Display device 84 may couple to 3-D graphics accelerator 112. CPU 102 may transfer information to and from the graphics accelerator 112 according to a programmed input/output (I/O) protocol over the system bus 104. In one embodiment, the graphics accelerator 112 may access system memory 106 according to a direct memory access (DMA) protocol or through intelligent bus mastering.

3-D graphics accelerator 112 may be a specialized graphics rendering subsystem which is designed to off-load the 3-D rendering functions from the host processor. In a system with a 3-D graphics accelerator, a graphics application program executing on the host processor 102 may generate three-dimensional geometry data that defines three-dimensional graphics elements. The application program may transfer the geometry data to the graphics accelerator 112. The graphics accelerator 112 may receive the geometry data and render the corresponding graphics elements on the display device. A fundamental goal of computer graphics is to render objects that are realistic to the user. The problem of visual realism, however, is quite complex. Objects in the "real world" include an incredible amount of detail, including subtle variations in color, reflections, and surface irregularities. Applications which display three-dimensional graphics require a tremendous amount of processing bandwidth.

The computer system 80 may include visualization software configured to operate on a collection of objects to determine a visible subset of the objects with respect to a viewpoint in a coordinate space. The visualization software may be executed by the host processor 102, and/or by one or more processors comprised within the graphics accelerator 112.

Visualization Software Architecture

Figure 3:
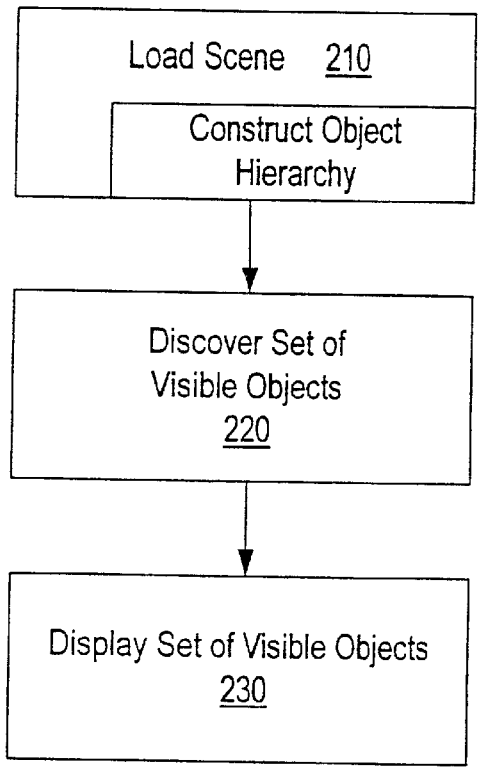
FIG. 3 illustrates several main phases of one embodiment of a visualization program.

FIG. 3 illustrates one embodiment of the visualization software. In an initial step 210, the visualization software may load a scene. The scene may comprise a plurality of objects. Scene loading may include constructing an object hierarchy—if it has not already been constructed. In step 220, the visualization software may discover the set of visible objects in the scene with respect to a current viewpoint. In the preferred embodiment, the visualization software may be configured to compute visibility for three-dimensional objects from a view point in a three-dimensional coordinate space. However, the methodologies herein described naturally generalize to spaces of arbitrary dimension.

In one embodiment of the visualization software, the viewpoint in the graphical environment may be changed in response to user input. For example, by manipulating mouse 88 and/or depressing keys on keyboard 86, the user may cause the viewpoint and/or view orientation to change. Thus, the visualization software may recompute the set of visible objects whenever the viewpoint and/or the view orientation changes.

In step 230, the visualization software may display the visible objects (or visible portions of objects). For example, the visualization software may command the graphics accelerator 112 to render the visible objects on the display screen. Discovery and display of the visible object set may be performed repeatedly as the viewpoint and/or view direction (i.e. orientation) changes, and/or as the objects themselves evolve in time. The discovery and display steps may be performed as concurrent processes. However, in alternative embodiments, they may be performed sequentially.

In some embodiments, objects may be modeled as convex polytopes. A three-dimensional solid is said to be convex if any two points in the solid (or on the surface of the solid) may be connected with a line segment which resides entirely within the solid. Thus a solid cube is convex, while a donut is not. A polytope is an object with planar sides (e.g. cube, tetrahedron, etc.). Although not all objects are convex, every object can be approximated as a union of convex polytopes. It is helpful to note that the visible-object-set computation does not require an exact computation, but rather a conservative one. In other words, it is permissible to over-estimate the set of visible objects.

Constructing the Object Hierarchy

Initially, the objects in a scene may be organized into a hierarchy that groups objects spatially. An octree is one possibility for generating the object hierarchy. However, in the preferred embodiment, a clustering algorithm is used which groups nearby objects then recursively clusters pairs of groups into larger containing spaces. The clustering algorithm employs a simple distance measure and thresholding operation to achieve the object clustering. FIGS. 4A–4D illustrate one embodiment of a clustering process for a collection of four objects J00 through J11. The objects are indexed in a fashion which anticipates their ultimate position in a binary tree of object groups. The objects are depicted as polygons situated in a plane (see FIG. 4A). However, the reader may imagine these objects as arbitrary three-dimensional objects. In one embodiment, the objects are three-dimensional polytopes.

Each object may be bounded, i.e. enclosed, by a corresponding bounding surface referred to herein as a bound. In one embodiment, the bound for each object is a polytope hull (i.e. a hull having planar faces) as shown in FIG. 4B. The hulls H00 through H11 are given labels which are consistent with the objects they bound. For example, hull H00 bounds object J00. The hulls are illustrated as rectangles with sides parallel to a pair of coordinate axes. These hulls are intended to represent rectangular boxes (parallelepipeds) in three dimensions whose sides are normal to a fixed set of coordinate axes. For each hull a corresponding node data structure is generated. The node stores parameters which characterize the corresponding hull.

Figure 5A:
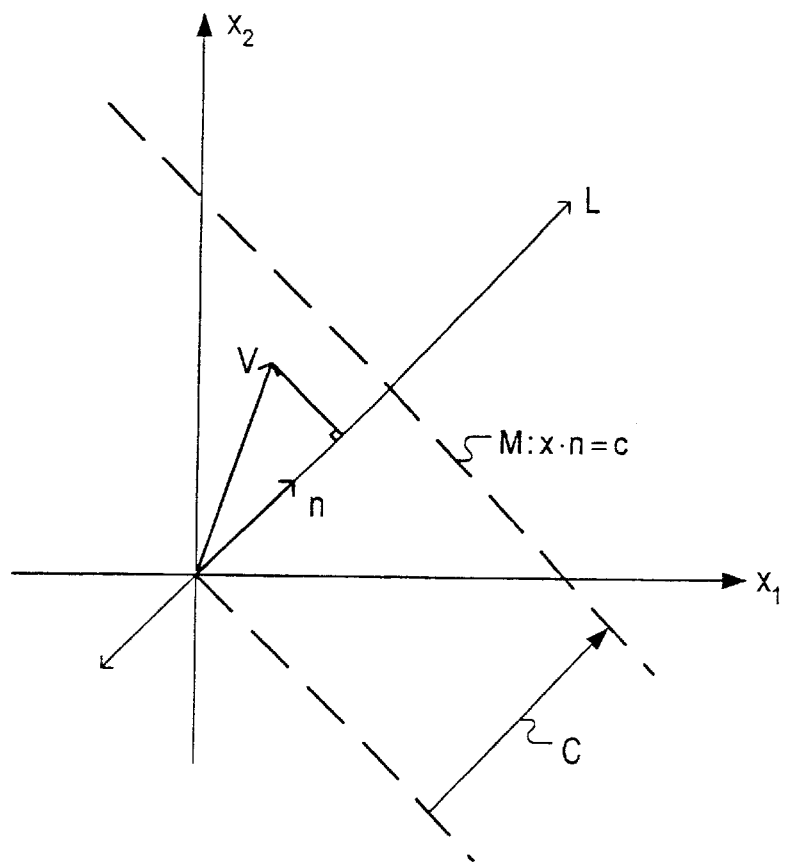
FIG. 5A illustrates the mathematical expressions which describe lines and half-planes in two dimensional space.

Since a hull has a surface which is comprised of a finite number of planar components, the description of a hull is intimately connected to the description of a plane in three-space. In FIG. 5A, a two dimensional example is given from which the equation of an arbitrary plane may be generalized. A unit vector n [any vector suffices but a vector of length one is convenient for discussion] defines a line L through the origin of the two dimensional space. By taking the dot product v·n of a vector v with the unit vector n, one obtains the length of the projection of vector v in the direction defined by unit vector n. Thus, given a real constant c, it follows that the equation x·n=c, where x is a vector variable, defines a line M perpendicular to line L and situated at a distance c from the origin along line L. In the context of three-dimensional space, this same equation defines a plane perpendicular to the line L, again displaced distance c from the origin along line L. Observe that the constant c may be negative, in which case the line (or plane) M is displaced from the origin at distance |c| along line L in the direction opposite to unit vector n.

The line x·n=c divides the plane into two half-planes. By replacing the equality in the above equation with an inequality, one obtains the description of one of these half-planes. The equality x·n<c defines the half-plane which contains the negative infinity end of line L. [The unit vector n defines the positive direction of line L.] In three dimensions, the plane x·n=c divides the three-dimensional space into two half-spaces. The inequality x·n<c defines the half-space which contains the negative infinity end of line L.

Figure 5B:
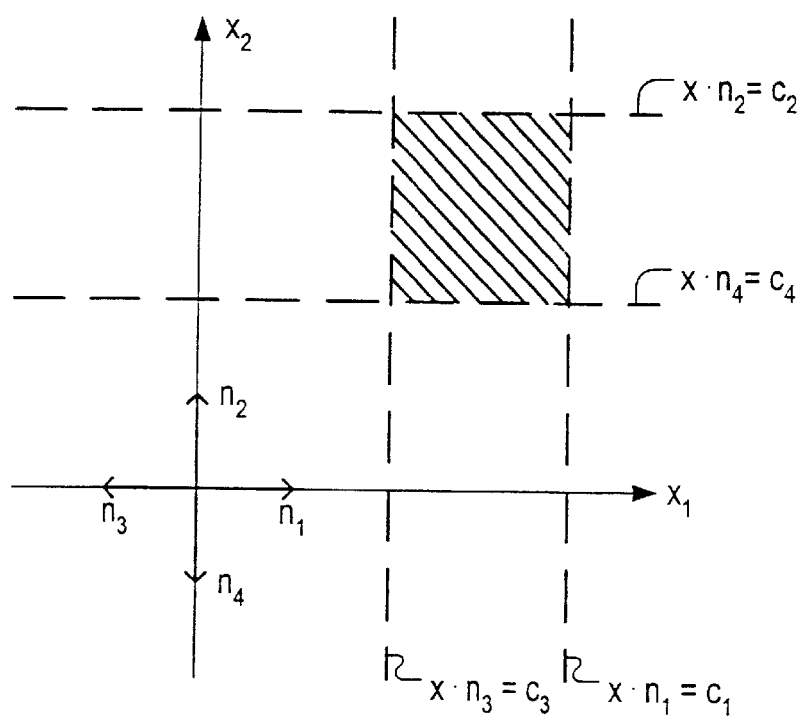
FIG. 5B illustrates the description of a rectangular region as the intersection of four half-planes in a two dimensional space.

FIG. 5B shows how a rectangular region may be defined as the intersection of four half-planes. Given four normal vectors $n_1$ through $n_4$, and four corresponding constants $c_1$ through $c_4$, a rectangular region is defined as the set of points which simultaneously satisfy the set of inequalities $x \cdot n_i < c_i$, where i ranges from one to four. This system of inequalities may be summarized by the matrix-vector expression N·x<c, where the rows of matrix N are the normal vectors $n_1$ through $n_4$, and the components of vector c are the corresponding constants $c_1$ through $c_4$. If the normal vectors are chosen so as to lie in the positive and negative axial directions (as shown in FIG. 5B), the resulting rectangular region has sides parallel to the axes. It is noted that the rectangular hulls H00 through H11 shown in FIG. 4B all use a common set of normal vectors. Thus, each hull is characterized by a unique c vector.

In three-dimensional space, a rectangular box may be analogously defined as the intersection of six half-spaces. Given six normal vectors $n_1$ through $n_6$, oriented in each of the three positive and three negative axial directions, and six corresponding constants $c_1$ through $c_6$, the simultaneous solution of the inequalities $x \cdot n_i < c_i$, where i runs from one to six, defines a rectangular box with sides parallel to the coordinate planes. Thus, a rectangular box may be compactly represented with the same matrix-vector expression Nx<c, where matrix N now has six rows for the six normal vectors, and vector c has six elements for the six corresponding constants.

To construct an object hierarchy, object hulls H00 through H11 are paired together as shown in FIG. 4C. Each pair of object hulls is bounded by a bounding hull. For example, hulls H00 and H01 are paired together and bounded by bounding hull H0. Containing-hull H0 contains the two component hulls H00 and H01. Likewise, object hulls H10 and H11 are paired together and bounded by containing-hull H1. In addition, two parent nodes are generated in the object hierarchy, one for each of the containing-hulls H0 and H1. For simplicity, the parent nodes are commonly labeled as their corresponding containing-hulls. Thus, parent node H0 points to its children nodes H00 and H01, while parent node Hi points to its children nodes H10 and H11. Each parent node contains the characterizing c vector for the corresponding containing-hull.

The containing-hulls H0 and H1 may be referred to as first order containing-hulls since they are the result of a first pairing operation on the original object hulls. A second pairing operation is applied to the first-order bounding hulls to obtain second-order containing-hulls. Each second-order containing-hull contains two first-order hulls. For each of the second-order containing-hulls a parent node is generated in the object hierarchy. The parent node reflects the same parent-child relationship as the corresponding second-order containing-hull. For example, in FIG. 4D, second-order containing-hull H contains first-order containing-hulls H0 and H1. Thus, parent node H in the object hierarchy points to children nodes H0 and H1. Parent node H stores the characterizing vector c for the containing-hull H. In the example presented in FIGS. 4A–4D, the object hierarchy is complete after two pairing operations since the original object collections contained only four objects.

In general, a succession of pairing operations is performed. At each stage, a higher-order set of containing-hulls and corresponding nodes for the object hierarchy are generated. Each node contains the describing vector c for the corresponding containing-hull. At the end of the process, the object hierarchy comprises a binary tree with a single root node. The root node corresponds to a total containing-hull which contains all sub-hulls of all orders including all the original object-hulls. The object hierarchy, because it comprises a hierarchy of bounding hulls, will also be referred to as the hull hierarchy. In the preferred embodiment, the pairing operations are based on proximity, i.e. objects (and hulls of the same order) are paired based on proximity. This tree of bounding hulls provides a hierarchical representation of the entire scene. For instance, when a cone completely misses a node's containing-hull, none of the node's descendents need to be examined.

Bounding hulls (i.e. containing hulls) serve the purpose of simplifying and approximating objects. Any hierarchy of bounding hulls works in principle. However, hierarchies of hulls based on a common set of normal vectors are particularly efficient computationally. A collection of hulls based on a common set of normal vectors will be referred to herein as a fixed-direction or commonly-generated collection. As described above, a polytope hull is described by a bounding system of linear inequalities $\{x: Nx \leq c\}$, where the rows of the matrix N are a set of normal vectors, and the elements of the vector c define the distances to move along each of the normal vectors to obtain a corresponding side of the polytope. In a fixed-direction collection of hulls, the normal matrix N is common to all the hulls in the collection, while the vector c is unique for each hull in the collection. The problem of calculating the coefficient vector c for a bounding hull given a collection of subhulls may be simplified when a common set of normal vectors is used. In addition, the nodes of the hull hierarchy may consume less memory space since the normal matrix N need not be stored in the nodes. In some embodiments, the hull hierarchy comprises a fixed-direction collection of hulls.

In a first embodiment, six normal vectors oriented in the three positive and three negative axial directions are used to generate a fixed-direction hierarchy of hulls shaped like rectangular boxes with sides parallel to the coordinate planes. These axis-aligned bounding hulls provide a simple representation that may have desirable local computational properties. It is easy to transform or compare two axis-aligned hulls.

In a second embodiment, eight normal vectors directed towards the corners of a cube are used to generate a hierarchy of eight-sided hulls. For example, the eight vectors (±1, 1, 1) may be used to generate the eight-sided hulls. The octahedron is a special case of this hull family.

In a third embodiment, fourteen normal vectors, i.e. the six normals which generate the rectangular boxes plus the eight normals which generate the eight-sided boxes, are used to generate a hull hierarchy with fourteen-sided hulls. These fourteen-sided hulls may be described as rectangular boxes with corners shaved off. It is noted that as the number of normal vectors and therefore side increases, the accuracy of the hull's approximation to the underlying object increases.

In a fourth embodiment, twelve more normals are added to the fourteen normals just described to obtain a set of twenty-six normal vectors. The twelve additional normals serve to shave off the twelve edges of the rectangular box in addition to the corners which have already been shaved off. This results in twenty-six sided hulls. For example, the twelve normal vectors (±1, 1, 0), (±1,0,±1), and (0, ±1, ±1) may be used as the additional vectors.

In the examples given above, hulls are recursively grouped in pairs to generate a binary tree. However, in other embodiments, hulls are grouped together in groups of size G, where G is larger than two. In one embodiment, the group size varies from group to group.

Although the above discussion has focussed on the use of polytope hulls as bounds for object and clusters, it is noted that any type of bounding surfaces may be used, thereby generating a hierarchy of bounds referred to herein as a bounding hierarchy. Each node of the bounding hierarchy corresponds to an object or cluster and stores parameters which characterize the corresponding bound for that object or cluster. For example, polynomial surfaces such as quadratic surfaces may be used to generate bounds for objects and/or clusters. Spheres and ellipsoids are examples of quadratic surfaces.

Cones in Visible Object Determination

In addition to the bounding hierarchy (e.g. hull hierarchy) discussed above, the visualization software makes use of a hierarchy of spatial cones. An initial cone which may represent the view frustum may be recursively subdivided into a hierarchy of sub-cones. Then a simultaneous double recursion may be performed through the pair of trees (the object tree and cone tree) to rapidly determine the set of visible objects. This cone-based method provides a substantial computational gain over the prior art method based on ray-casting.

Figure 6:
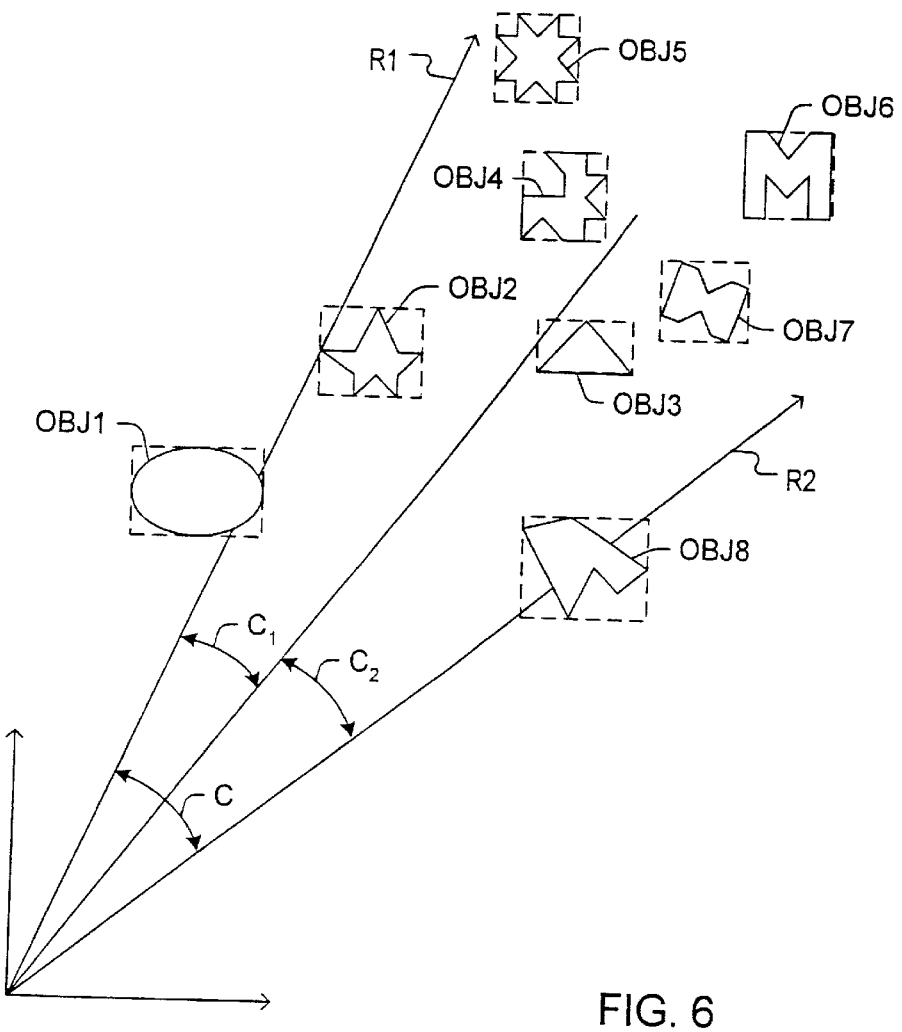
FIG. 6 illustrates one embodiment of a two-dimensional cone partitioned into a number of subcones which interact with a collection of objects by means of wavefronts propagating within each of the subcones.

FIG. 6 illustrates a two-dimensional cone C in a two-dimensional environment. Cone C is defined by the region interior to the rays R1 and R2 (and inclusive of those rays). Cone C is partitioned into two subcones denoted C0 and C1. The ambient space is populated with a collection of two-dimensional objects OBJ1 through OBJ8. Each of the two-dimensional hulls is bounded by a corresponding rectangular hull. Six of the objects are visible with respect to cone C, i.e. objects OBJ1, OBJ2, OBJ3, OBJ4, OBJ7 and OBJ8. Objects OBJ1, OBJ2 and OBJ4 are visible with respect to subcone C1, and objects OBJ3, OBJ7 and OBJ8 are visible with respect to subcone C2. Object OBJ5 is occluded by objects OBJ2 and OBJ4, and object OBJ6 is occluded by objects OBJ3 and OBJ7.

Polyhedral Cones

Figure 7:
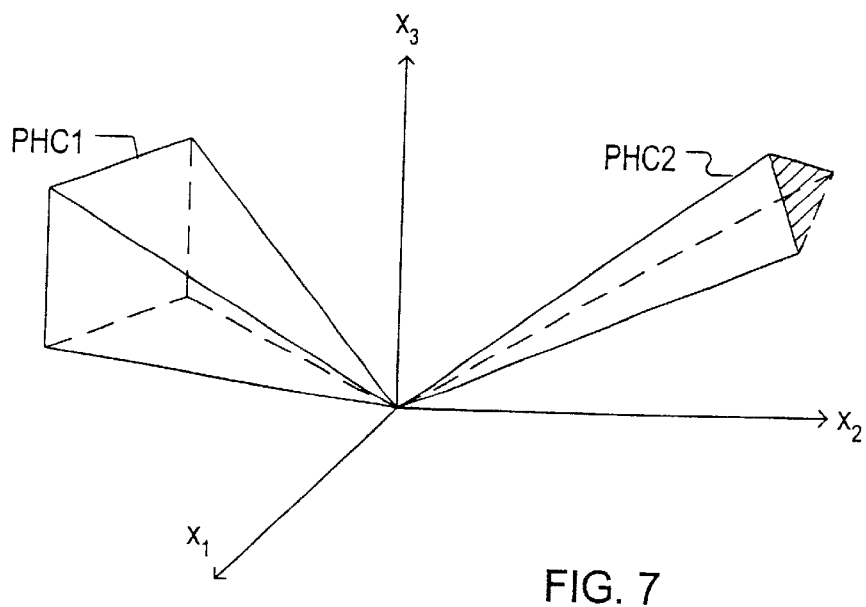
FIG. 7 illustrates polyhedral cones with rectangular and triangular cross-section emanating from the origin.
Figure 8A:
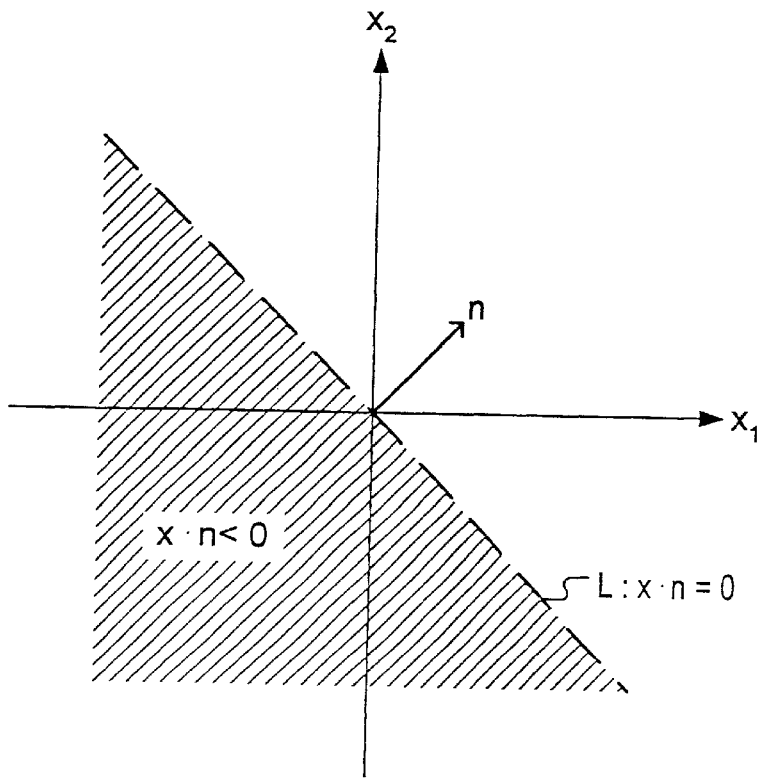
FIG. 8A illustrates mathematical expressions which describe a line through the origin and a corresponding half-plane given a normal vector in two-dimensional space.

The spatial cones used in the preferred embodiment are polyhedral cones. The generic polyhedral cone has a polygonal cross-section. FIG. 7 gives two examples of polyhedral cones. The first polyhedral cone PHC1 has a rectangular cross-section, while the second polyhedral cone PHC2 has a triangular cross-section. The view frustum is a cone with rectangular cross-section like cone PHC1. Polyhedral cones may be defined by homogeneous linear inequalities. Given a normal vector n, the equation n·x=0 involving vector argument x defines a plane passing through the origin and perpendicular to the normal vector n. This plane divides space into two half-spaces. The linear inequality n·x<0 defines the half-space from which the normal vector n points outward. FIG. 8A gives a two-dimensional example. As shown, the equation n·x=0 specifies the set of points (interpreted as vectors) which are perpendicular to normal n. This perpendicular line L divides the plane into two half-planes. The half-plane defined by the inequality n·x<0 is denoted by shading. Observe that the normal vector n points out of this half-plane.

Figure 8B:
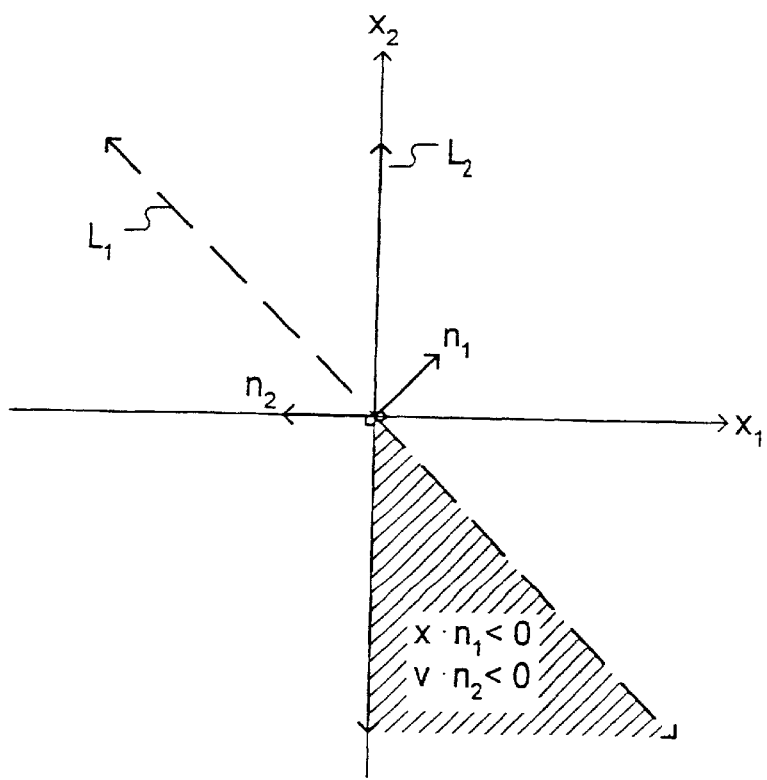
FIG. 8B illustrates the specification of a two-dimensional conic region as the intersection of two half-planes.

A polyhedral cone is constructed by intersection of multiple half-spaces. For example, solid cone PHC2 of FIG. 7 is the intersection of three half-spaces. Similarly, solid cone PHC1 is the intersection of four half-spaces. FIG. 8B provides a two-dimensional example of intersecting half-planes to generate a conic area. The two normal vectors $n_1$ and $n_2$ define perpendicular lines $L_1$ and $L_2$ respectively. The inequality $n_1 \cdot x < 0$ specifies the half-plane which is southwest (i.e. left and below) of the line $L_1$. The inequality $n_2 \cdot x < 0$ defines the half-plane which is to the right of line $L_2$. The solution to the simultaneous system of inequalities $n_1 \cdot x < 0$ and $n_2 \cdot x < 0$ is the intersection region denoted in shading. This system of inequalities may be summarized by the matrix equation $Sx \leq 0$, where the rows of matrix S are the normal vectors. From this discussion, it may be observed that solid cone PHC1 of FIG. 7 is determined by four normal vectors. The normal matrix S would then have four rows (for the four normal vectors) and three columns corresponding to the dimension of the ambient space.

Thus, a polyhedral cone emanating from the origin is defined as the set of points satisfying a system of linear inequalities $Sx \leq 0$. [There is no loss of generality in assuming the origin to be the viewpoint.] According to this definition, half-spaces, planes, rays, and the origin itself may be considered as polyhedral cones. In addition, the entire space may be considered to be a polyhedral cone, i.e. that cone which is defined by an empty matrix S.

Distance Measurement

The distance of an object, hull, or bound from a particular viewpoint is defined to be the minimum distance to the object, hull, or bound from the viewpoint. So, assuming a viewpoint at the origin, the distance of the object, hull, or bound X from the viewpoint is defined as $$f(X) = \min_{x \in X} \|x\|,$$

where $\|x\|$ is the norm of vector x.

Any vector norm may be chosen for the measurement of distance. In one embodiment, the Euclidean norm is chosen for distance measurements. The Euclidean norm results in a spherically shaped wavefront. Any wavefront shape may be used as long as it satisfies a mild "star-shape" criterion, i.e.

the entire boundary of the wavefront is unobstructed when viewed from the origin. All convex wavefronts satisfy this condition, and many non-convex ones do as well. In general, the level curves of a norm are recommended as the wavefront shapes. From a computational standpoint, the spherical wavefront shape given by the $L^2$ norm, and the piecewise-linear wavefront shapes given by the $L_1$, and $L^\infty$ norms provide good choices for visibility detection. It is noted that a piecewise-linear approximation of such a norm may be used instead of the norm itself.

Cones and Visibility

Consider an arbitrary cone K emanating from the origin as a viewpoint. Define the distance of an object, hull, or bound X relative to the cone K as $$f_K(X) = \min_{x \in X \cap K} \|x\|,$$

where the symbol ∩ denotes set intersection. If the distance $f_K$ is computed for each object X in a scene, the nearest object, i.e. the object which achieves a minimum distance value $f_K$, is at least partially visible with respect to cone K.

As discussed above, the ray-based methods of the prior art are able to detect objects only up the resolution of the ray sample. Small visible objects or small portions of larger objects may be missed entirely due to insufficient ray density. In contrast, cones can completely fill space. Thus, the cone-based method disclosed herein may advantageously detect small visible objects or portions of objects that would be missed by a ray-based method with equal angular resolution.

Generalized Separation Measurement

For the purposes of performing a visibility search procedure, it is necessary to have a method for measuring the extent of separation (or conversely proximity) of objects, bounds, or hulls with respect to cones. There exists a great variety of such methods in addition to those based on minimizing vector norms defined above.

In some embodiments, the separation between a set X and a cone K may be computed based on the model of wavefront propagation. A wavefront propagating internal to the cone from the vertex of the cone and has a radius of first interaction with the set X. This radius of first interaction may provide a measurement value of the separation between the set X and the cone K. The wavefront may satisfy a mild "star shape" condition, i.e. the entire boundary of the wavefront is visible from the vertex of the cone.

In one embodiment, the measurement value is obtained by computing a penalty of separation between the set X and the cone K. The penalty of separation may be evaluated by minimizing an increasing function of separation distance between the vertex of the cone K and points in the intersection of the cone K and set X. For example, any positive power of a vector norm gives such an increasing function.

In another embodiment, the measurement value is obtained by computing a merit of proximity between the set X and the cone K. The merit of proximity may be evaluated by maximizing a decreasing function of separation distance between the vertex of the cone K and points in the intersection of the cone K and set X. For example, any negative power of a vector norm gives such a decreasing function of separation.

A Cone Hierarchy

In some embodiments, the visibility determination method uses a hierarchy of cones in addition to the hierarchy of hulls described above. The class of polyhedral cones is especially well suited for generating a cone hierarchy. Polyhedral cones naturally decompose into polyhedral subcones by the insertion of one or more separating planes. The ability to nest cones into a hierarchical structure may allow a rapid examination of object visibility. As an example, consider two neighboring cones that share a common face. By taking the union of these two cones, a new composite cone is generated. The composite cone neatly contains its children, and is thus capable of being used in querying exactly the same space as its two children. In other words, the children cones share no interior points with each other and they completely fill the parent without leaving any empty space.

A typical display and its associated view frustum has a rectangular cross-section. Vast array of possibilities are contemplated for tessellating this rectangular cross-section to generate a system of sub-cones. For example, the rectangle naturally decomposes into four rectangular cross-sections, or two triangular cross-sections. Although these examples illustrate decompositions using regular components, irregular components may be used as well.

Figure 9A:
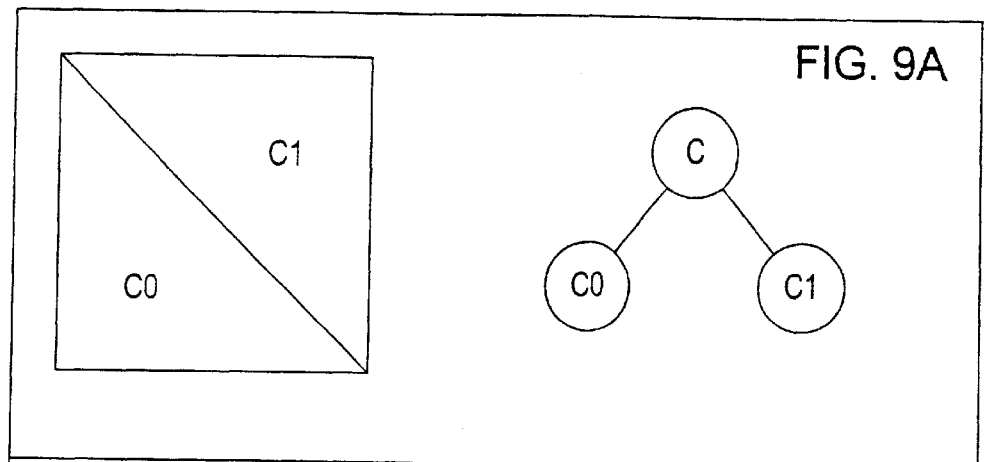
FIGS. 9A–9C illustrates one embodiment of a method for forming a cone hierarchy based on repeated subdivision of an initial cone with rectangular cross-section.
Figure 9B:
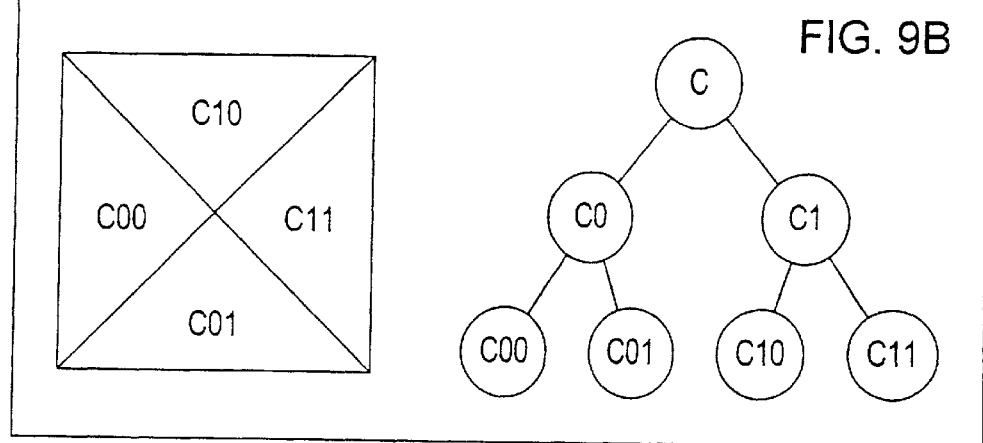
Figure 9C:
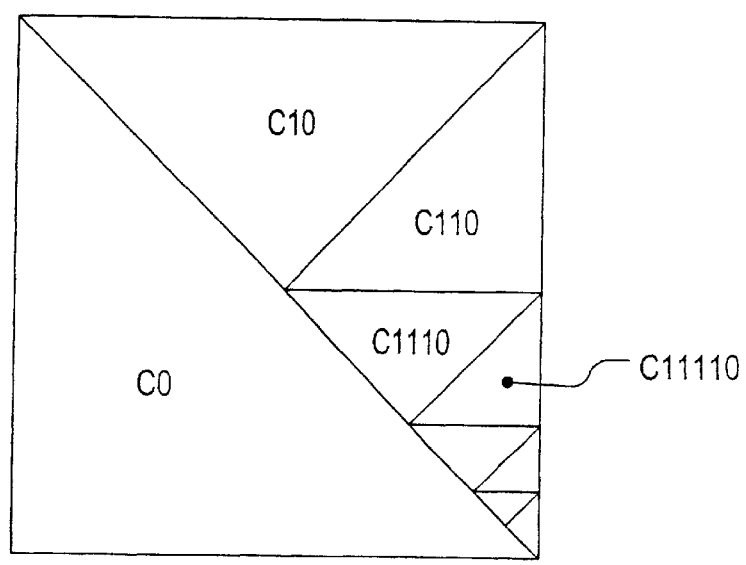

FIGS. 9A–9C illustrate a hierarchical decomposition of an initial view frustum C. FIG. 9A depicts the rectangular cross-section of the view frustum and its bisection into two cones with triangular cross-section, i.e. cones C0 and C1. The view frustum C corresponds to the root node of a cone tree. Cones and their corresponding nodes in the cone tree are identically labeled for simplicity. Each node of the cone tree stores the matrix S of normal vectors which generate the corresponding cone. The root node points to two children nodes corresponding to cones C0 and C1. FIG. 9B illustrates a second decomposition stage. Each of the cones C0 and C1 is bisected into two sub-cones (again with triangular cross-section). Cone C0 decomposes into the two sub-cones C00 and C01. Likewise, cone C1 is bisected into two sub-cones C10 and C11. Nodes are added to the cone tree to reflect the structure of this decomposition. The parent-child relation of nodes in the cone tree reflects the superset-subset relation of the respective cones in space. FIG. 9C illustrates the pattern of successive cone bisections according to one embodiment. Each cone in the hierarchy may be decomposed into two sub-cones by means a bisecting plane. FIG. 9C illustrates several successive descending bisections which generate cones C0, C10, C110, and C1110, and so on. The initial cone C (i.e. the view frustum) may be decomposed to any desired resolution. In one embodiment, the bisections terminate when the resultant cones intercept some fraction of a pixel such as, for example, ½ a pixel. The corresponding terminal nodes of the cone tree are called leaves. Alternate embodiments are contemplated where the bisections terminate when the resultant leaf-cones intercept areas which subtend (a) a portion of pixel such as 1/N where N is a positive integer, or (b) areas including one or more pixels.

The triangular hierarchical decomposition shown in FIGS. 9A–9C has a number of useful properties. By decomposing the original rectangular cone based on recursive bisection, a binary tree of cones of arbitrary depth is generated. Triangular cones have the fewest sides making them computationally more attractive. In addition, triangular cones can also tessellate the entire space surrounding the viewpoint. Imagine a unit cube with viewpoint at the center. The root cone may be the entire space. The root cone may have six subcones which intercept the six corresponding faces of the cube. Thus, it is possible to create a hierarchical cone representation for the entire space surrounding the viewpoint.

It is noted that any cone decomposition strategy may be employed to generate a cone hierarchy. In a second embodiment, the view frustum is decomposed into four similar rectangular cones; each of these subcones is decomposed into four more rectangular subcones, and so on. This results in a cone tree with four-fold branches.

As used herein, a cone K is said to be descendent of cone C when cone C is contains cone K. Thus, all the cones beneath cone C in the cone hierarchy are said to be descendents of cone C.

Discovering the Set of Visible Objects

Once the hull hierarchy and the cone hierarchy have been constructed, the set of visible objects may be computed with respect to the current viewpoint. In one embodiment, the visible object set may be repeatedly recomputed for a succession of viewpoints, viewing directions, video frames, etc. The successive viewpoints and/or viewing directions may be specified by a user through an input device such as a mouse, joystick, keyboard, trackball, head-position sensor, eye-orientation sensor, etc., or any combination thereof. The visible object determination method may be organized as a simultaneous search of the hull tree and the cone tree. The search process may involve recursively performing cone-hull queries. Given a cone node K and a hull node H, a cone-hull query on cone K and hull H investigates the visibility of hull H and its descendent hulls with respect to cone K and its descendent cones. The search process has a computational complexity of order log M, where M equals the number of cone nodes times the number of hull nodes. In addition, many cone-hull queries can occur in parallel allowing aggressive use of multiple processors in constructing the visible-object-set.

Viewing the Scene

Independently, and also concurrently, the set of visible objects from the current viewpoint may be rendered on one or more displays. The rendering can occur concurrently because the visible-object-set remains fairly constant between frames in a walkthrough environment. Thus the previous set of visible objects provides an excellent approximation to the current set of visible objects.

Managing the Visible-object-set

The visualization software may manage the visible-object-set. Over time, as an end-user navigates through a model, just inserting objects into the visible object set would result in a visible object set that contains too many objects. Thus, the visualization process may remove objects from the visible object set when those objects no longer belong to the set—or soon thereafter. A variety of solutions to object removal are possible. One solution is based on object aging. The system removes any object from the visible object set that has not been rediscovered by the cone query within a specified number of redraw cycles.

Computing Visibility using Cones

Substantial computational leverage may be provided by recursively searching the hierarchical tree of cones in conjunction with the hierarchical tree of hulls. Whole groups of cones may be tested against whole groups of hulls in a single query. For example, if a parent cone does not intersect a parent hull, it is obvious that no child of the parent cone can intersect any child of the parent hull. In such a situation, the parent hull and all of its descendants may be removed from further visibility considerations with respect to the parent cone.

Visibility Search Algorithm

A visibility search algorithm implemented as a visibility search program may perform a recursive search of the two trees (the object tree and the cone tree) to assign visible objects to leaf cones of the cone tree. The visibility search program may be stored in memory 106 and/or a memory resident within graphics accelerator 112. The host processor 102 may execute the visibility search program. In an alternate embodiment, the visibility search program executes on a processor comprised within graphics accelerator 112.

The recursive search of the two trees provides a number of opportunities for aggressive pruning of the search space. Central to the search is the object-cone distance measure defined above, i.e. given a cone K and an object (or hull) X, the object-cone distance is defined as $$f_K(X) = \min_{x \in X \cap K} \|x\|.$$

It is noted that this minimization is in general a nonlinear programming problem since the cones and object hulls are defined by constraint equations, e.g. planes in three-space. If the vector norm $\|x\|$ is the $L^1$ norm (i.e. the norm defined as the sum of absolute values of the components of vector x), the nonlinear programming problem reduces to a linear programming problem. If the vector norm $\|x\|$ is the Euclidean norm, the nonlinear programming problem reduces to a quadratic programming problem. Given a collection of objects, the object X which achieves the smallest distance $f_K(X)$ with respect to cone K is closest to the cone's viewpoint, and therefore is at least partially visible. The object which achieves the second smallest distance with respect to cone K may have a high probability of being at least partially visible depending on the solid angle subtended by the cone K. In one embodiment, the visibility search algorithm may determine up to N closest objects for each leaf cone of the cone hierarchy. In another embodiment, the visibility search algorithm may retain closest objects until the sum of occlusion metric values corresponding to the closest objects exceeds an occlusion threshold.

The recursive search starts with the root H of the hull tree and the root cone C of the cone tree (see FIGS. 4 and 9). Each node of the hull tree may specify a bounding hull which contains the hulls of all its descendant nodes. Initially the distance between the root cone and the root hull is computed. If that distance is infinite, indicating an empty intersection between the root cone and the root hull, then no cone in the cone hierarchy intersects any hull in the hull hierarchy and there are no visible objects. If the distance is finite, then further searching may be performed. Either tree may be refined at this point.

The pruning mechanism is built upon several basic elements. A distance measurement function computes the distance $f_K(X)$ of a hull X from the viewpoint of a cone K as seen from within cone K. In other words, the distance measurement function determines the cone-restricted distance to the hull X In some embodiments, the minimization associated with evaluating the distance measurement function is implemented by solving an associated linear (or non-linear) programming problem.

To facilitate the search process, a leaf cone node in the cone tree may store up to N object pointers $OBJ_1$, $OBJ_2, \ldots, OBJ_N$, and N distance values $D_1, D_2, \ldots, D_N$ for the N nearest objects known to the leaf cone, where the distance value $D_J$ and object pointer $OBJ_J$ corresponds to the $J^{th}$ nearest object for $J=1, 2, \ldots, N$. Thus, $$D_1 \leq D_2 \leq \ldots \leq D_N \leq \infty$$

These N distance values may be initialized to positive infinity. The largest distance value $D_N$, corresponding to the $N^{th}$ closest object, may be maintained as the visibility distance $VSD_C$ for the leaf-cone. Any object-hull H which achieves a cone-hull distance $d_{H,C}$ to the leaf cone which is smaller than the visibility distance value $VSD_C$ of the leaf cone may induce an update of the N closest objects and distances. The visibility search algorithm may determine where value $d_{H,C}$ fits in the system $D_1 \leq D_2 \leq \ldots \leq D_N$. For example, if N=4 and $D_2 > d_{H,C} > D_3$, the visibility search algorithm may update the object pointers and distances as follows: $D_4 \leftarrow D_3$, $D_3 \leftarrow d_{H,C}$, $OBJ_4 \leftarrow OBJ_3$, $OBJ_3 \leftarrow H$. The object contained within the object hull H becomes the new $3^{rd}$ closest object. The first and second closest objects are unaffected in this example.

The distances $D_1, D_2, \ldots, D_N$ and the visibility distance $VSD_C$ of a leaf-cone C are non-increasing, i.e. they decrease as closer objects (i.e. object hulls) are discovered in the search process. Each object pointer $OBJ_I$ may be initialized with a reserved value denoted NO_OBJECT which implies that no object has been identified as the $I^{th}$ closest object for the leaf-cone. In another embodiment, the object pointer $OBJ_1$ may be initialized with a reserved value denoted BACKGROUND which implies that a default scene background is defined as the $I^{th}$ closest object for the leaf cone.

In addition, each non-leaf cone, i.e. each cone at a non-final refinement level, is assigned a visibility distance value which equals the maximum of the visibility distance values of its sub-cones. Or equivalently, the visibility distance value for a non-leaf cone equals the maximum of the visibility distance values of its leaf-cone descendents. The visibility distance values for all non-leaf cones may be initialized to positive infinity (consistent with initialization of the leaf-cones). Suppose a given non-leaf cone K and a hull X achieve a cone-hull distance $f_K(X)$. If this distance $f_K(X)$ is greater than the visibility distance value of the cone K, then all of the leaf-cone descendents of cone K already have a full collection of N known objects closer than the hull H. Therefore, hull H may not be searched against cone K and its descendents. In contrast, if a hull H achieves a distance $f_K(X)$ from cone K which is less than the visibility distance value of cone K, it is possible that hull H contains objects which will update the set of N closest objects for some leaf-cone descendent of cone K. Thus, the hull H and its descendents may be searched against cone K and its descendents. The computation of the cone-hull distance $f_K(X)$ for cone K and hull H may be implemented by a software function Dist(H,K).

The following code fragment illustrates the beginning of the search process according to one embodiment of the visibility search algorithm. The variables hullTree and coneTree point to the root nodes of the hull tree and cone tree respectively.

```
main(hullTree, coneTree) {
   cone.extent=infinity;
   distance=Dist(hullTree, coneTree);
   if(distance<infinity)
      findVisible(hullTree, coneTree, distance);
}
```

The function Dist is used to evaluate the distance between the root hull and the root cone. If this distance is less than positive infinity, the function findVisible is called with the root hull, root cone, and their hull-cone distance as arguments. The function findVisible performs the recursive search of the two trees.

FIGS. 10A–10D illustrate one embodiment of the findVisible function (also referred to by the contraction FV). The findVisible function receives several input variables from a calling routine as illustrated by the following function prototype:

findVisible (H, C, $d_{H,C}$), where H is a hull node to be explored against the cone node C. The value $d_{H,C}$ represents the cone-hull distance between cone C and hull H.

In step 250, the findVisible function may determine if the cone C and hull H are both leaf nodes, i.e. terminal nodes of their respective trees. If so, step 255 is performed. Step 255 may comprise steps 260 and 270. In step 260, the findVisible function may determine where $d_{H,C}$ belongs in the ordered sequence of cone-specific object distances $D_1 \leq D_2 \leq \ldots \leq D_N$.

Any of various methods may be used to perform this determination. The output of step 260 may comprise an index J between 1 and N inclusive such that $D_{J-1} \leq d_{H,C} \leq D_J$. Let $D_{-1}$ equal minus infinity.

In step 270, the findVisible function may update the nearest object pointers and corresponding object distances according to the relations $D_N \leftarrow D_{N-1}$, $OBJ_N \leftarrow OBJ_{N-1}$,
$D_{N-1} \leftarrow D_{N-2}$, $OBJ_{N-1} \leftarrow OBJ_{N-2}$,
$D_{N-2} \leftarrow D_{N-3}$, $OBJ_{N-2} \leftarrow OBJ_{N-3}$,
. . . ,
$D_{J-1} \leftarrow D_J$, $OBJ_{J+1} \leftarrow OBJ_J$,
$D_J \leftarrow d_{H,C}$, $OBJ_J \leftarrow H$.

In particular, the object pointer $OBJ_J$ for the $J^{th}$ closest object is set equal to the pointer for leaf hull H, i.e. for the object contained within leaf hull H. The object distance $D_J$ for the $J^{th}$ closest object is updated with the cone-hull distance $d_{H,C}$. In addition, the visibility distance value $VSD_C$ for leaf cone C is updated with the new value of the last object distance $D_N$. Control may then be returned to the calling routine.

Figure 10A:
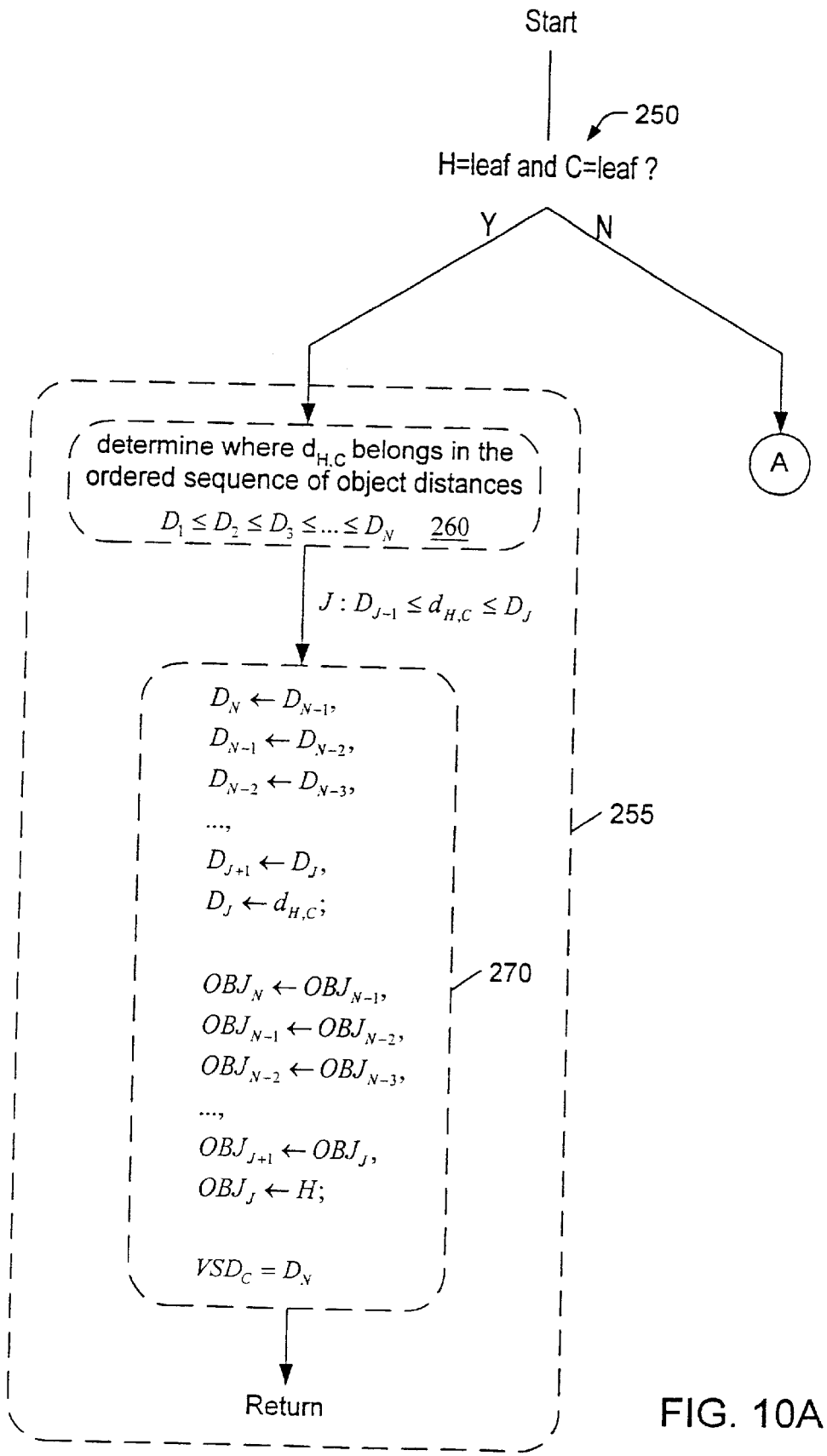
FIGS. 10A–D illustrate one embodiment of a visibility search algorithm for determining a set of N nearest object for each leaf cone in a cone hierarchy.
Figure 10B:
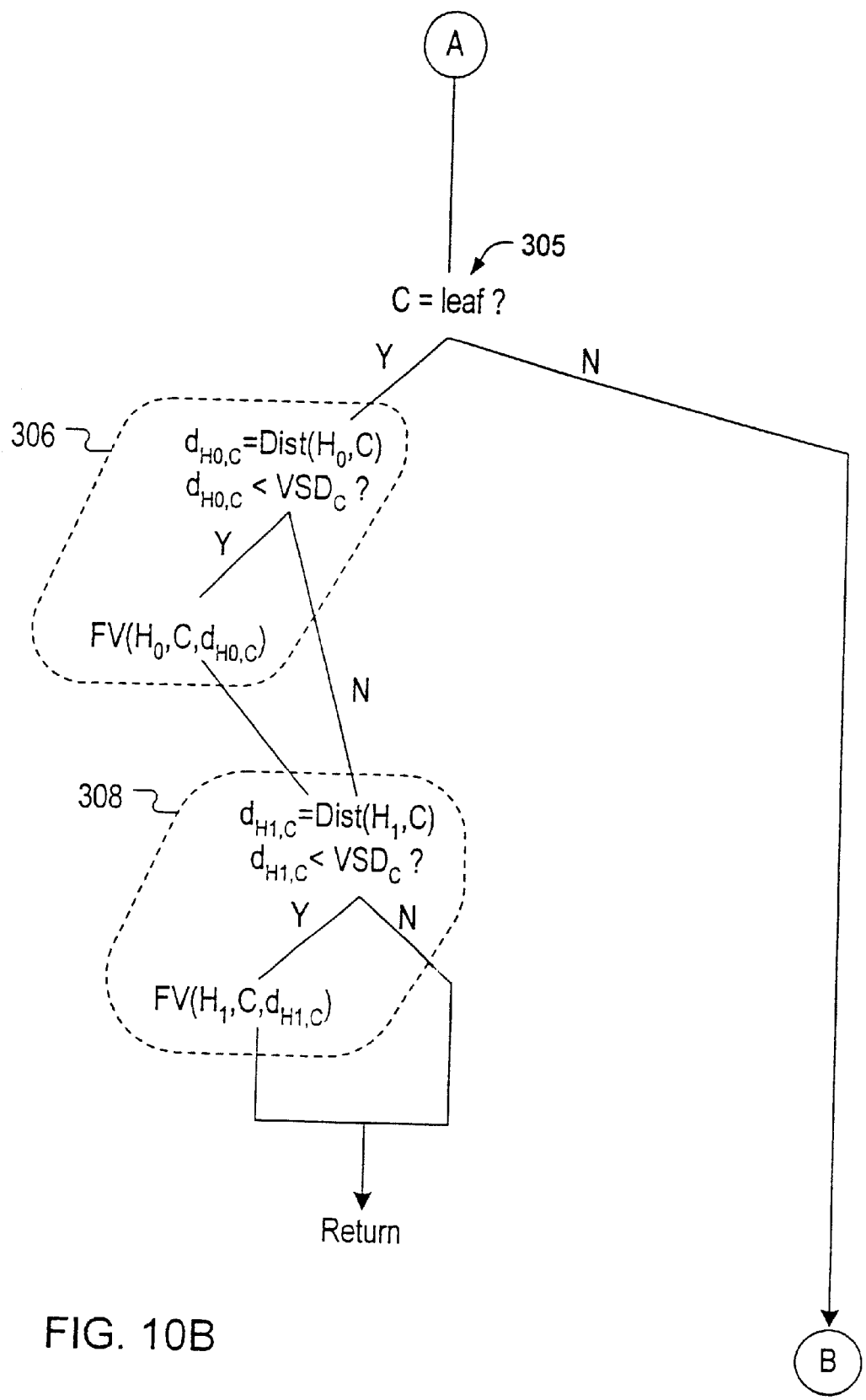

If, in step 250, the findVisible function determines that the hull H and cone C are not both leaves, step 305 may be performed as indicated in FIG. 10B. In step 305, the findVisible function may determine if the cone C is a leaf node of the cone tree. If the cone C is a leaf node of the cone tree, steps 306 and 308 may be performed.

In step 306, the findVisible function may invoke the distance function Dist to compute the cone-hull distance $d_{H0,C}$ of the subhull H0 from the origin of leaf cone C. [The children of hull H will be referred to as H0 and H1.] The findVisible function may compare the cone-hull distance $d_{H0,C}$ to the visibility distance value $VSD_C$ of leaf cone C. If the cone-hull distance $d_{H0,C}$ is smaller than the visibility distance value $VSD_C$, the findVisible function may be called again in order to search subhull H0 against leaf cone C. The cone-hull distance $d_{H0,C}$ may be provided as the distance argument for the function call. When the findVisible function finishes processing subhull H0 with respect to leaf cone C, program control passes to step 308. Furthermore, if the cone-hull distance $d_{H0,C}$ is not less than the current visibility distance, step 308 may be performed.

In step 308, the findVisible function may invoke the distance function Dist to compute the cone-hull distance $d_{H1,C}$ of the subhull H1 from the origin of leaf cone C. The findVisible function may compare the cone-hull distance $d_{H1,C}$ to the visibility distance value $VSD_C$ of leaf cone C. If the cone-hull distance $d_{H1,C}$ is smaller than the visibility distance value $VSD_C$, the findVisible function may be called again in order to search subhull H1 against leaf cone C. The cone-hull distance $d_{H1,C}$ may be provided as the distance argument for the function call. When the findVisible function finishes processing subhull H1 with respect to leaf cone C, program control returns to the calling program. Furthermore, if the cone-hull distance $d_{H1,C}$ is not less than the visibility distance value $VSD_C$, control returns to the calling program.

Figure 10C:
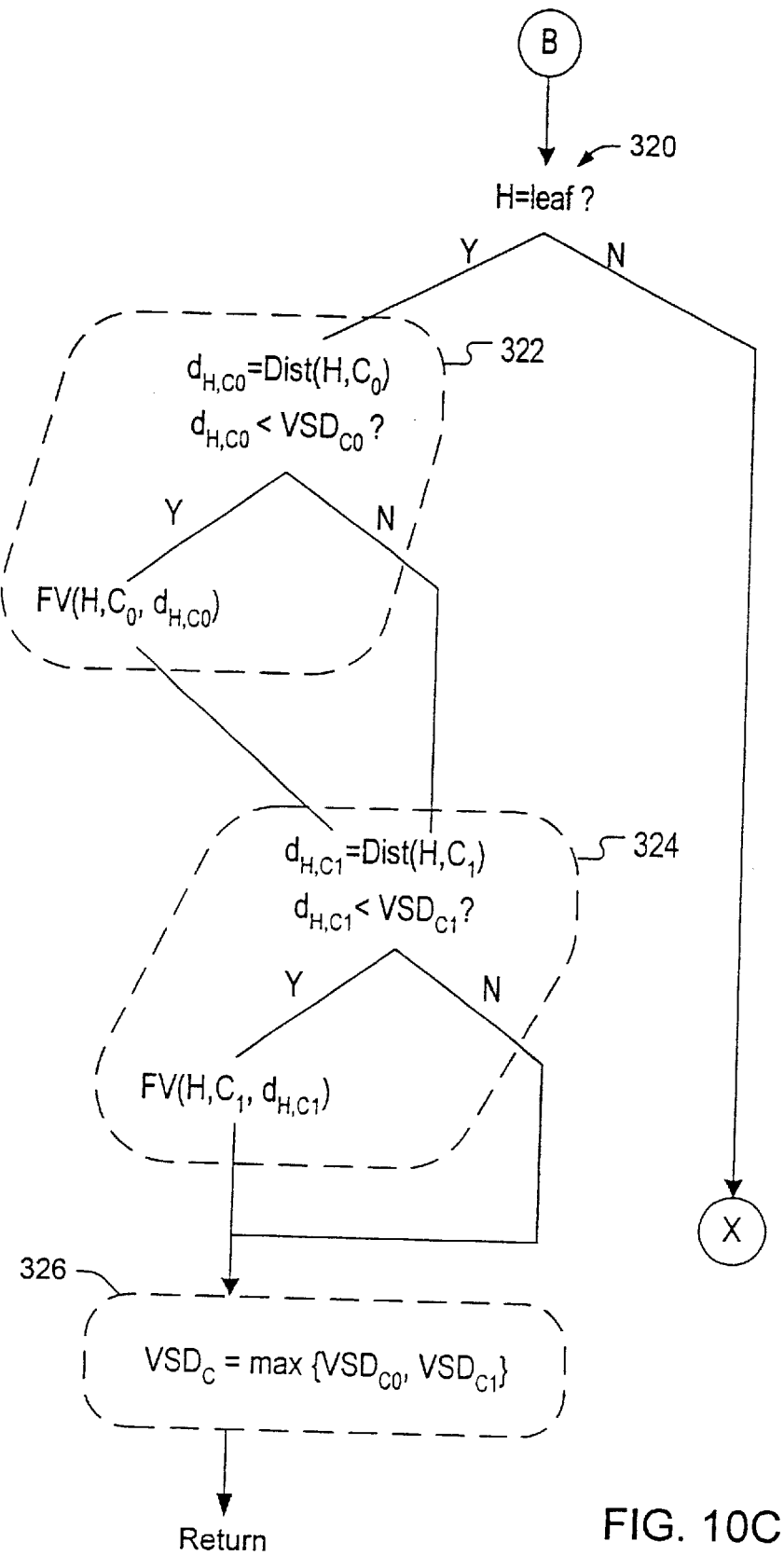

If, in step 305, it is determined that cone C is not a leaf, step 320 may be performed as indicated in FIG. 10C. In step 320, the findVisible function determines if the hull node H is a leaf node, i.e. an object hull, of the hull hierarchy. If so, the children of cone C may be explored with respect to object hull H in steps 322 and 324. In one embodiment, cone C has two children which are referred to as subcone C0 and subcone C1. In some alternative embodiments, the generic cone may have more than two children.

In step 322, the findVisible function may invoke the distance function Dist to compute the cone-hull distance $d_{H,C0}$ of the hull H from the origin of the subcone C0. The findVisible function may compare the cone-hull distance $d_{H,C0}$ to the visibility distance value $VSD_{C0}$ of subcone C0. If the cone-hull distance $d_{H,C0}$ is smaller than the visibility distance value $VSD_{C0}$ of subcone C0, the findVisible function may be called again in order to search hull H with respect to subcone C0. Thus, hull H, subcone C0 and the cone-hull distance $d_{H,C0}$ may be supplied to the findVisible function as arguments. When the findVisible function returns, control passes to step 324. Furthermore, if the cone-hull distance $d_{H,C0}$ is greater than or equal to the visibility distance value $VSD_{C0}$ of subcone C0, control passes to step 324.

In step 324, the findVisible function may invoke the distance function Dist to compute the cone-hull distance $d_{H,C1}$ of the hull H from the origin of the subcone C1. The findVisible function may compare the cone-hull distance $d_{H,C1}$ to the visibility distance value $VSD_{C1}$ of subcone C1. If the cone-hull distance $d_{H,C1}$ is smaller than the visibility distance value $VSD_{C1}$ of subcone C1, the findVisible function may be called again in order to search hull H with respect to subcone C1. Thus, hull H, subcone C1 and the cone-hull distance $d_{H,C1}$ may be supplied to the findVisible function as arguments. When the findVisible function returns, control passes to step 326. Furthermore, if the cone-hull distance $d_{H,C1}$ is greater than or equal to the visibility distance value $VSD_{C1}$ of subcone C1, control passes to step 326.

Since the visibility distance values for subcones C0 and C1 may have decreased by the interactions with hull H in steps 322 and 324 respectively, the visibility distance value for cone C may be updated. Thus, in step 326, the visibility distance value $VSD_C$ for cone C may be set equal to the maximum of the visibility distance values $VSD_{C0}$ and $VSD_{C1}$ of subcones C0 and C1 respectively. After step 326, program control returns to the calling routine.

Figure 10D:
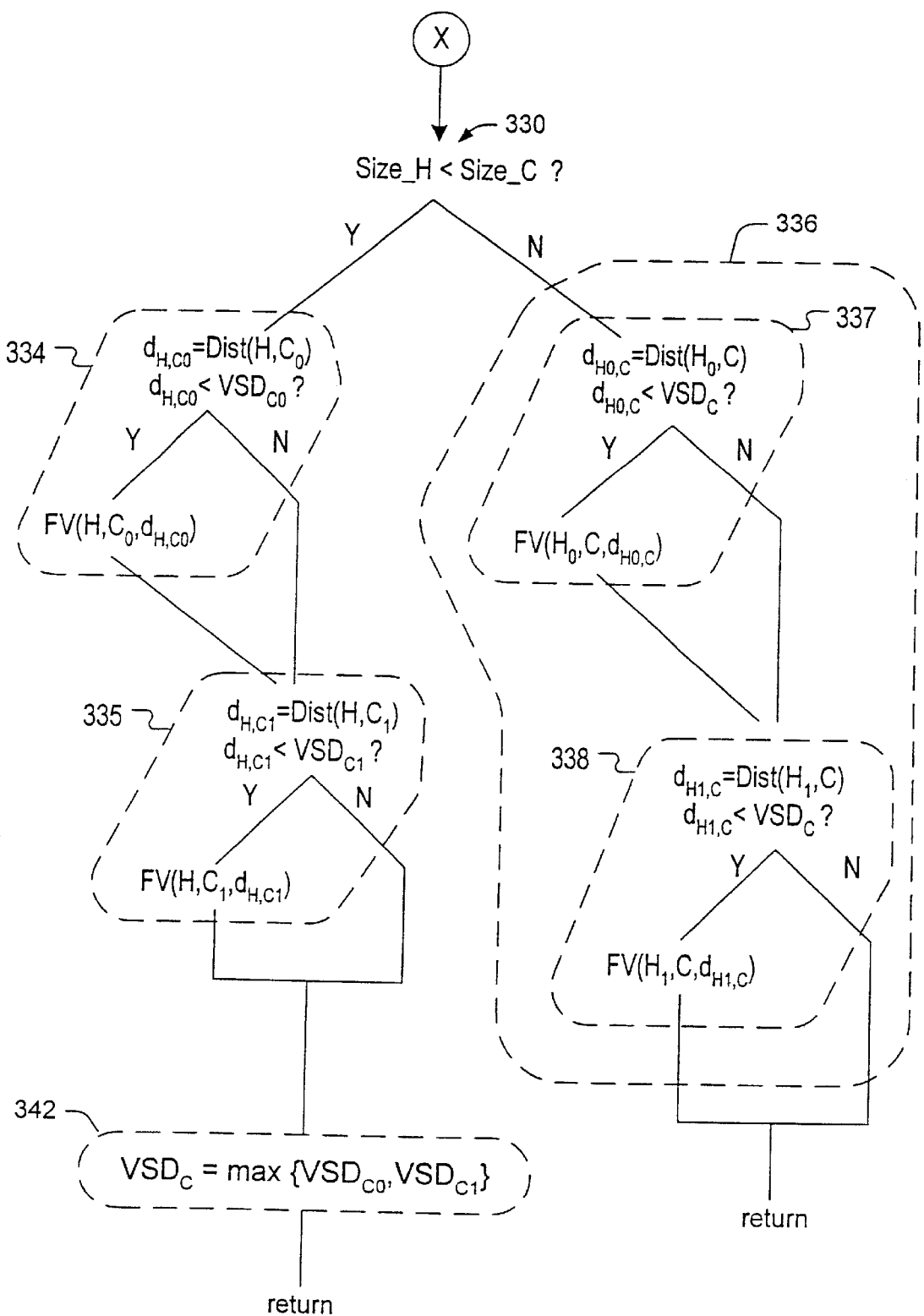

If, in step 320, the hull node H is determined not to be a leaf node, the findVisible function may perform step 330 (see FIG. 10D). Thus, step 330 and succeeding steps may assume that neither hull H nor cone C are leaf nodes in their respective hierarchies.

In step 330, the findVisible function may compute a normalized size Size_H for hull H and a normalized size Size_C for cone C, and may compare Size_H and Size_C. A variety of methods are contemplated for computing the hull size and cone size. If Size_H is smaller than Size_C, the subcones of cone C may be explored with respect to hull H in steps 334 and 335. If Size_H is greater than Size_C, the subhulls of hull H may be explored with respect to cone C in step 336 which comprises steps 337 and 338. In other embodiments of step 330, a function of Size_H may be compared to a function of Size_C.

In step 334, the findVisible function may invoke the distance function Dist to compute the cone-hull distance $d_{H,C0}$ of the hull H from the origin of the subcone C0. The findVisible function may compare the cone-hull distance $d_{H,C0}$ to the visibility distance value $VSD_{C0}$ of subcone C0. If the cone-hull distance $d_{H,C0}$ is smaller than the visibility distance value $VSD_{C0}$ of subcone C0, the findVisible function may be called again in order to search hull H with respect to subcone C0. Thus, hull H, subcone C0 and the cone-hull distance $d_{H,C0}$ may be supplied to the findVisible function as arguments. When the findVisible function returns, control passes to step 335. Furthermore, if the cone-hull distance $d_{H,C0}$ is greater than or equal to the visibility distance value $VSD_{C0}$ of subcone C0, control passes to step 335.

In step 335, the findVisible function may invoke the distance function Dist to compute the cone-hull distance $d_{H,C1}$ of the hull H from the origin of the subcone C1. The findVisible function may compare the cone-hull distance $d_{H,C1}$ to the visibility distance value $VSD_{C1}$ of subcone C1. If the cone-hull distance $d_{H,C1}$ is smaller than the visibility distance value $VSD_{C1}$ of subcone C1, the findVisible function may be called again in order to search hull H with respect to subcone C1. Thus, hull H, subcone C1 and the cone-hull distance $d_{HC1}$ may be supplied to the findVisible function as arguments. When the findVisible function returns, control passes to step 342. Furthermore, if the cone-hull distance $d_{HC1}$ is greater than or equal to the visibility distance value $VSD_{C1}$ of subcone C1, control passes to step 342.

In step 342, the visibility distance value $VSD_C$ of cone C may be updated with the maximum of the visibility distance values $VSD_{C0}$ and $VSD_{C1}$ of subcones C0 and C1 respectively. After step 342, program control returns to the calling routine.

If, in step 330, Size_H is determined to be greater than (or greater than or equal to) Size_C, the subhulls of hull H may be explored with respect to cone C in step 336 which comprises steps 337 and 338.

In step 337, the findVisible function may invoke the distance function Dist to compute the cone-hull distance $d_{H0,C}$ of the subhull H0 from the origin of the cone C. The findVisible function may compare the cone-hull distance $d_{H0,C}$ to the visibility distance value $VSD_C$ of cone C. If the cone-hull distance $d_{H0,C}$ is smaller than the visibility distance value $VSD_C$ of cone C, the findVisible function may be called again in order to search subhull H0 with respect to cone C. Thus, subhull H0, cone C and the cone-hull distance $d_{H0,C}$ may be supplied to the findVisible function as arguments. When the findVisible function returns, control passes to step 338. Furthermore, if the cone-hull distance $d_{H0,C}$ is greater than or equal to the visibility distance value $VSD_C$ of cone C, control passes to step 338.

In step 338, the findVisible function may invoke the distance function Dist to compute the cone-hull distance $d_{H1,C}$ of the subhull H1 from the origin of cone C. The findVisible function may compare the cone-hull distance $d_{H1,C}$ to the visibility distance value $VSD_C$ of cone C. If the cone-hull distance $d_{H1,C}$ is smaller than the visibility distance value $VSD_C$ of cone C, the findVisible function may be called again in order to search subhull H1 with respect to cone C. Thus, subhull H1, cone C and the cone-hull distance $d_{H1,C}$ may be supplied to the findVisible function as arguments. When the findVisible function returns, control returns to a calling routine. In addition, if the conehull distance $d_{H1,C}$ is greater than or equal to the visibility distance value $VSD_C$ of cone C, control passes the calling routine.

As explained above, the visibility distance value assigned to each cone in the cone tree is set equal the maximum of the visibility distance values assigned to its subcone children. Thus, if a given hull achieves a distance to a cone which is larger than the cone's current visibility distance value, all of the cone's leaf-cone descendents have already "discovered"

objects closer than the given hull and any of its leaf-hull descendents. The given hull node may not be searched with respect to this cone.

A cone's visibility distance value decreases as the recursion tests more and more object-cone leaf pairs. As nearby objects are discovered, a cone's visibility distance value decreases and the probability of skipping unpromising hull nodes increases. A leaf in the hull tree bounds the volume of an associated object. Thus, cone visibility distance values, set during recursion, are usually not the real distances to objects but a conservative approximation of those distances. If the conservative approximation is inadequate for use in an application, then that application can invoke a higher precision computation of object-cone distance to determine the visibility distance values.

Throughout the above discussion of the visibility search algorithm it has been assumed that the function Dist used to compute the cone-hull separation distance is based on minimizing an increasing function of separation distance between the vertex of the given cone and points in the intersection of the given cone and the given hull. However, it is noted that the function Dist may be programmed to compute a merit of proximity between a given cone and given hull. The resulting merit value increases with increasing proximity and decreases with increasing separation, converse to the typical behavior of a distance function. In this case, the visibility search algorithm performs a search of hull H against cone K only if the merit value of separation between cone K and hull H is greater than the current merit value associated with cone K. Furthermore, after a search of subcones of cone K is completed, the merit value associated with the cone K is updated to equal the minimum of the merit values of its subcone children.

In general, the function Dist determines a cone-hull measurement value of separation by computing the extremum (i.e. minimum or maximum) of some monotonic (increasing or decreasing) function of separation between the vertex of the cone K and points in the intersection of cone K and hull H. The search of cone K against a hull H is conditioned on the hull H achieving a cone-hull measurement value with respect to cone K which satisfies an inequality condition with respect to measurement value assigned to cone K. The sense of the inequality, i.e. less than or greater than, depends on the whether the function Dist uses an increasing or decreasing function of separation.

While the search of the hull and cone hierarchies described above assumes a recursive form, it is noted that any search strategy may be employed. In one alternate embodiment, the hull and/or cone hierarchies are searched iteratively. Such a brute force solution may be advantageous when a large array of processors is available to implement the iterative search. In another embodiment, a level-order search is performed on the hull and/or cone hierarchies.

After completing the search on the hull and cone hierarchies, the visibility search algorithm may transmit the set of N object pointers (or the subset of the N object pointers which correspond to actual discovered objects as opposed to object pointers which retain their initialization value corresponding to infinity distance) for each leaf cone of the cone hierarchy to a rendering agent (e.g. graphics accelerator 112). Because, neighboring leaf cones may share many of the same nearest objects, the set of up to N closest object pointers associated with each of the leaf cones may be processed to remove redundancies before transmission to the rendering agent.

If the cone hierarchy is refined so that the leaf cones each cover the area of approximately one pixel or less, there is a high probability that the closest object in a leaf cone is the only visible object in the leaf cone. Thus, N=1 may be used in embodiments where the cone hierarchy is refined to pixel resolution. In other words, it may be necessary only to identify the single closest object in each leaf cone. It is noted, however, that the visibility search of such a "fully resolved" cone hierarchy may be computationally expensive. The computational expense may be decreased by having fewer levels of refinement in the cone hierarchy. But fewer levels of refinement implies that the size of the leaf cones is larger. As the size of the leaf cones increases, there is an increasing probability that two or more objects will be visible to a single leaf cone, i.e. that the nearest object is not the only object visible to the cone. Therefore, N may take larger values when the leaf cones of the cone hierarchy subtend larger solid angles, or equivalently, when fewer levels of cone refinement are used in the cone hierarchy.

In some embodiments, a search may be performed which penetrates several levels below the leaf cone level to estimate the true number $N_{true}$ of visible objects per leaf cone. The statistics on the true number $N_{true}$ may be analyzed to determine an optimal value for parameter N to be used by the visibility search algorithm for normal searches (which only penetrate down to the leaf cone level).

In some embodiments, computational efficiency may be maximized along the axis of high-cone-resolution/low-N-value on the one hand and low-cone-resolution/high-N-value on the other.

Size Conditioned Tree Search

As described above in connection with step 330, the findVisible function determines a normalized size Size__C for cone C and a normalized size Size__H for hull H. In one embodiment, Size__H may be computed by dividing a solid diameter (or the square of a solid diameter) of hull H by the distance $d_{H,C}$ of hull H with respect cone C. Size__C may be determined by computing the solid angle subtended by cone C. Size__C may also be determined by computing the cone's cross sectional area at some convenient distance (e.g. distance one) from the viewpoint. The cross section may be normal to an axis of the cone C. The cone size Size__C for each cone in the cone hierarchy may be computed when the cone hierarchy is generated (e.g. at system initialization time).

Figure 10E:
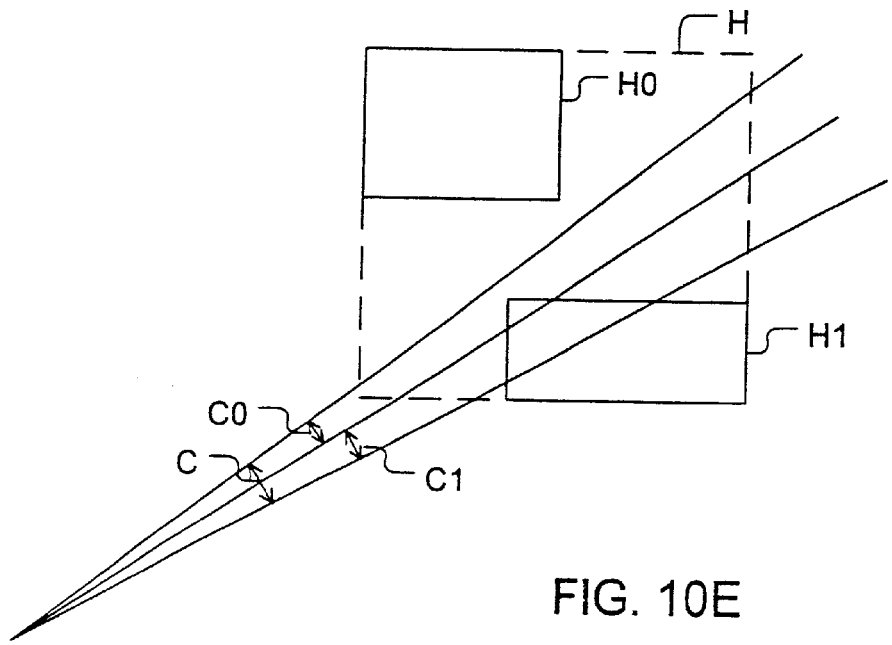
FIG. 10E illustrates a cone C which has a small normalized size compared to a bound hull H.

If the hull size Size__H is larger than the cone size Size__C as suggested by FIG. 10E, on average, the probability of at least one subhull of hull H having an empty intersection with cone C is larger than the probability of at least one subcone of cone C having an empty intersection with hull H. Thus, in this case, it may be more advantageous to explore the subhulls H0 and H1 of hull H with respect to cone C, rather than exploring the subcones of cone C with respect to hull H. For example, FIG. 10E illustrates an empty intersection between subhull H0 and cone C. This implies that none of the descendents of subhull H0 need to be searched against any of the descendents of cone C.

Figure 10F:
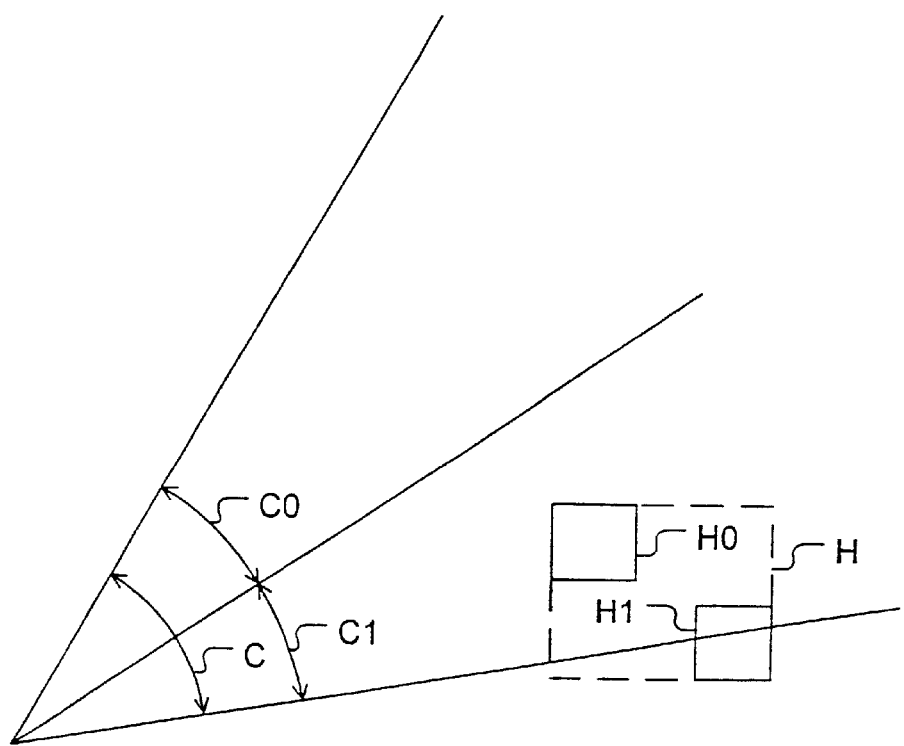
FIG. 10F illustrates a hull H which has a small normalized size compared to a cone C.

If the hull size Size__H is smaller than the cone size Size__C as suggested by FIG. 10F, on average, the probability of at least one subhull of hull H having an empty intersection with cone C is smaller than the probability of at least one subcone of cone C having an empty intersection with hull H. Thus, in this case, it may be more advantageous to explore the subcones C0 and C1 of cone C with respect to hull H, rather than exploring the subhulls of hull H with respect to cone C. For example, FIG. 10F illustrates an empty intersection between subcone C0 and hull H. This implies that none of the descendents of subcone C0 need to be searched against any of the descendents of hull H.

By selecting the larger entity (hull or cone) for refinement, the findVisible function may more effectively prune the combined hull-cone tree, and determine the set of visible objects with increased efficiency.

Searching Subhulls in Order of Proximity to a Hull

Figure 10G:
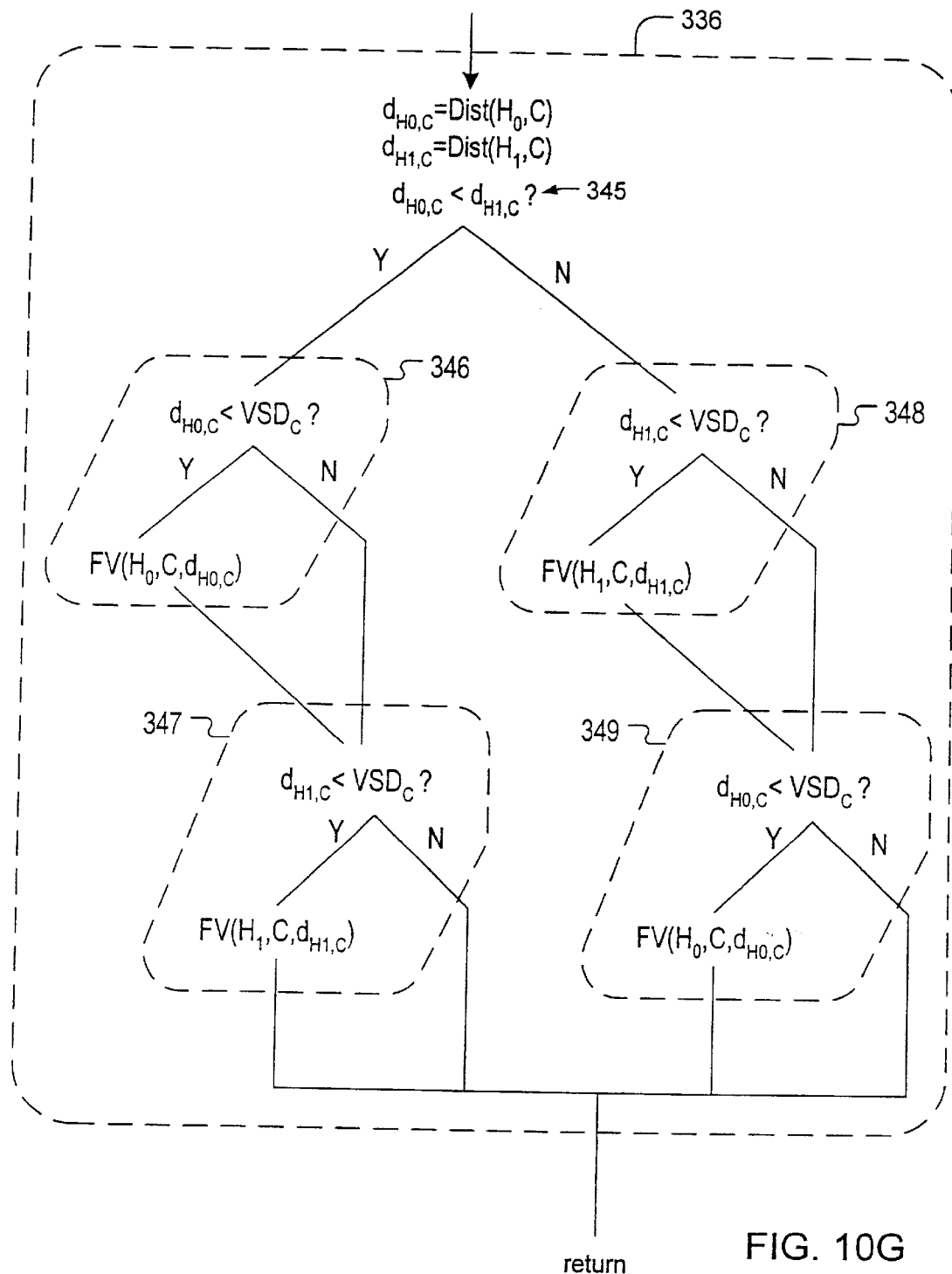
FIG. 10G illustrates one embodiment of step 336 of the visibility search algorithm which is configured to search subhulls of a given hull in order of proximity with respect to a given cone.

In step 336, the subhulls H0 and H1 of the hull H are explored with respect to the cone C. In the embodiment of step 336 shown in FIG. 10D, step 336 comprises step 337 and step 338, and step 337 is performed before step 338. Thus, subhull H0 is explored with respect to cone C before subhull H1. In another embodiment of step 336, the subhulls H0 and H1 may be explored in order of their proximity to cone C as shown in FIG. 10G. The subhull which achieves a smaller cone-hull distance to the cone C may be searched first.

In step 345, the cone-hull distances $d_{H0,C}$ and $d_{H1,C}$ are compared. If subhull H0 has a smaller cone-hull distance with respect to the cone C than subhull H1, subhull H0 is searched first as shown in steps 346 and 347. It is noted that the call to the function findVisible in step 346 may cause the visibility distance value for cone C to decrease. Thus, the visibility distance value $VSC_C$ for cone C may actually have a smaller value when tested in step 347 than when tested in step 346. This underscores the importance of the test performed in step 345 to determine the subhull which is closer to cone C. The closer subhull is searched first and allowed to preempt the more distant subhull. In other words, after searching the closer subhull, the more distant subhull may not need to be searched. Thus, the distance conditioned search order for subhulls advantageously improves the efficiency of the visibility search algorithm.

In steps 348 and 349, the subhulls are searched in the opposite order in response to the determination of step 345 that subhull H0 achieves a cone-hull distance from cone C which is greater than or equal to the corresponding distance for subhull H1. Again, the closer subhull H1 is searched first and allowed to preempt the search of the farther subhull H0.

The fixed-order subhull search shown in steps 306 and 308 of FIG. 10B may also be replaced by a distance conditioned search.

Occluders and Non-occluders

In some embodiments, object hulls may be classified as occluders or nonoccluders prior to the visibility search. An object hull may be an occluder if the object it contains is opaque and fills a substantial portion of the volume of the object hull. An object hull may be a non-occluder if the object it contains is transparent or semi-transparent, or if the contained object is opaque and fills an insubstantial portion of the volume of the object hull. For example, object hulls containing windows, bubbles or plastic film may represent non-occluders. Also, object hulls which use only a few normals may not be able to efficiently contain certain long thin objects in certain orientations. For example, a rectangular box with sides parallel to the coordinate axes are not able to efficiently contain a long thin object such as a pen oriented in the direction (1,1,1). Various methods and criteria are contemplated for classifying object hulls as occluders or non-occluders. The object hull classification may be performed any time after the object hulls are generated.

As discussed above, step 255 is performed in response to a determination (in step 250) that the hull H and cone C are both leaf nodes of their respective hierarchies. In the embodiment of step 255 shown in FIG. 10A, the visibility search algorithm treats all objects as if they were occluders. In another embodiment of step 255 shown in FIG. 10H, the visibility search algorithm may treat occluders and non-occluders differently as follows.

In step 258, the visibility search algorithm may determine if the hull H is an occluder. If hull H is not an occluder, i.e. a non-occluder, the visibility search algorithm may push the object pointer corresponding to hull H and cone-hull distance $d_{H,C}$ onto a non-occluder buffer allocated for leaf cone C.

If the hull H is an occluder, the visibility search algorithm may update the object pointers and object distances as has already been described in connection with steps 260 and 270. As part of step 270, the visibility search algorithm may set the visibility distance value $VSD_C$ for leaf cone C equal to the updated value of the last distance $D_N$, i.e. the distance to the last of the N closest objects.

In step 272, the visibility search algorithm may flush any non-occluders in the non-occluder buffer which are more distant than the updated visibility distance $VSD_C$. After the conditional flushing, the visibility search algorithm returns control to the calling routine.

Figure 10H:
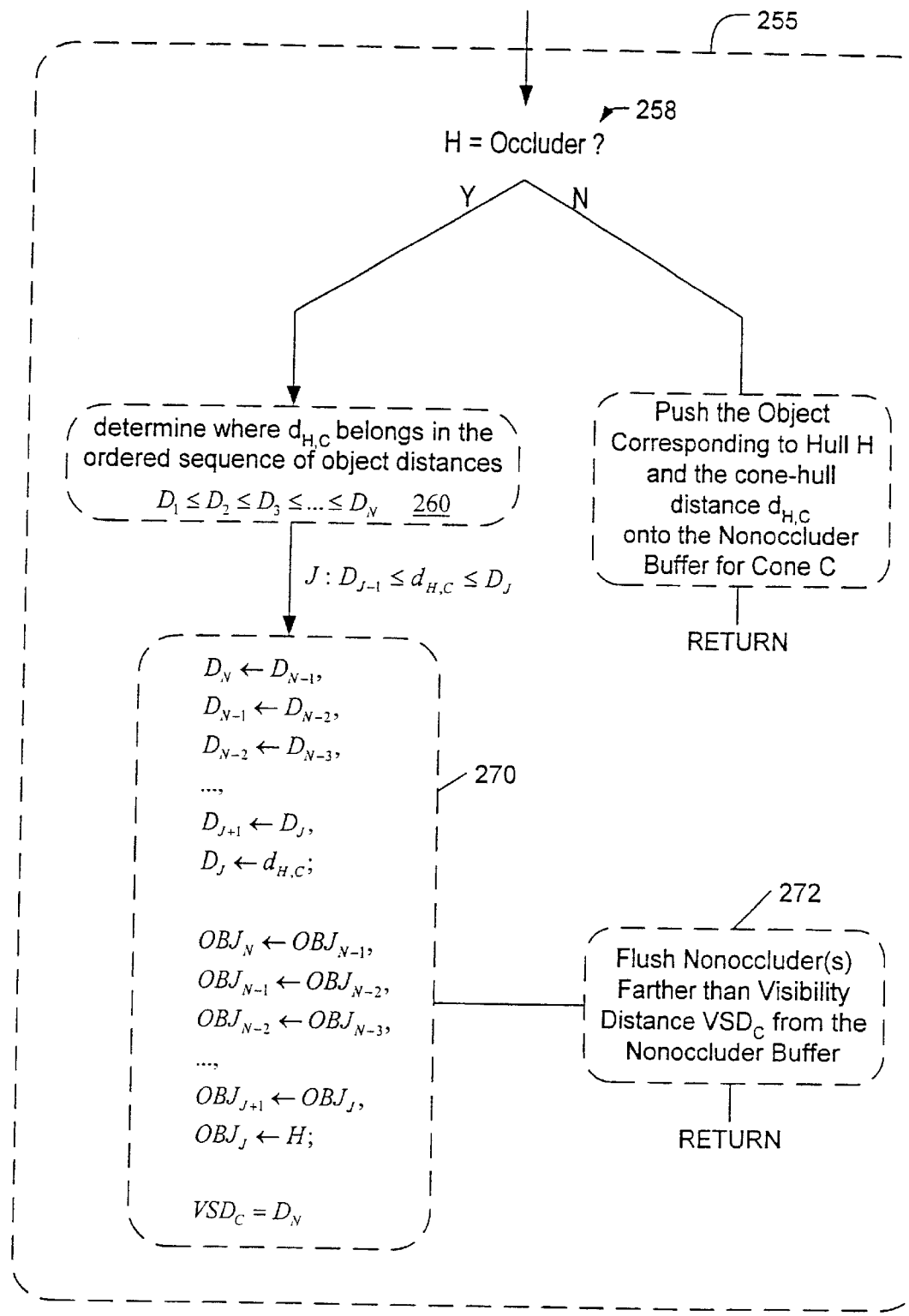
FIG. 10H illustrates one embodiment of step 255 of the visibility search algorithm which is configured to determine the N nearest occluders and any nonoccluders closer than the $N^{th}$ occluder for leaf cones of the cone hierarchy.

Thus, in the embodiment of step 255 shown in FIG. 10H, the visibility search algorithm identifies the N closest occluders and any non-occluders closer than the $N^{th}$ occluder for each leaf cone of the cone hierarchy.

After completing the search on the hull and cone hierarchies, the visibility search algorithm may transmit the occluder pointers and non-occluder pointers for each leaf cone of the cone hierarchy to a rendering agent. Because, neighboring leaf cone may share many of the same nearest objects, the set of objects pointers associated with the leaf cones may be processed to remove redundancies before transmission to the rendering agent.

Occlusion Metric

In some embodiments, an occlusion metric may be used to assign an occlusion metric value to each object hull in the hull hierarchy. A leaf cone C may gather object hulls until the sum of the corresponding occlusion metric values exceeds some threshold. In one embodiment, the occlusion metric value for an object hull may be the maximum diameter of the object hull. The maximum diameter is the maximum distance between any two points on the surface of the object hull. This maximum diameter may be computed from the xyz coordinates of the vertices of the object hull.

In a second embodiment, the occlusion metric value for an object hull may be determined based on an estimate of the maximal framing area of the object hull. A frame (e.g. a rectangular frame) perpendicular to a fixed direction and fitting efficiently around an object hull has a well-defined area. The frame area may be maximized over all possible directions giving the maximal framing area for the object hull. The occlusion metric value may be the square root of the maximal framing area.

In a third embodiment, the occlusion metric value for an object hull may be the cube root of the volume of the object hull.

In a fourth embodiment, the occlusion metric value for an object hull is determined by the ratio of the volume of the object contained within the object hull to the volume of the object hull.

In a fifth embodiment, the above volume ratio may be scaled with respect to the inverse of the cone-hull distance $d_{H,C}$ according to the relation:

$$\text{metric}(H) = \text{volume\_ratio}/d_{H,C}.$$

In a sixth embodiment, the occlusion metric for an object hull may be computed by estimating an opaque object volume for the contained object, and dividing the opaque object volume by the volume of the object hull. The opaque object volume of an object is that portion of the object's volume which is opaque.

In a seventh embodiment, the ratio of opaque object volume to object hull volume is scaled by the inverse of the cone-hull distance $d_{H,C}$ according to the relation:

$$\text{metric}(H) = \text{opaque\_volume}/(\text{hull\_volume} * d_{H,C}).$$

A variety of methods are contemplated for determining the occlusion metric value of object hulls.

Each leaf cone C may store a collection of object pointers $OBJ_1$, $OBJ_2$, $OBJ_3$, ..., $OBJ_M$, corresponding object distances $D_1$, $D_2$, $D_3$, ..., $D_M$, and corresponding occlusion values $G_1$, $G_2$, $G_3$, ..., $G_M$. The size M of these data lists may vary in time. In addition, leaf cone C may store a visibility distance value $VSD_C$ and a cumulative sum $S_C$ of the occlusion metric values. The object distances are ordered, i.e.

$$D_1 \leq D_2 \leq \ldots \leq D_M.$$

The nearest object corresponds to object pointer $OBJ_1$, object distance $D_1$ and occlusion value $G_1$. Similarly, the $J^{th}$ nearest object corresponds to object pointer $OBJ_J$, object distance $D_J$ and occlusion value $G_J$.

Figure 11A:
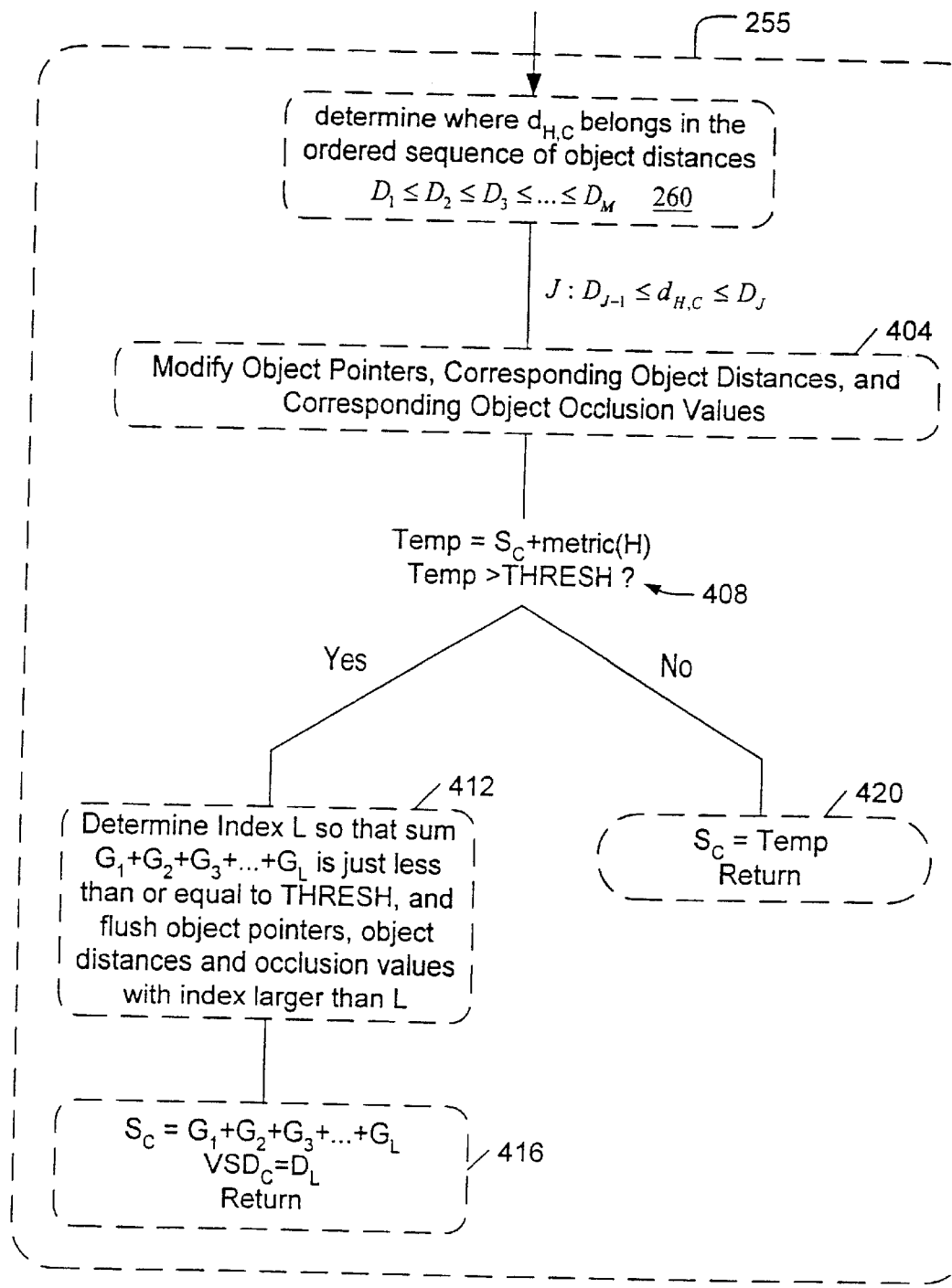
FIG. 11A illustrates another embodiment of step 255 of the visibility search algorithm which is configured to determine the nearest objects until the sum of the occlusion metric values reaches an occlusion threshold.

As discussed above, step 255 is performed in response to a determination (in step 250) that the hull H and cone C are both leaf nodes of their respective hierarchies. FIG. 11A illustrates one embodiment of step 255 which incorporates object retention based on a cumulative occlusion metric.

In step 260, the findVisible function may determine where $d_{H,C}$ belongs in the ordered sequence of object distances $$D_1 \leq D_2 \leq \ldots \leq D_M.$$

Any of various methods may be used to perform this determination. The output of step 260 may comprise an index J between 1 and M inclusive such that $D_{J-1} \leq d_{H,C} \leq D_J$.

In step 404, the visibility search algorithm may modify the object pointers, corresponding object distances, and corresponding occlusion values according to the relations:

$D_{M+1} \leftarrow D_M$, $OBJ_{M+1} \leftarrow OBJ_M$, $G_{M+1} \leftarrow G_M$, $D_M \leftarrow D_{M-1}$, $OBJ_M \leftarrow OBJ_{M-1}$, $G_M \leftarrow G_{M-1}$, $D_{M-1} \leftarrow D_{M-2}$, $OBJ_{M-1} \leftarrow OBJ_{M-2}$, $G_{M-1} \leftarrow G_{M-2}$,

. . . , $D_{J+1} \leftarrow D_J$, $OBJ_{J+1} \leftarrow OBJ_J$, $G_{J+1} \leftarrow G_J$, $D_J \leftarrow d_{H,C}$, $OBJ_J \leftarrow H$, $G_J \leftarrow \text{metric}(H)$, where the notation A←B indicates that the value of variable B is assigned to the variable A. The distance values starting with index J are shifted upward in index position. Similarly, the objection pointers and occlusion values are shifted upward in index position. After the injection of the new data associated with object hull H, each list may contain one more entry than before the injection. The cone-hull distance $d_{H,C}$ becomes the new value for distance $D_J$. The object pointer corresponding to object hull H becomes the new value for object pointer $OBJ_J$. The occlusion metric value for object hull H, denoted metric(H), becomes the new value for occlusion value $G_J$. It is noted that the occlusion metric value metric(H) may be pre-computed and stored as part of hull node H. Thus, the occlusion metric value metric(H) may be read from the hull node H. Alternatively, the occlusion metric value metric(H) may be computed on the fly.

In step 408, the visibility search algorithm may determine if the sum of the cumulative occlusion sum $S_C$ for leaf cone C and the occlusion metric of hull H exceeds the occlusion threshold THRESH. If this sum does exceed the occlusion threshold, steps 412 and 416 may be performed. The occlusion threshold THRESH may be assigned any desired value.

In step 412, the visibility search algorithm may determine index L so that the sum $G_1+G_2+\ldots+G_L$ is less than or equal to the occlusion threshold, and the sum $G_1+G_2+\ldots+G_L+G_{L+1}$ is greater than the occlusion threshold. The index L at which this condition is achieved may be referred to as the critical index. After determining the critical index L, the visibility search algorithm may flush any object pointers $OBJ_I$, object distances $D_I$ and occlusion values $GI$ with index I greater than the critical index L. Thus, the critical index L defines the end of each data list after flushing. It is noted that in some embodiments, one or more linked lists may be used to maintain the object pointers, object distances and occlusion values.

In step 416, the visibility search algorithm may update the cumulative occlusion sum $S_C$ for the leaf cone C with the sum $G_1+G_2+\ldots+G_L$, i.e. the sum of occlusion values up to the critical index L. Also, the visibility search algorithm may set the visibility distance value $VSD_C$ for leaf cone C equal to the critical object distance $D_L$, and then return control to the calling routine.

If the sum of the cumulative occlusion sum $S_C$ and the occlusion metric of hull H does not exceed the occlusion threshold THRESH, step 420 may be performed. In step 420, the cumulative sum $S_C$ is updated with the occlusion metric value for object hull H, i.e. $S_C = S_C + \text{metric}(H)$. After updating the cumulative sum $S_C$, the visibility search algorithm may return control to the calling routine.

Figure 11B:
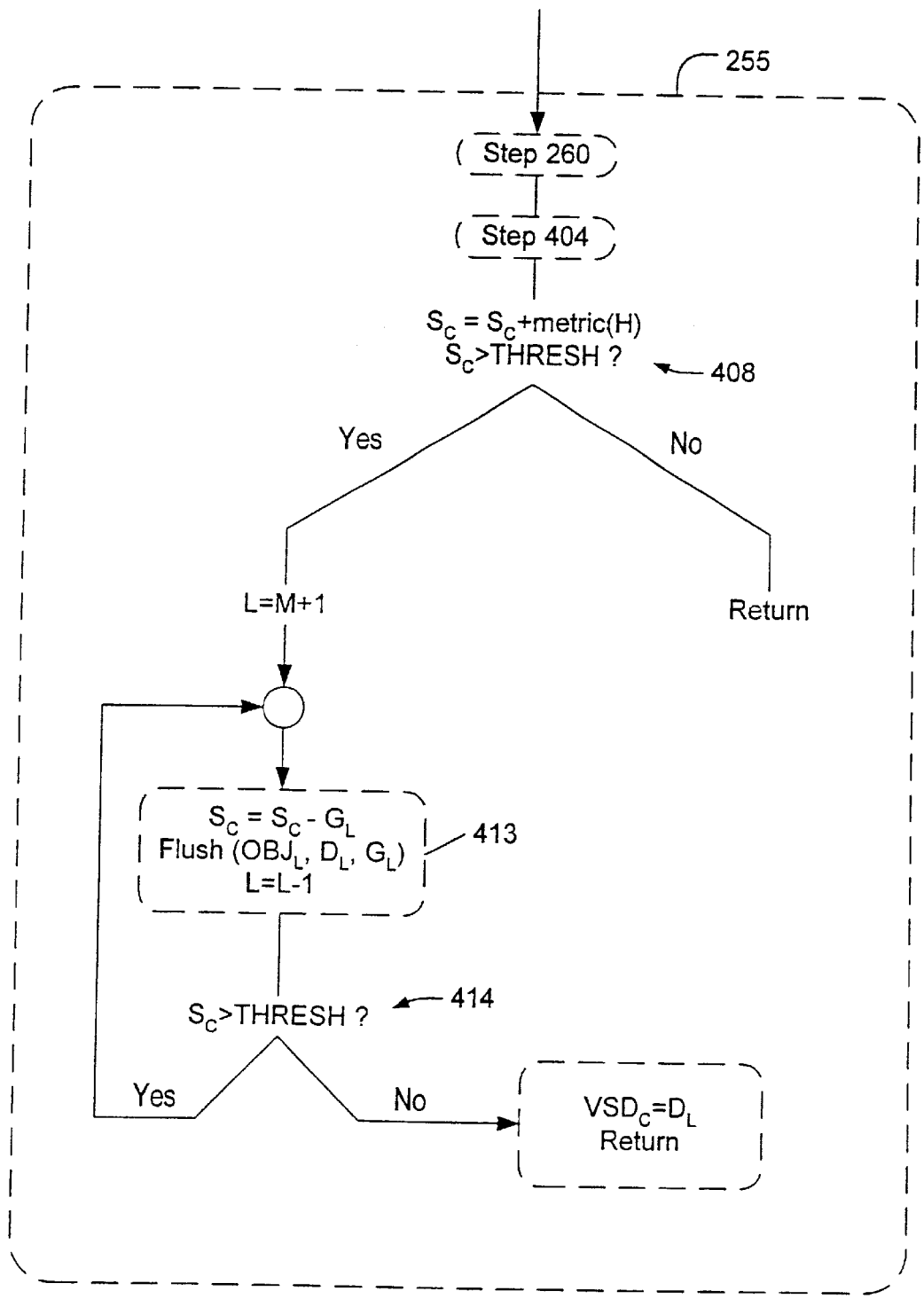
FIG. 11B illustrates yet another embodiment of step 255 of the visibility search algorithm which is configured to flush entries from cone-specific data lists by a back-stepping method.

FIG. 11B illustrates another embodiment of step 255 in which the operation of flushing data entries beyond the critical index is implemented by a "back-stepping" method. In this embodiment, step 408 comprises updating the cumulative occlusion sum $S_C$ with the occlusion metric value of hull H, i.e. metric(H), according to the relation $S_C = S_C + \text{metric}(H)$, and determining if the updated cumulative occlusion sum $S_C$ is greater than the occlusion threshold THRESH.

If the cumulative occlusion sum $S_C$ is greater than the occlusion threshold, the visibility search algorithm may set an index L equal to M+1, and step 413 may be performed. In step 413, the occlusion value $G_L$ corresponding to index L may be subtracted from the cumulative occlusion sum $S_C$, and the object pointer $OBJ_L$, object distance $D_L$ and occlusion value $G_L$ corresponding to index L may be flushed from the respective data lists. Furthermore, the index L may be decremented. After step 413, step 414 may be performed. In step 414, the visibility search algorithm determines if the cumulative occlusion sum $S_C$ is greater than the occlusion threshold THRESH.

If the cumulative occlusion sum $S_C$ is greater than the occlusion threshold, step 413 may be performed again. If the cumulative occlusion sum $S_C$ is not greater than the occlusion threshold, the visibility distance value $VSD_C$ for leaf cone C may be set equal to the object distance $D_L$. After updating the visibility distance value, program control passes to the calling routine.

Thus, the visibility search algorithm steps back from the end of each data list (one each for object pointers, object distance and occlusion values) until the cumulative occlusion sum is less than or equal to the occlusion threshold.

Refining Cone Tree Resolution with Probe Cones

A cone tree data structure comprises a hierarchy of nested cones. Each succeeding level of the cone tree provides a finer resolution of the space contained by the root cone. In the embodiments discussed above, the visibility search algorithm performs a simultaneous dual tree search on the cone tree and hull tree. The visibility search algorithm searches the cone tree down to a primary refinement level.

Figure 12A:
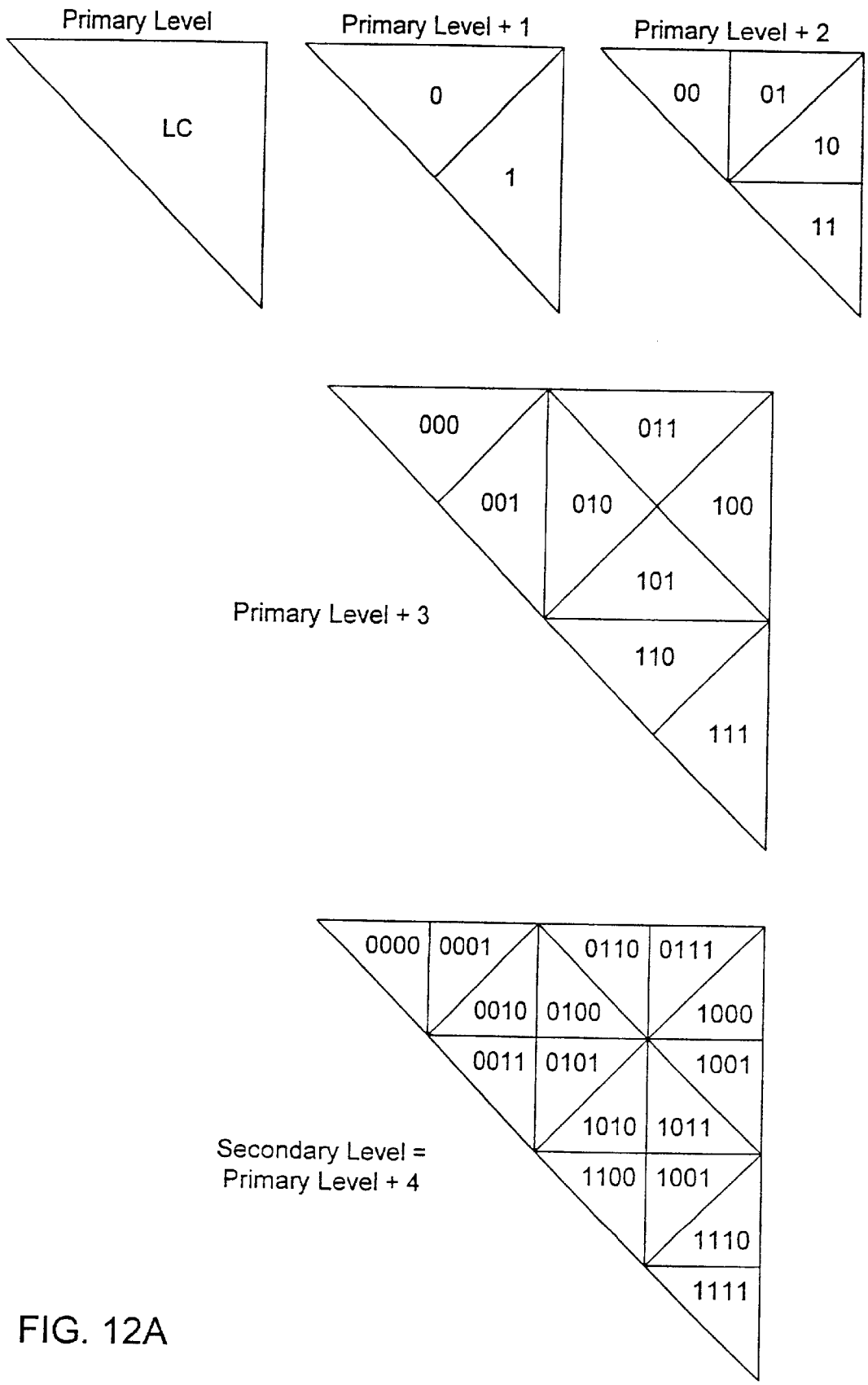
FIG. 12A illustrates the successive refinement of a leaf cone LC down to a secondary refinement level.
Figure 12B:
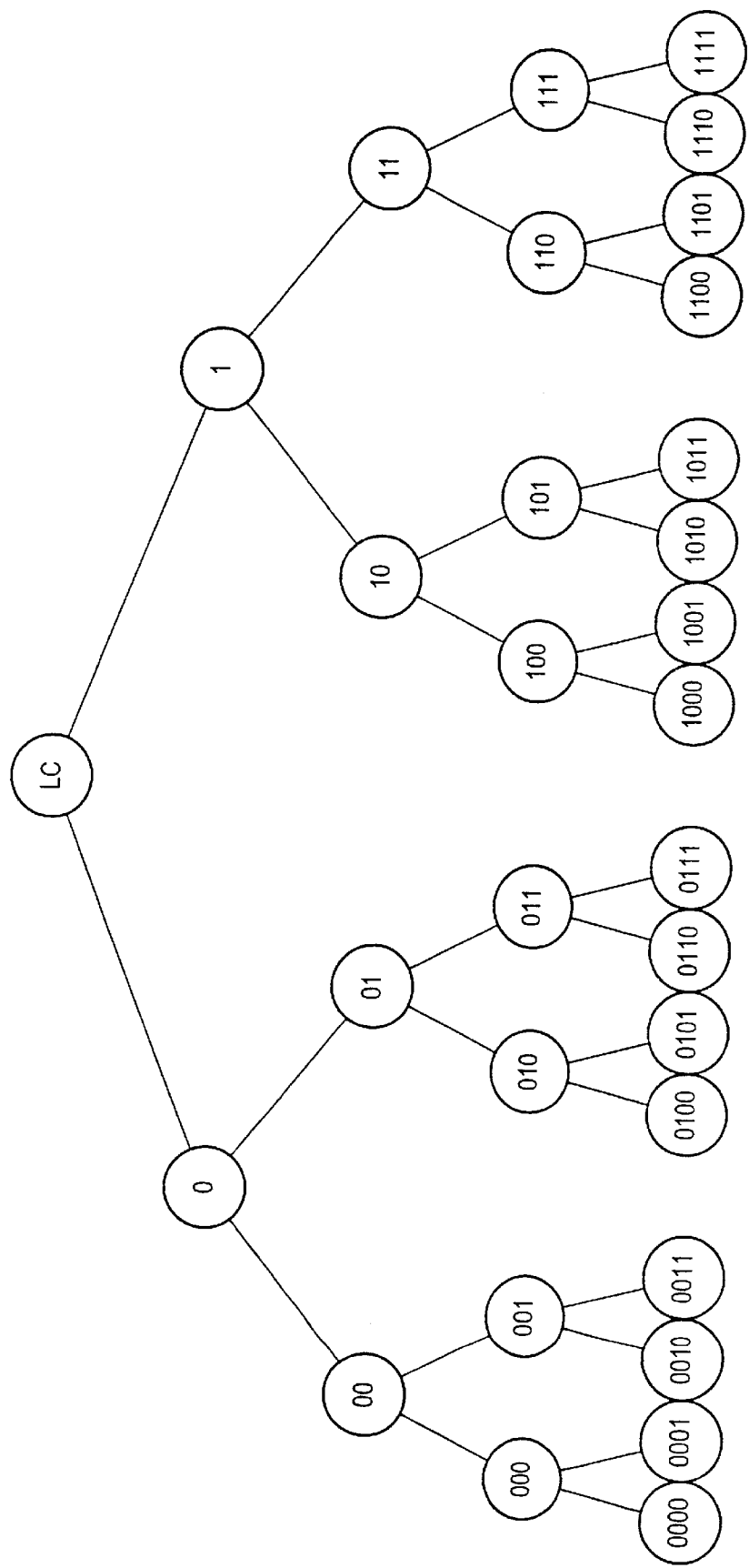
FIG. 12B illustrates that portion of the cone hierarchy (i.e. cone tree structure) which corresponds to the refinements of FIG. 12A.

This search is referred to herein as the primary search. The cones at the primary refinement level are referred to as leaf cones. The primary search identifies a primary set of visible objects for the leaf cones. For the sake of the following discussion, imagine that the cone tree is refined for several levels beyond the primary refinement level, i.e. down to a secondary refinement level. For example, FIGS. 12A and 12B illustrate a leaf cone LC and four levels of refinement below the leaf cone. FIG. 12A illustrates the successive refinement of leaf cone LC in space. Only cross sections of cones are illustrated for the sake of simplicity. FIG. 12B illustrates the subtree of cone nodes below the leaf cone node LC down to the secondary refinement level which is four levels down.

If the visibility search algorithm were allowed to search down to the secondary refinement level, there would be an increased probability of detecting all objects visible within the root cone because the cones at the second refinement level partition space more finely. However, the extended visibility search down to the secondary refinement level may be significantly more expensive than the search down to the primary refinement level.

Figure 12C:
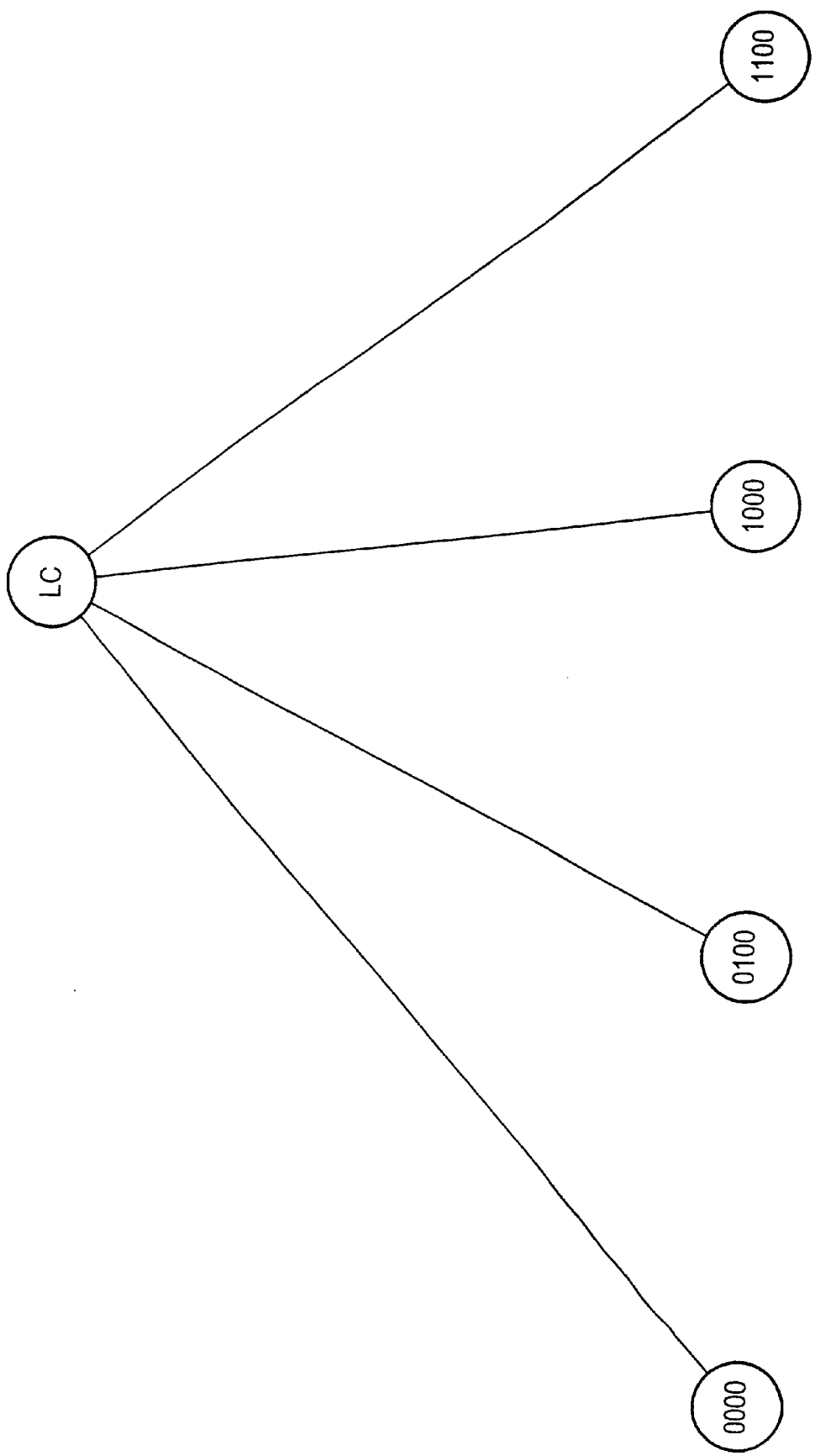
FIG. 12C illustrates one embodiment where a leaf cone points to several of its descendant cones from the second refinement level without storing (or pointing to) intermediate layers of the cone tree.

In some embodiments, the leaf cones of the cone tree may store a subset of cones (or pointers to cones) from the secondary refinement level without storing any nodes corresponding to the intervening refinement levels. For example, FIG. 12C illustrates leaf cone LC pointing directly to selected cones, i.e. cone 0000, 0100, 1000 and 1100, from a secondary refinement level which is four levels down from the primary (i.e. leaf cone) refinement level. The selected cones are referred to herein as probe cones. The probe cones for a leaf cone may not fill the space of the leaf cone. However, the probe cones may be "spread out" so as to uniformly sample the space of the corresponding leaf cone.

Figure 12D:
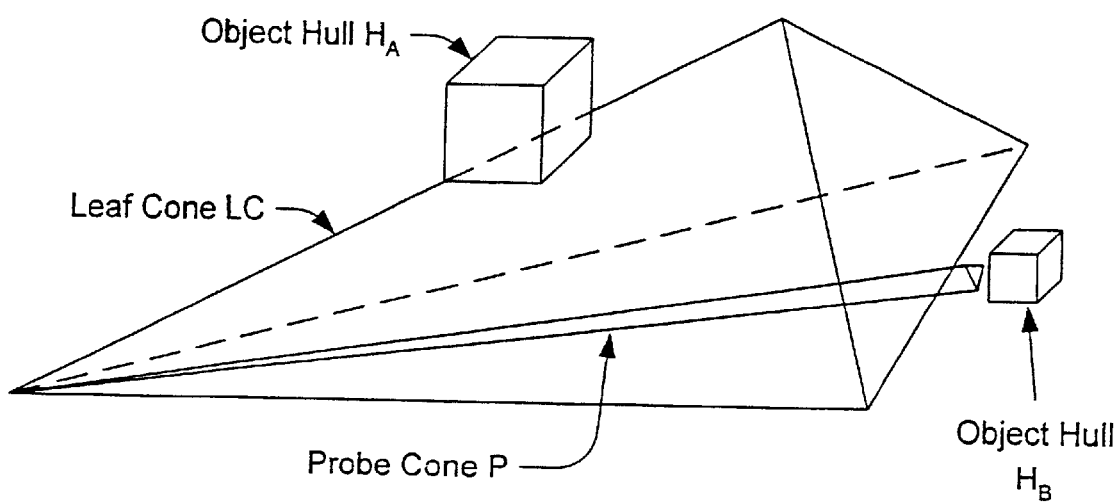
FIG. 12D illustrates an object hull $H_A$ which is visible to a leaf cone LC, and a more distant object hull $H_B$ which is visible to a probe cone P.

The probe cones may be used in a second visibility search operation which may be performed after the primary search is complete. The second visibility search operation may explore the hull tree with each of the probe cones of each leaf cone to determine a secondary set of visible objects. The union of the primary set and secondary set of visible objects comprises an augmented set of visible objects which may more closely approximate the true set of visible objects than the primary set alone. FIG. 12D illustrates a leaf cone LC and one of its probe cones denoted P. The primary search may identify object hull $H_A$ as a visible object hull for the leaf cone. The probe cones, because they are smaller, are able to detect additional object hulls not detected by the primary search. For example, the probe cone P is able to detect an object hull $H_B$ not detected in the primary search.

The following code fragment illustrates one embodiment of the search of a probe cone P against the hull tree. The variable hullTree points to the root node of the hull tree.

```
main(hullTree, P) {
  distance=Dist(hullTree,P);
  if(distance<infinity)
    HullSearch(hullTree, P, distance);
}
```

The function Dist is used to evaluate the distance between the root hull and the probe cone P. If this distance is less than positive infinity, the function HullSearch is called with the root hull, probe cone, and their hull-cone distance as arguments. The function HullSearch performs the recursive search of the hull tree with respect to the probe cone P.

Figure 13A:
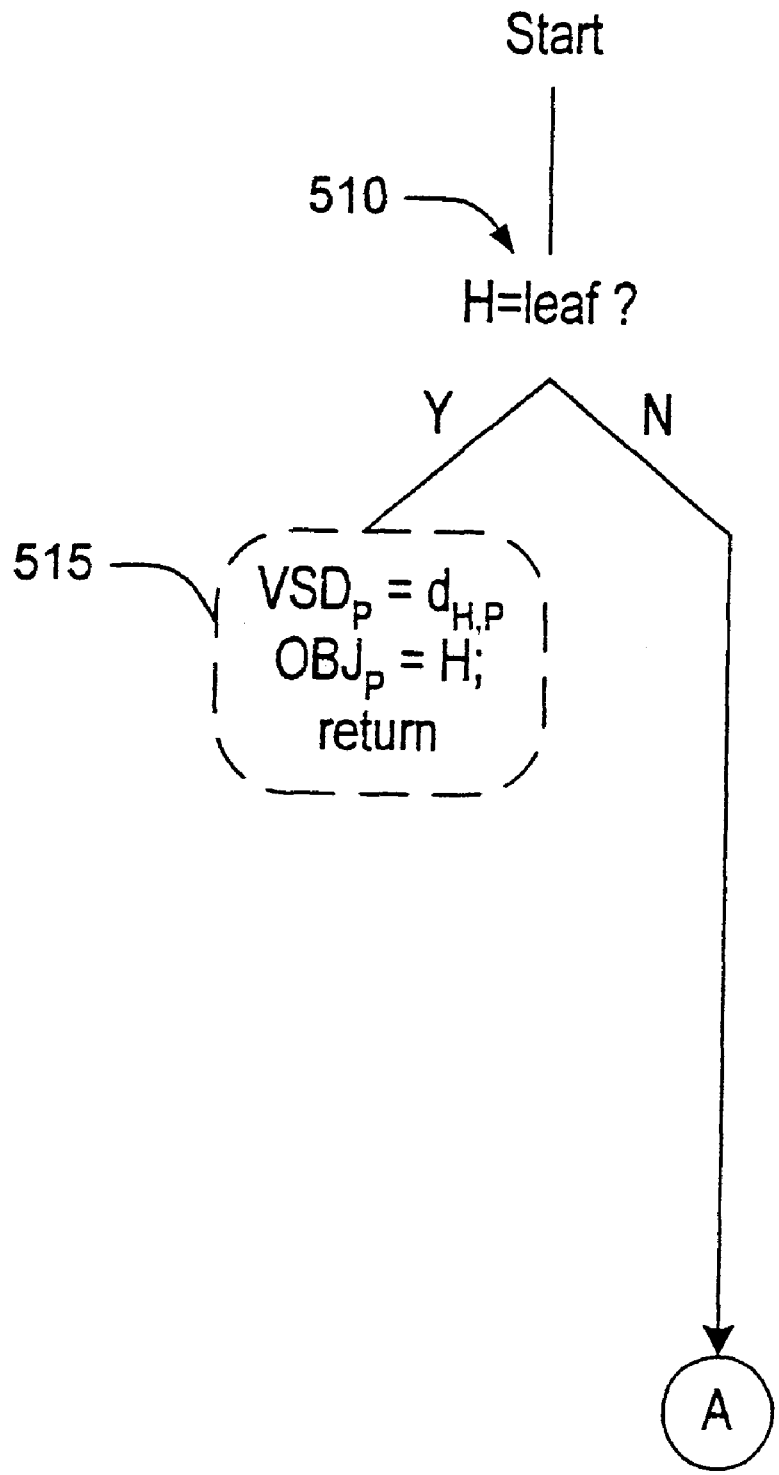
FIGS. 13A–B illustrate one embodiment of a bound search algorithm which searches the bound hierarchy with respect to a probe cone to determine any object which may be visible to the probe cone.
Figure 13B:
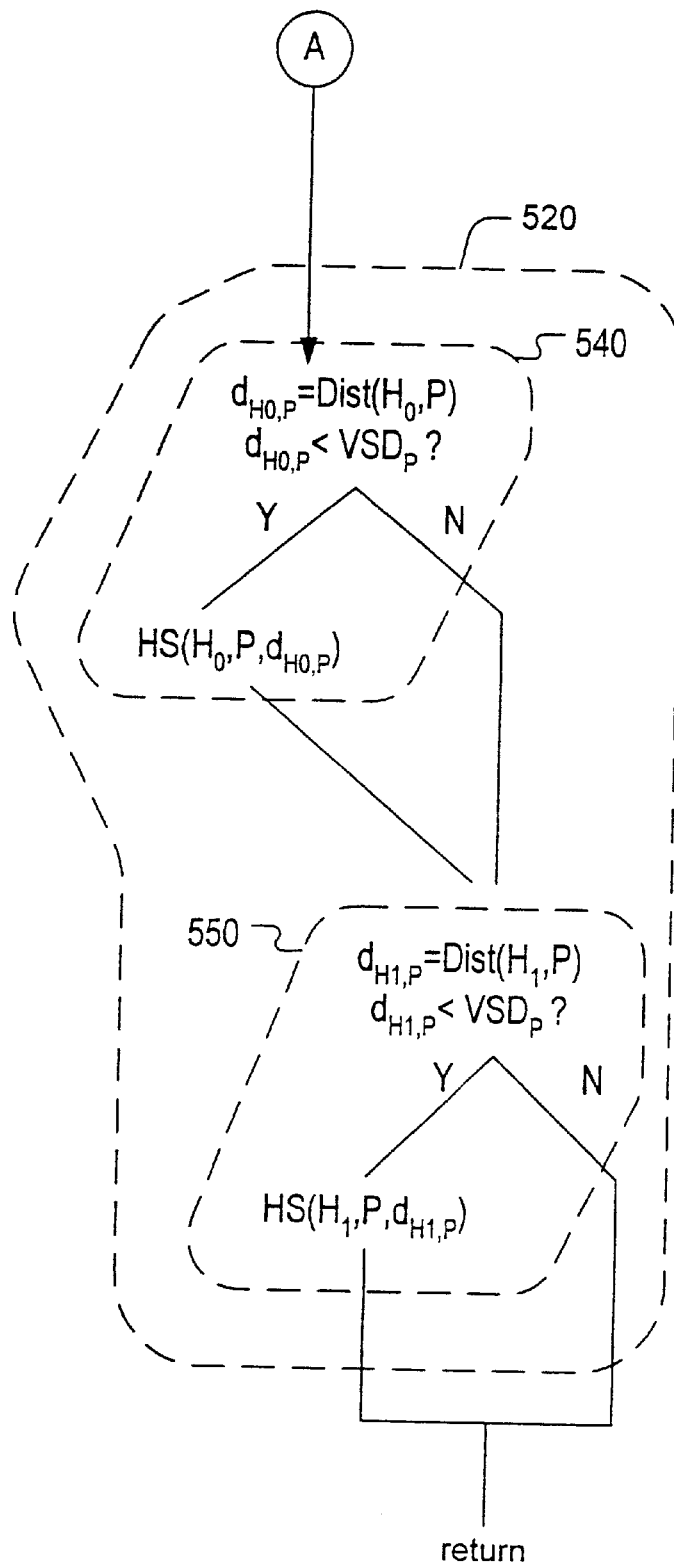

FIGS. 13A and 13B illustrate one embodiment of the HullSearch function (also referred to by the contraction HS).

The HullSearch function receives several input variables from a calling routine as illustrated by the following function prototype:

HullSearch (H, P, $d_{H,P}$), where H is a hull node to be explored against the probe cone P. The value $d_{H,P}$ represents the cone-hull distance between probe cone P and hull H.

In step 510, the HullSearch function determines if the hull H is a leaf of the hull tree. If hull H is a leaf of the hull tree, step 515 may be performed. In step 515, a visibility distance value $VSD_P$ for probe cone P may be set equal to the cone-hull distance $d_{H,P}$, and an object pointer $OBJ_P$ for the probe cone P may be set equal to the object pointer associated with leaf hull H. Each leaf hull may contain a pointer to an object enclosed within the leaf hull. After updating the visibility distance and object pointer, the HullSearch function may return control to a calling routine.

If hull H is not a leaf of the hull tree, step 520 may be performed. Step 520 may comprise steps 540 and 550.

In step 540, the HullSearch function may invoke the distance function Dist to compute the cone-hull distance $d_{H0,P}$ of the subhull H0 from the origin of the probe cone P. The HullSearch function may compare the cone-hull distance $d_{H0,P}$ to the visibility distance value $VSD_P$ of probe cone P. If the cone-hull distance $d_{H0,P}$ is smaller than the visibility distance value $VSD_P$ of probe cone P, the HullSearch function may be called again in order to search subhull H0 with respect to probe cone P. Thus, subhull H0, probe cone P and the cone-hull distance $d_{H0,P}$ may be supplied to the HullSearch function as arguments. When the HullSearch function finishes processing subhull H0 with respect to probe cone P, program control passes to step 550. Furthermore, if the cone-hull distance $d_{H0,P}$ is greater than or equal to the visibility distance value $VSD_P$ of probe cone P, control passes to step 550.

In step 550, the HullSearch function may invoke the distance function Dist to compute the cone-hull distance $d_{H1,P}$ of the subhull H1 from the origin of probe cone P. The HullSearch function may compare the cone-hull distance $d_{H1,P}$ to the visibility distance value $VSD_P$ of probe cone P. If the cone-hull distance $d_{H1,P}$ is smaller than the visibility distance value $VSD_P$ of probe cone P, the HullSearch function may be called again in order to search subhull H1 with respect to probe cone P. Thus, subhull H1, probe cone P and the cone-hull distance $d_{H1,P}$ may be supplied to the HullSearch function as arguments. When the HullSearch function finishes processing subhull H1 with respect to probe cone P, program control passes to a calling routine.

In some embodiments, step 520 may be implemented with a distance conditioned search order for subhulls as described above. In other words, the subhull which achieves a smaller cone-hull distance to probe cone P may be searched first. This increases the likelihood that the more distant subhull will be skipped.

The embodiment discussed in FIGS. 13A and 13B stores only one visible object per probe cone. However, other embodiments are contemplated where multiple visible objects may be stored per probe cone.

The number of levels between the second refinement level and the primary refinement level may be programmable, and may take any desired value. The number of probe cones per leaf cone may take any desired value. The probe cones serve to increase the effective resolution of the cone tree.

After the primary search of the hull tree and cone tree is complete, the hull tree may be explored with each probe cone of each leaf cone as described above in connection with FIGS. 13A and 13B above. The object $OBJ_P$ discovered by each probe cone P of a leaf cone C may be added to the one or more visible objects discovered for leaf cone C by the primary search. The objects discovered by the probe cones P of a leaf cone may have some redundancy with the one or more visible objects discovered for the leaf cone C by the primary search. Thus, in one embodiment, a post-processing agent may operate on the augmented set of visible object pointers to generate a non-redundant set of pointers.

In some embodiments, the second visibility search operation may use a different set of probe cones in successive frames. For example, referring to FIG. 12A, the second visibility search operation may use probe cones denoted 0000, 0100, 1000 and 1100 for a first frame, and probe cones 0001, 0101, 1001 and 1101 for a second frame. The use of different sets of probe cones in successive frames may increase the probability of detecting small objects within a leaf cone.

Hot Starting the Probe Cone Query

It is noted that the primary search performed by any of the embodiments of the visibility search algorithm described above may identify the closest object in each leaf cone. If the closest object achieves a distance $D_{min}$ with respect to the leaf cone LC, then the second visibility search may focus on identifying objects beyond distance $D_{min}$. In other words, the probe cones P of leaf cone LC need not explore hulls in the hull tree which are closer than distance $D_{min}$.

As described above, in some embodiments the visibility search algorithm identifies the N closest objects in each leaf cone. In this case, the secondary visibility search may concentrate on identifying objects in leaf cone LC which are beyond the $N^{th}$ closest object. The distance of the $N^{th}$ closest object with respect to the leaf cone LC, i.e. distance $D_N$, may be assigned as the value $D_{min}$. Probe cones P of leaf cone LC need not explore hulls which are closer than distance $D_{min}$.

In other embodiments, the visibility search algorithm identifies closest objects in a leaf cone until the sum of their occlusion metrics reaches an occlusion threshold. In this case, the distance of the $L^{th}$ closest object with respect to the leaf cone LC, i.e. distance $D_L$, may be assigned as the value $D_{min}$ where L denotes the number of closest objects gathered by the visibility search algorithm, i.e. the primary search, for leaf cone LC.

Probe cones P of leaf cone LC need not explore hulls which are closer than distance $D_{min}$.

Figure 14:
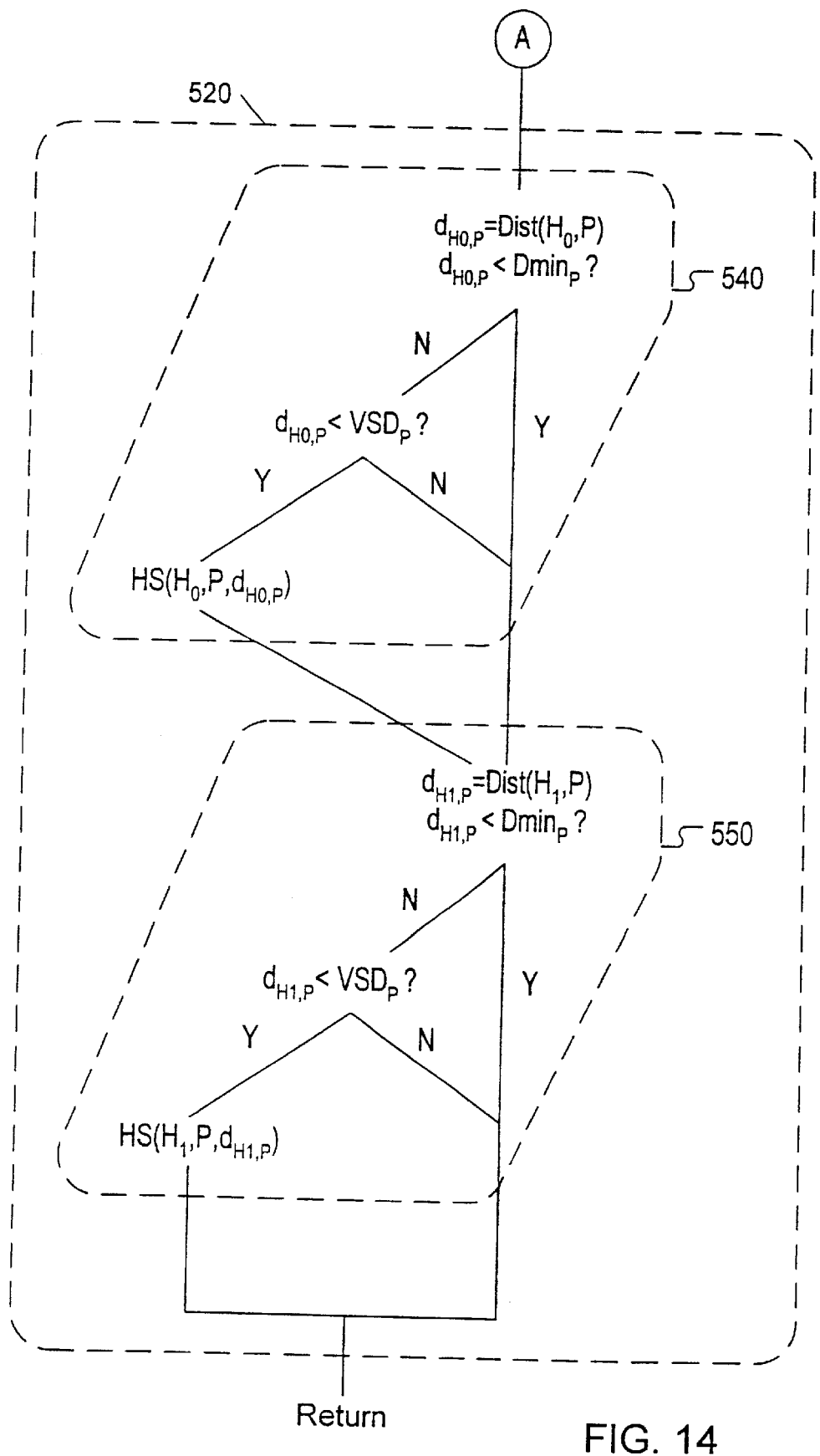
FIG. 14 illustrates a second embodiment of the bound search algorithm which may accelerate the search of the bound hierarchy with respect to a probe cone by imposing a minimum distance condition on the search of candidate subhulls.

In one embodiment, the HullSearch function explores a subhull of a hull H with respect to probe cone P only if the subhull achieves a cone-hull distance from the probe cone P which is greater than or equal to the minimum distance limit $Dmin_P$ for the probe cone P. FIG. 14 illustrates an alternate embodiment of the subhull search steps 540 and 550 in the HullSearch function.

In step 540, the HullSearch function computes the cone-hull distance $d_{H0,P}$ between the subhull H0 and probe cone P. If the cone-hull distance $d_{H0,P}$ is smaller than the minimum distance $Dmin_P$ for probe cone P, the subhull H0 is not explored, and control passes to step 550. If the cone-hull distance $d_{H0,P}$ is greater than or equal to the minimum distance $Dmin_P$ for probe cone P, the subhull H0 is searched against probe cone P subject to the additional condition that the cone-hull distance $d_{H0,P}$ is less than the visibility distance $VSD_P$ for probe cone P.

In step 550, the HullSearch function computes the cone-hull distance $d_{H1,P}$ between the subhull H1 and probe cone P. If the cone-hull distance $d_{H1,P}$ is smaller than the minimum distance $Dmin_P$ for probe cone P, the subhull H1 is not explored, and control returns to a calling routine. If the cone-hull distance $d_{H1,P}$ is greater than or equal to the minimum distance $Dmin_P$ for probe cone P, the subhull H1 is searched against probe cone P subject to the additional condition that the cone-hull distance $d_{H1,P}$ is less than the visibility distance $VSD_P$ for probe cone P.

Prior to execution of the HullSearch function on a probe cone P of leaf cone LC, the minimum distance $Dmin_P$ for probe cone P may be initialized based on the results of the primary search for leaf cone LC as discussed above. In one embodiment, the minimum distance $Dmin_P$ for each probe cone P in leaf cone LC is assigned the same value, i.e. the distance to the last of the closest objects identified in the primary search for the leaf cone LC. At least in some embodiments, this distance to the last (i.e. the farthest) of the closest objects is equal to the final value of the visibility distance $VSD_{LC}$ for the leaf cone LC, and thus, is readily accessible.

Method for Constructing a Bounding Hierarchy

Figure 15:
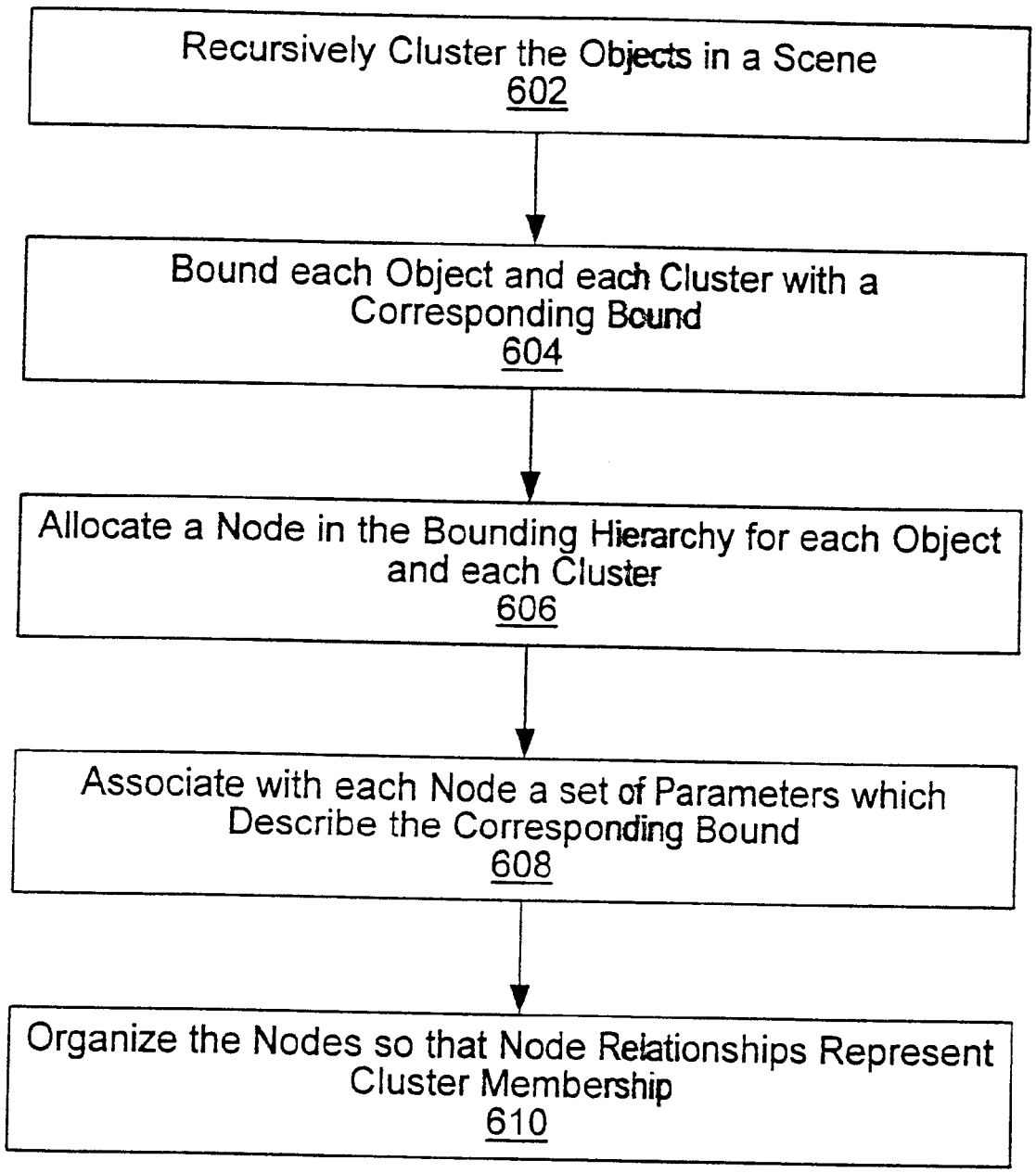
FIG. 15 illustrates one embodiment of the process of recursively clustering a collection of objects to form a bounding hierarchy.

FIG. 15 illustrates the construction of a bounding hierarchy (i.e. a bounding tree structure) from a collection of objects. The collection of objects may be accessed from memory 106. In step 602, the objects in the graphics scene may be recursively clustered. Objects may be assembled into clusters preferably based on proximity. These first order clusters are themselves assembled into second order clusters. Clusters of successively higher order are formed until all the objects are contained in one universal cluster. Objects may be considered as order zero clusters. In step 604, each cluster of all orders is bounded with a corresponding bound. The bounds are preferably polytope hulls as described above in connection with FIGS. 4 and 5. However, other types of bounds are contemplated such as, e.g., quadratic surfaces, generalized polynomial bounds, etc.

In step 606, a hierarchical tree of bounds is generated by allocating a node for each of the objects and clusters. In step 608, each node is assigned parameters which describe (characterize) the corresponding bound. In one embodiment this parameter assignment comprises storing the extent vector c which locates the polytope hull faces as described in connection with FIGS. 5A and 5B. In step 610, the nodes are organized so that node relationships correspond to cluster membership. For example, if node A is the parent of node B in the bounding hierarchy, then the cluster corresponding to node A contains a subcluster corresponding to node B, and the bound for node A contains the bound for node B.

Although the construction of the cone hierarchy above has been described in terms of recursive clustering, it is noted alternative embodiments are contemplated which use other forms of clustering such as iterative clustering.

Computing the Cone Restricted Distance Function

Recall that evaluation of the cone-hull distance $f_c(H)$ of a hull H from a cone C calls for minimizing $\|x\|$ subject to the hull constraints $Ax \leq b$ and the cone constraints $Sx \leq 0$. The rows of matrix A comprise normals for the hull surfaces. The rows of matrix S comprise normals for the cone surfaces. This minimization may be formulated as a nonlinear programming problem. For example, the nonlinear programming problem reduces to a quadratic programming problem when a Euclidean norm is used, and a linear programming problem when the $L^1$ norm is used. The cone-hull distance computation is herein referred to as a geometric query.

It is also noted that cone-hull separation may be measured by maximizing an decreasing function separation such as $\|x\|$ for points x satisfying the bound/hull constraints and the cone constraints. Thus, in general a cone-hull separation value may be computed by determining an extremal (i.e. minimal or maximal) value of the separation function subject to the cone constraints and the bound/hull constraints.

The use of a hierarchy of cones instead of a collection of rays is motivated by the desire for computational efficiency. Thanks to early candidate pruning that results from the double recursion illustrated earlier, fewer geometric queries are performed. These queries however are more expensive than the queries used in the ray casting method. Therefore, the cone query calculation may be designed meticulously. A sloppy algorithm could end up wasting most of the computational advantage provided by improvements in the dual tree search. For the linear programming case, a method for achieving a computationally tight query will now be outlined.

A piecewise-linear formulation of distance $f_c$ leads to the following linear program:

$$\min(v^T x)$$

subject to $Ax \leq b$, $Sx \leq 0$.

The vector v is some member of the cone that is polar to the cone C. For instance, $v=-S^T e$, where e is the vector of all ones. [It is noted that the matrix S of cone normals S are outward normals to the cone surfaces. Thus, the negation of the sum of the normal vectors gives a polar vector.] The condition $Ax \leq b$ implies that the point x is within the bounding hull. The condition $Sx \leq 0$ implies that the point x is within the cone C. For an efficient solution method, the linear program problem is restated in term of its dual:

$$\max(b^T y)$$

subject to $A^T y + S^T Z = v$, $0 \leq y$, $0 \leq z$.

The dual objective value, $b^T y$ is infinite when the cone and bounding hull do not intersect (the variables y and z are the Lagrange multipliers of the previous problem's constraints). In the preferred embodiment, the bounding hulls have sides normal to a fixed set of normal vectors. Thus, the matrix $A^T$ is the same for all hulls. For a given cone, the matrix $S^T$ and the vector v are also fixed. From this observation, it is apparent that the multi-dimensional polyhedron $$\{(y,z): A^T y + S^T z = v, 0 \leq y, 0 \leq z\}$$

is associated with the cone. (In one embodiment, this polyhedron has seventeen dimensions. Fourteen of those dimensions come from the type of the fixed-direction bounding hull and an three additional dimensions come from the cone.) Since the polyhedron depends only on the cone matrix S, it is feasible to completely precompute the extremal structure of the polygon for each cone in the cone hierarchy. By complementary slackness, the vertices of the polyhedron will have at most three elements. The edges and extremal rays will have at most four non-zero elements. An abbreviated, simplex-based, hill-climbing technique can be used to quickly solve the query in this setting.

In one embodiment, the entire space is tessellated with cones, and visible objects are detected within the entire space. After this entire-space visibility computation, the set of visible objects may be culled to conform to the current view frustum, and the visible objects which survive the frustum culling may be rendered and displayed.

In an alternative embodiment, a less aggressive approach may be pursued. In particular, by determining beforehand a collection of the cones in the cone hierarchy which correspond to the view frustum in its current orientation, only this collection may be included in the visible-object-set computation.

Memory Media

As described above, the visibility software may be stored in memory 106 for access by processor 102. In addition, the visibility software and visibility search program may be stored in any desired memory media such as an installation media (e.g. CD-ROM, floppy disk, etc.), a non-volatile memory (e.g. hard disk, optical storage, magnetic tape, bubble memory, ROM, etc.), various kinds of volatile memory such as RAM, or any combination thereof. In some embodiments, the visibility software and visibility search program may be deposited on memory media for distribution to end users and/or customers. Also, the visibility software and visibility search program may be transmitted through a transmission medium (e.g. the atmosphere and/or free space, a network of computers, an electrical conductor, optical fiber, etc.) between an information source and destination.

In one embodiment, the visibility software may be implemented as part of an operating system. In a second embodiment, the visibility software may be implemented as a dynamic link library. In a third embodiment, the visibility software may be implemented as part of a device driver (e.g. a device driver for graphics accelerator 112).

In a fourth embodiment, the visibility software may be implemented as part of a JAVA 3D virtual machine which executes on processor 102. A user may access a remote server through a network. The server responsively generates a stream of graphics data comprising graphical objects. The visibility software executing as part of the JAVA 3D virtual machine may determine a set of visible objects from the received graphical objects. The virtual machine may provide the set of visible objects (or pointers to the visible objects) to a rendering agent. The rendering agent may be a hardware rendering unit such as graphics accelerator 112. Alternatively, the rendering agent may be a software renderer which also runs on processor 102.

Adaptive Refinement of the Cone Hierarchy

In the foregoing discussion, the cone hierarchy is described as being constructed prior to initiation of the search for visible objects by the visibility search algorithm, and remains static during the search. Another alternative is to adaptively refine the cone hierarchy during the search procedure. In this fashion, the cone hierarchy may not waste storage for cones which will never interact with any objects. The cone hierarchy may be refined in response to user inputs. For example, cones which correspond to the user's current direction of gaze may warrant additional refinement. A given cone may remain unrefined until the search procedure discovers a bound which interacts with the given cone, at which time the cone may be refined. The refinement of a given cone may be further refined as additional interacting objects/bounds are discovered in order to more adequately distinguish the objects. In the context where objects are in motion, the movement of an object into a given cone's field of view may induce increased refinement of the given cone. If the user in a virtual environment stops to look at a given object, the cones defining that object may be increasingly refined.

Refinement of the cone hierarchy may be subject to the availability of computational cycles. According to the paradigm of successive warming, the initial cone tree may have only one or a few cones allowing a crude initial estimate of visible object set to be immediately displayed. As computational cycles become available the cone hierarchy may be successively refined and searched in order to provide an increasingly accurate display of the visible object set.

In general the cones of the cone hierarchy may be at differing levels of refinement. Cone refinement may be permitted only if the cone interacts with an object or bound (e.g. hull). Adaptive refinement of a cone may be terminated when the cone resolution equals that of a pixel or when no object occurs in the cone.

In one embodiment, a combination of fixed refinement and adaptive refinement of the cone hierarchy may be used.

In some embodiments, the visibility search algorithm may combine adaptive refinement of the cone hierarchy and identification of the K nearest objects/bound for each cone, where K changes as the refinement level changes.

What is claimed is:

1. A method for displaying graphical objects on a display device, the method comprising:
   searching a cone tree structure and a bound tree structure to determine a plurality of nearest graphical objects for a subset of leaf cones of the cone tree structure, wherein, for a first leaf cone of the cone tree structure and a first leaf bound of the bound tree structure, said searching includes:
   (a) computing a first cone-hull separation value for the first leaf bound with respect to the first leaf cone;
   (b) determining if the first cone-hull separation value satisfies a first inequality condition with respect to a first visibility extent value associated with the first leaf cone;
       wherein, if the first cone-hull separation value satisfies the first inequality condition with respect to the first visibility extent value associated with the first leaf cone, said searching further includes:
       (c) updating a sequence of nearest object values corresponding to the first leaf cone based on the first cone-hull separation value;
       (d) updating a sequence of nearest object pointers corresponding to the first leaf cone with a first pointer associated with the first leaf bound; and
   transmitting the sequence of nearest object pointers for the subset of leaf cones for use in selecting which of said graphical objects to render for display.

2. The method of claim 1, wherein said searching further includes:
   determining if the first leaf bound is an occluder;
   performing (c) and (d) in response to the first leaf bound being an occluder, and the first cone-hull separation value satisfying the first inequality condition with respect to the first visibility extent value associated with the first leaf cone.

3. The method of claim 2, wherein said searching further includes storing the first pointer associated with the first leaf bound and the first cone-hull separation value in a non-occluder buffer corresponding to the first leaf cone in response to determining that the first leaf bound is a first non-occluder.

4. The method of claim 3, further comprising transmitting one or more pointers from the non-occluder buffer corresponding to the first leaf cone for use in selecting which of said graphical objects to render for display, wherein the one or more pointers correspond to one or more second non-occluders.

5. The method of claim 1, wherein said searching further comprises:
   determining a sequence position for the first cone-hull separation value in the sequence of nearest object values;
   wherein (c) comprises injecting the first cone-hull separation value into the sequence of nearest object values based on the sequence position;
   wherein (d) comprises injecting the first pointer into the sequence of nearest object pointers based on the sequence position.

6. The method of claim 5, wherein (c) further comprises shifting nearest object values occurring after the sequence position within the sequence of nearest object values, and wherein (d) further comprises shifting nearest object pointers occurring after the sequence position within the sequence of nearest object pointers.

7. The method of claim 6, wherein the sequence of nearest object values and the sequence of nearest object pointers have a fixed length N, wherein N is a positive integer.

8. The method of claim 7, wherein said searching further comprises:
   setting the first visibility extent value equal to a last object value of the sequence of nearest object values.

9. The method of claim 1, wherein said searching further comprises:
   flushing (i) nearest object values greater than a last object value of the sequence of nearest object values and (ii) corresponding object pointers from a non-occluder buffer associated with the first leaf cone.

10. The method of claim 1, wherein the first pointer comprises an object pointer to an object bounded by the first leaf bound.

11. The method of claim 1, wherein said searching further comprises (e) updating a sequence of occlusion values with an occlusion metric value corresponding to the first leaf bound.

12. The method of claim 11, wherein said searching further comprises:
   determining a sequence position for the first cone-hull separation value in the sequence of nearest object values;
   wherein (c) comprises injecting the first cone-hull separation value into the sequence of nearest object values based on the sequence position;
   wherein (d) comprises injecting the first pointer into the sequence of nearest object pointers based on the sequence position;
   wherein (e) comprises injecting the occlusion metric value into the sequence of occlusion values based on the sequence position.

13. The method of claim 12, wherein the first leaf cone stores a cumulative sum of the sequence of occlusion values, wherein said searching further comprises:
   determining an updated cumulative sum by adding the cumulative sum and the occlusion metric value of the first leaf bound;
   determining if the updated cumulative sum exceeds an occlusion threshold.

14. The method of claim 13, wherein said searching further comprises:
   flushing (i) nearest object values beyond a critical index from the sequence of nearest object values, (ii) nearest object pointers beyond the critical index from the sequence of nearest object pointers, and (iii) occlusion values beyond the critical index from the sequence of occlusion values, if the updated cumulative sum of occlusion values exceeds the occlusion threshold.

15. The method of claim 14, wherein said searching further comprises setting the first visibility extent value equal to a critical object value in the sequence of nearest object values corresponding to the critical index if the updated cumulative sum of occlusion values exceeds the occlusion threshold.

16. The method of claim 14, wherein the sum of the occlusion values in the sequence of occlusion values up through the critical index is less than or equal to the occlusion threshold.

17. The method of claim 1 further comprising:
receiving a cone pointer which points to the cone tree structure stored in a memory;
receiving a bound pointer which points to the bound tree structure stored in the memory, wherein leaf bounds of the bound tree structure approximate a collection of graphical objects.

18. The method of claim 1 wherein said searching the cone tree structure and the bound tree structure comprises searching a second bound of the bound tree structure with respect to a second cone of the cone tree structure, wherein said searching the second bound with respect to the second cone comprises exploring subbounds of the second bound with respect to the second cone.

19. The method of claim 1 wherein said searching the cone tree structure and the bound tree structure comprises searching a second bound of the bound tree structure with respect to a second cone of the cone tree structure, wherein said searching the second bound with respect to the second cone comprises exploring subcones of the second cone with respect to the second bound.

20. The method of claim 11, wherein the first leaf cone stores a sequence of occlusion values corresponding to said sequence of object pointers, wherein said searching further comprises:
flushing (i) nearest object values beyond a critical index from the sequence of nearest object values, (ii) nearest object pointers beyond the critical index from the sequence of nearest object pointers, and (iii) occlusion values beyond the critical index from the sequence of occlusion values, wherein a cumulative sum of the sequence of occlusion values up through the critical index is less than or equal to the occlusion threshold.

21. A computer system for displaying graphical objects on a display device, the computer system comprising:
a memory subsystem configured to store a cone tree structure and a bound tree structure, wherein leaf bounds of the bound tree structure approximate a collection of graphical objects;
a processor configured to execute a visibility search algorithm stored in the memory subsystem;
wherein, in response to an execution of the visibility search algorithm, the processor is configured to search the cone tree structure and the bound tree structure to determine one or more nearest graphical objects for a subset of leaf cones of the cone tree structure, wherein said processor is configured to (a) compute a first cone-hull separation value for a first leaf bound with respect to a first leaf cone, (b) determine if the first conehull separation value satisfies a first inequality condition with respect to a first visibility extent value associated with the first leaf cone, and, in response to the first cone-hull separation value satisfying the first inequality condition with respect to the first visibility extent value, to (c) update a sequence of nearest object values corresponding to the first leaf cone based on the first cone-hull separation value and (d) update a sequence of nearest object pointers corresponding to the first leaf cone with a first pointer associated with the first leaf bound;
wherein the processor is further configured to transmit the sequence of nearest object pointers for the subset of leaf cones for use in selecting which of said graphical objects to render for display.

22. The computer system of claim 21, wherein, in response to execution of the visibility search algorithm, said processor is further configured to:
determine if the first leaf bound is an occluder; and
perform (c) and (d) in response to the first leaf bound being an occluder, and the first cone-hull separation value satisfying the first inequality condition with respect to the first visibility extent value associated with the first leaf cone.

23. The computer system of claim 22, wherein, in response to execution of the visibility search algorithm, said processor is further configured to:
store the first pointer associated with the first leaf bound and the first cone-hull separation value in a non-occluder buffer corresponding to the first leaf cone in response to determining that the first leaf bound is a first non-occluder.

24. The computer system of claim 23 wherein, in response to execution of the visibility search algorithm, said processor is further configured to:
transmit one or more pointers from the non-occluder buffer corresponding to the first leaf cone for use in selecting which of said graphical objects to render for display, wherein the one or more pointers correspond to one or more second non-occluders.

25. The computer system of claim 21 wherein, in response to execution of the visibility search algorithm, said processor is further configured to determine a sequence position for the first cone-hull separation value in the sequence of nearest object values;
wherein said processor is configured perform (c) by injecting the first cone-hull separation value into the sequence of nearest object values based on the sequence position, and (d) by injecting the first pointer into the sequence of nearest object pointers based on the sequence position.

26. The computer system of claim 25, wherein said processor is configured to perform (c) by shifting nearest object values occurring after the sequence position within the sequence of nearest object values, and (d) by shifting nearest object pointers occurring after the sequence position within the sequence of nearest object pointers.

27. The computer system of claim 26, wherein the sequence of nearest object values and the sequence of nearest object pointers have a fixed length N, wherein N is a positive integer.

28. The computer system of claim 27, wherein, in response to execution of the visibility search algorithm, said processor is further configured to set the first visibility extent value equal to a last object value of the sequence of nearest object values.

29. The computer system of claim 21, wherein, in response to execution of the visibility search algorithm, said processor is further configured to flush (i) nearest object values greater than a last object value of the sequence of nearest object values and (ii) corresponding object pointers from a non-occluder buffer associated with the first leaf cone.

30. The computer system of claim 21, wherein the first pointer comprises an object pointer to an object bounded by the first leaf bound.

31. The computer system of claim 21, wherein, in response to execution of the visibility search algorithm, said processor is further configured to (e) update a sequence of occlusion values with an occlusion metric value corresponding to the first leaf bound.

32. The computer system of claim 21, wherein, in response to execution of the visibility search algorithm, said processor is further configured to:
   determine a sequence position for the first cone-hull separation value in the sequence of nearest object values;
   wherein said processor is further configured to perform (c) by injecting the first cone-hull separation value into the sequence of nearest object values based on the sequence position, (d) by injecting the first pointer into the sequence of nearest object pointers based on the sequence position, and (e) by injecting the occlusion metric value into the sequence of occlusion values based on the sequence position.

33. The computer system of claim 32, wherein the first leaf cone stores a cumulative sum of the sequence of occlusion values, wherein, in response to execution of the visibility search algorithm, said processor is further configured to:
   determine an updated cumulative sum by adding the cumulative sum and the occlusion metric value of the first leaf bound; and
   determine if the updated cumulative sum exceeds an occlusion threshold.

34. The computer system of claim 33, wherein, in response to execution of the visibility search algorithm, said processor is further configured to:
   flush (i) nearest object values beyond a critical index from the sequence of nearest object values, (ii) nearest object pointers beyond the critical index from the sequence of nearest object pointers, and (iii) occlusion values beyond the critical index from the sequence of occlusion values, if the updated cumulative sum of occlusion values exceeds the occlusion threshold.

35. The computer system of claim 34, wherein, in response to execution of the visibility search algorithm, said processor is further configured to:
   set the first visibility extent value equal to a critical object value in the sequence of nearest object values corresponding to the critical index if the updated cumulative sum of occlusion values exceeds the occlusion threshold.

36. The computer system of claim 34, wherein the sum of the occlusion values in the sequence of occlusion values up through the critical index is less than or equal to the occlusion threshold.

37. The computer system of claim 21, wherein, in response to execution of the visibility search algorithm, said processor is further configured to:
   receive a cone pointer which points to the cone tree structure stored in the memory subsystem;
   receive a bound pointer which points to the bound tree structure stored in the memory subsystem, wherein leaf bounds of the bound tree structure approximate a collection of graphical objects.

38. The computer system of claim 21, wherein said processor is configured to search the cone tree structure and the bound tree structure by searching a second bound of the bound tree structure with respect to a second cone of the cone tree structure, wherein said searching the second bound with respect to the second cone comprises exploring sub-bounds of the second bound with respect to the second cone.

39. The computer system of claim 21 wherein said processor is configured to search the cone tree structure and the bound tree structure by searching a second bound of the bound tree structure with respect to a second cone of the cone tree structure, wherein said searching the second bound with respect to the second cone comprises exploring sub-cones of the second cone with respect to the second bound.

40. The computer system of claim 31, wherein the first leaf cone stores a sequence of occlusion values corresponding to said sequence of object pointers, wherein said processor is further configured to flush (i) nearest object values beyond a critical index from the sequence of nearest object values, (ii) nearest object pointers beyond the critical index from the sequence of nearest object pointers, and (iii) occlusion values beyond the critical index from the sequence of occlusion values, wherein a cumulative sum of the sequence of occlusion values up through the critical index is less than or equal to the occlusion threshold.

41. A method for displaying visible objects on a display device, the method comprising:
   (a) searching a cone tree structure and a bound tree structure to determine a first visible object for a plurality of leaf cones of the cone tree structure;
   (b) searching the bound tree structure with respect to probe cones of a first leaf cone of the cone tree structure to determine one or more additional visible objects for the first leaf cone; and
   (c) transmitting an indication of the first visible object and the one or more additional visible objects for at least the first leaf cone for rendering and display.

42. The method of claim 41, wherein the probe cones comprise selected cone descendents of the first leaf cone in the cone tree structure.

43. The method of claim 41, wherein the probe cones comprise a subset of the cone descendents of the first leaf cone from a first refinement level of the cone tree structure.

44. The method of claim 41, wherein the probe cones sample the space subtended by the first leaf cone.

45. The method of claim 41 wherein said searching the bound tree structure with respect to the probe cones of the first leaf cone comprises searching a first bound of the bound tree structure with respect to a first probe cone.

46. The method of claim 45 wherein said searching the first bound with respect to the first probe cone comprises:
   computing a first cone-hull separation value between a first subbound of the first bound and the first probe cone;
   determining if the first cone-hull separation value satisfies a first inequality condition with respect to a first visibility value associated with the first probe cone;
   searching the first subbound with respect to the first probe cone in response to the first cone-hull separation value satisfying the inequality condition with respect to the first visibility value.

47. The method of claim 46 wherein said searching the first bound with respect to the first probe cone further comprises:
   comparing the first cone-hull separation value to a limiting value associated with the first leaf cone; and
   performing said search of the first subbound with respect to the first probe cone if the first cone-hull separation value satisfies a second inequality condition with respect to the limiting value and the first inequality condition with respect to the first visibility value of the first probe cone.

48. The method of claim 47 further comprising initializing the limiting value for the first probe cone with a first object distance corresponding to the first visible object determined in (a).

49. The method of claim 41 wherein said searching the bound tree structure with respect to probe cones of a first leaf cone of the cone tree structure comprises:
- computing a first cone-hull separation value between a first leaf bound of the bound tree structure and a first probe cone of the probe cones;
- determining if the first cone-hull separation value satisfies an inequality condition with respect to a probe visibility value associated with the first probe cone;
- updating a visible object pointer corresponding to the first probe cone with a first pointer associated with the first leaf bound;
- updating the probe visibility value based on the first cone-hull separation value.

50. The method of claim 41 wherein said searching the cone tree structure and the bound tree structure comprises searching a second bound of the bound tree structure with respect to a second cone of the cone tree structure, wherein said searching the second bound with respect to the second cone comprises exploring subbounds of the second bound with respect to the second cone.

51. The method of claim 41 wherein said searching the cone tree structure and the bound tree structure comprises searching a second bound of the bound tree structure with respect to a second cone of the cone tree structure, wherein said searching the second bound with respect to the second cone comprises exploring subcones of the second cone with respect to the second bound.

52. A computer system for displaying visible objects on a display device, the computer system comprising:
- a memory configured to store a cone hierarchy and a bound hierarchy, wherein leaf bounds of the bound hierarchy approximate a collection of graphical objects; and
- a processor configured to execute visibility software stored in the memory;
- wherein, in response to an execution of the visibility software, the processor is configured to (a) search said cone hierarchy and said bound hierarchy to determine a first visible object for a plurality of leaf cones of the cone hiearchy, (b) search the bound hierarchy using probe cones of a first leaf cone of the cone hierarchy to determine one or more additional visible objects for the first leaf cone, and (c) transmit an indication of the first visible object and the one or more additional visible objects for at least the first leaf cone for rendering and display.

53. The computer system of claim 52, wherein the probe cones comprise selected cone descendents of the first leaf cone in the cone hierarchy.

54. The computer system of claim 52, wherein the probe cones comprise a subset of the cone descendents of the first leaf cone from a first refinement level of the cone hierarchy.

55. The computer system of claim 52, wherein the probe cones sample the space subtended by the first leaf cone.

56. The computer system of claim 52, wherein said processor is configured to search a first bound of the bound hierarchy with respect to the first probe cone of the probe cones by:
- computing a first cone-hull separation value between a first subbound of the first bound and the first probe cone;
- determining if the first cone-hull separation value satisfies a first inequality condition with respect to a first visibility value associated with the first probe cone; and
- searching the first subbound with respect to the first probe cone in response to the first cone-hull separation value satisfying the inequality condition with respect to the first visibility value.

57. The computer system of claim 56, wherein said processor is further configured to search the first bound with respect to the first probe cone by:
- comparing the first cone-hull separation value to a limiting value associated with the first leaf cone; and
- performing said search of the first subbound with respect to the first probe cone if the first cone-hull separation value satisfies a second inequality condition with respect to the limiting value and the first inequality condition with respect to the first visibility value of the first probe cone.

58. The computer system of claim 57, wherein said processor is further configured to initialize the limiting value for the first probe cone with a first object distance corresponding to the first visible object determined in (a).

59. The computer system of claim 52, wherein said processor is configured to search the bound tree structure with respect to probe cones of a first leaf cone of the cone tree structure by:
- computing a first cone-hull separation value between a first leaf bound of the bound tree structure and a first probe cone of the probe cones;
- determining if the first cone-hull separation value satisfies an inequality condition with respect to a probe visibility value associated with the first probe cone;
- updating a visible object pointer corresponding to the first probe cone with a first pointer associated with the first leaf bound;
- updating the probe visibility value based on the first cone-hull separation value.

60. The computer system of claim 52 wherein said processor is configured to search the cone tree structure and the bound tree structure by searching a second bound of the bound tree structure with respect to a second cone of the cone tree structure, wherein said searching the second bound with respect to the second cone comprises exploring subbounds of the second bound with respect to the second cone.

61. The computer system of claim 52, wherein said processor is configured to search the cone tree structure and the bound tree structure by searching a second bound of the bound tree structure with respect to a second cone of the cone tree structure, wherein said searching the second bound with respect to the second cone comprises exploring subcones of the second cone with respect to the second bound.

* * * * *